(12) United States Patent
Seki et al.

(10) Patent No.: US 8,300,327 B2
(45) Date of Patent: Oct. 30, 2012

(54) PRODUCTION METHOD OF OPTICAL ELEMENT, OPTICAL ELEMENT FORMING MOLD AND OPTICAL ELEMENT

(75) Inventors: Shuji Seki, Ibaraki (JP); Hideki Komiya, Ibaraki (JP); Susumu Shibasaki, Ibaraki (JP); Makoto Aihara, Ibaraki (JP); Masashi Yoshimura, Ibaraki (JP)

(73) Assignee: Hitachi Maxell, Ltd, Ibaraki-Shi, Osaka (JP)

(*) Notice: Subject to any disclaimer, the term of this patent is extended or adjusted under 35 U.S.C. 154(b) by 540 days.

(21) Appl. No.: 12/520,355

(22) PCT Filed: Dec. 19, 2007

(86) PCT No.: PCT/JP2007/074443
§ 371 (c)(1),
(2), (4) Date: Sep. 22, 2009

(87) PCT Pub. No.: WO2008/075724
PCT Pub. Date: Jun. 26, 2008

(65) Prior Publication Data
US 2010/0033849 A1 Feb. 11, 2010

(30) Foreign Application Priority Data

Dec. 20, 2006 (JP) ................................ 2006-342105
May 30, 2007 (JP) ................................ 2007-143909
May 30, 2007 (JP) ................................ 2007-143986

(51) Int. Cl.
G02B 7/02 (2006.01)
B29D 11/00 (2006.01)
C03B 11/08 (2006.01)

(52) U.S. Cl. ................................ 359/811; 264/2.2; 65/39
(58) Field of Classification Search .................. 359/811, 359/819; 264/2.2; 65/39
See application file for complete search history.

(56) References Cited

FOREIGN PATENT DOCUMENTS

| | | | |
|---|---|---|---|
| JP | 61-010034 | * | 1/1986 |
| JP | 61-10034 A | | 1/1986 |
| JP | 2000-247653 | * | 9/2000 |
| JP | 2000-247653 A | | 9/2000 |
| JP | 2001-019447 | * | 1/2001 |
| JP | 2001-19447 A | | 1/2001 |
| JP | 2004-191763 | * | 7/2004 |
| JP | 2004-191763 A | | 7/2004 |
| JP | 2005-115148 A | | 4/2005 |
| JP | 2007-080318 | * | 3/2007 |
| JP | 2007-80318 A | | 3/2007 |

* cited by examiner

*Primary Examiner* — Joseph P Martinez
(74) *Attorney, Agent, or Firm* — Birch, Stewart, Kolasch & Birch, LLP

(57) ABSTRACT

A method of producing an optical element, in which a first and a second die are cooperated with each other so as to press-mold a material in order to produce an optical element including a lens portion, the first die has a circular cross-sectional shape, and the second die defines therein an interior space having a polygonal cross-sectional shape with respect to the direction of die-fastening, the first die is adapted to enter into the interior space of the second die in the direction of die-fastening in the interior space so to press-mold the material in order to form the lens surface while the material is bulged out through gaps between the first die and the second die around the lens surface whereby forming protrusions. An optical element and a mold assembly for an optical element are also provided.

31 Claims, 33 Drawing Sheets

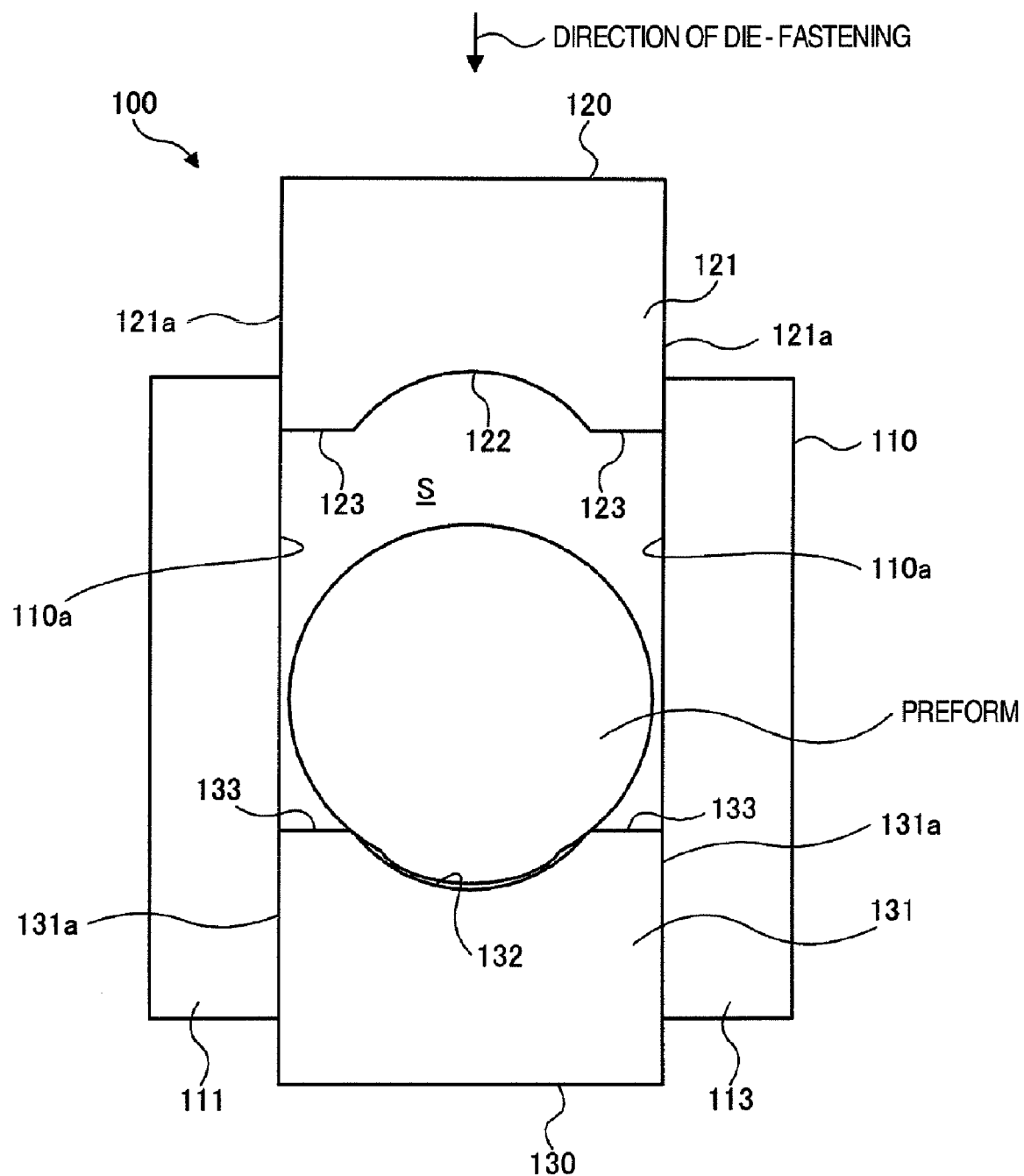

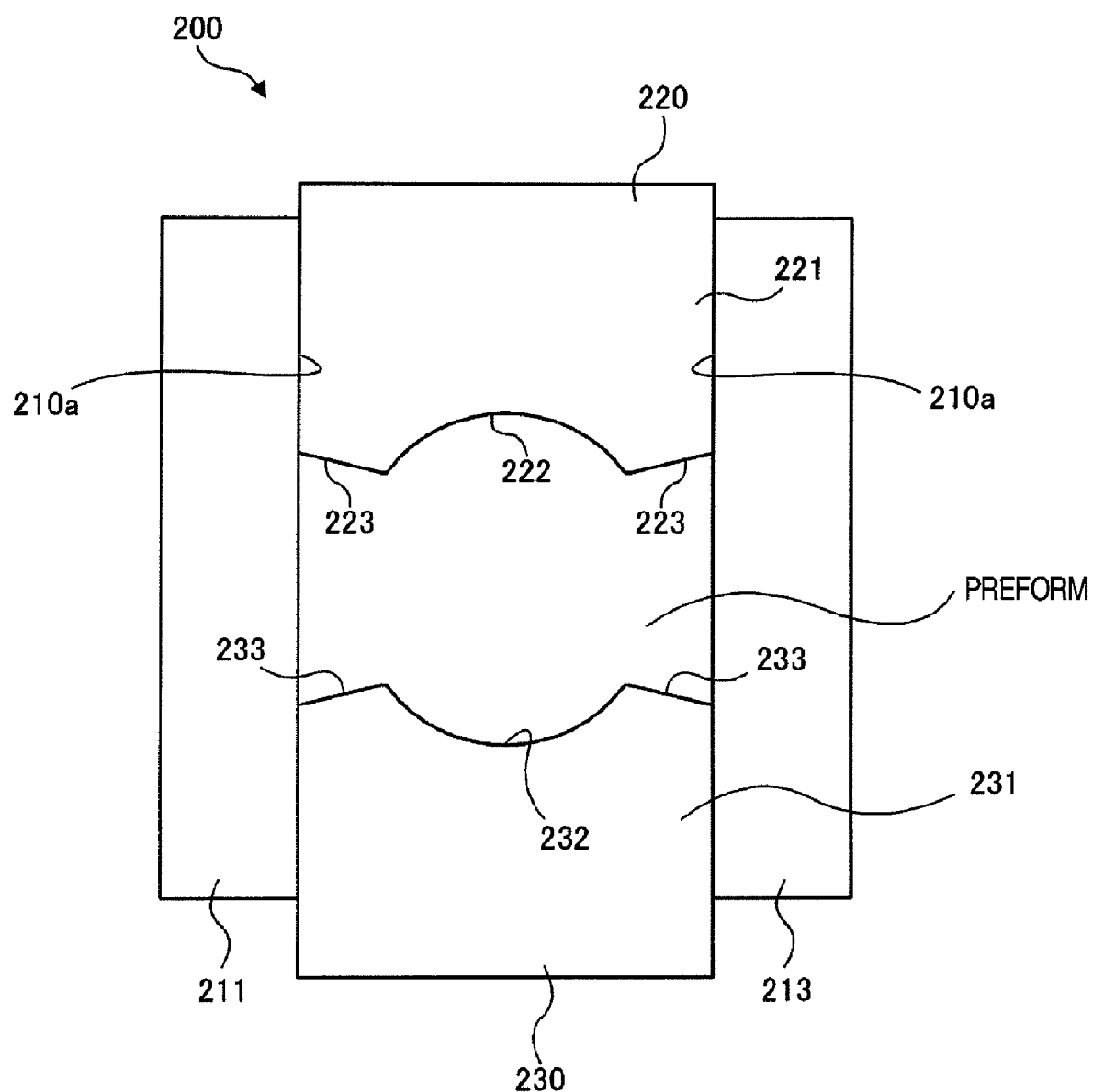

PRODUCTION METHOD OF OPTICAL ELEMENT, OPTICAL ELEMENT FORMING MOLD AND OPTICAL ELEMENT

TECHNICAL FIELD

The present invention relates to a production method for manufacturing an optical element adapted to be used for optical communication or the like, an optical element forming mold and an optical element.

RELATED ART

Heretofore, there has been proposed various methods for manufacturing an optical lens and the like (refer to, for example, JP-A-2005-115148).

In particular, JP-A-2005-115148 discloses a lens element production method in which with the use of a cope mold having a molding surface corresponding to the shape of one of opposite side surfaces of an optical lens, and a drag mold having a molding surface corresponding to the shape of the other of the opposite side surfaces thereof, a glass material or a lens material is disposed between both molding surfaces, and further, an annular holder is located around the molding surface of the drag mold. Further, the method disclosed in JP-A-20005-115148 comprises the steps of heating the glass material so as to soften the same, and thereafter pressing the cope mold against the drag mold so as to cause the molding surfaces of the cope mold, the drag mold and the holder to press (clamping or die fastening) the glass material in order to transfer these molding surfaces onto the glass material and to adhere the same to the inner surface of the holder. After the press molding as stated above is completed, the glass material is cooled, then the cope mold is raised, and thereafter, the glass material is taken out from the drag mold.

DISCLOSURE OF THE INVENTION

Heretofore, there have been proposed optical lenses having various shapes for fitting their uses. Among them, the so-called square lens having a lens portion with a quadrangular periphery, can exhibit such an advantage that the square lens can be directly set on a mounting surface with the use of its quadrangular part with no use of any additional equipment or the like, and can also exhibit the advantage that the optical axis of a convex lens part thereof can be automatically set in parallel with the mounting surface.

In a conventional production method for manufacturing the above-mentioned square lens, a cavity dies having a quadrangular cross-sectional shape is inserted therein with a core die having a quadrangular cross-sectional shape in order to press-mold the square lens. However, since both cavity die and core die have quadrangular cross-sectional shapes, respectively, a high degree of accuracy is desirable for manufacturing these dies, and further, the dies have to be assembled to each other with a high degree of accuracy. As a result, it is difficult to allow the optical lens to be commercially available at low costs. It is noted that an optical lens may be manufactured by lathing, rather than the molding. However, an attempt to the cost reduction of such an optical lens is restrained from being lowered below a certain level. Further, it is difficult to supply products which satisfy commercial demands.

Further, the square lens does not have a member for protecting the lens surface having a convex shape, different from a canned lens which is disposed in a can, and accordingly, there would be caused the risk that the lens surface is subjected to a scratch which is optically detrimental, during handling of the square lens. The lens with such a scratch cannot be used as a product. Thus, it is required to carefully handle the square lens. That is, the worker who handles the square lens has to carry out the assembly of the square lens with minute and great care. Thus, it is difficult to materialize the reduction in the working man-hours and the like.

The above-mentioned square lens is adapted to be used, being positioned on a mounting surface, and accordingly, is secured to the mounting surface with the use of an adhesive or the like. Among several kinds of adhesives, the one which can firmly secure the square lens onto the mounting surface is selected for this use purpose, the larger the adhesive surface area, the firmer the securing.

The present invention is devised in order to solve the above-mentioned technical problems, and accordingly, an object of the present invention is to provide a method of producing optical elements with a high degree of productivity.

Another object of the present invention is to provide an optical element which can be handled in a simple manner.

Further, another object of the present invention is to provide an optical element or the like which can ensure a larger adhesive area.

To the end, according to the present invention, there is provided a method of producing an optical element, in which a material is press-molded by cooperating a first die and a second dies with each other so as to produce an optical element including a lens surface, characterized in that the first die having a shape which is different from the cross-sectional shape of the interior space of the second die with respect to the direction of fastening the dies, enters into the interior space of the second die so as to press-mold the material in order to form the lens surface, and the material is forced out from the periphery of the lens surface through a gap between the first and second dies so as to form protrusions during this press-molding.

It is noted here that the present invention can be characterized in that the first die is moved relative to the second die so as to carry out the press-molding. Further, it may be characterized in that leg portions which are used when the optical element is used are formed during the press-molding.

According to the another aspect of the present invention, there is provided a method of producing an optical element wherein a press-molding surface for press-molding a material so as to produce an optical element including a lens surface is in part formed therein with a non-press-molding zone where the material is not pressed during the press-molding, in order to force a part of the material under the press-molding, out from the non-press-molding zone.

It is noted here that the present invention characterized in that the above-mentioned non-press-molding zone is adjacent to a part of the press-molding surface which is adapted to carry out the press-molding of the lens surface.

According to further another aspect of the present invention, there is provided a mold assembly for molding an optical element, comprising a cavity die formed therein with a recess, a core die having a protruding part adapted to enter into the recess in the cavity die so as to press-mold an optical element including a lens surface, characterized in that the external shape of the protruding part of the core die is different from the cross-sectional shape of the recess of the cavity die, corresponding to the protruding part, and the outer peripheral surface of the protruding part and the inner peripheral surface of the recess define therebetween a space in which the material flows when the material is pressed by fastening the dies.

This aspect of the present invention is characterized in that the recess of the cavity die has a quadrate cross-sectional shape with respect to the die fastening direction of the protruding part of the core die within the recess, and the protruding part of the core die has a circular external shape. Further, the core die is characterized in that the protruding part is formed with an oblique surface in its pressing surface for pressing the material during press-molding.

Further, the present invention is characterized by the step of moving the core die, relative to the cavity dies so as to carry out the press-molding.

According to further another aspect of the present invention, there is provided a mold assembly for producing an optical element, characterized in that the cavity die has a surface defining the recess, which is formed in its part with a groove serving as a mark for the optical element.

This aspect of the present invention is characterized in that the groove is extended in the direction of fastening the dies. Further, it is characterized in that the recess of the cavity die has a quadrate cross-sectional shape with respect to the die fastening direction of the protruding part of the core die within the recess, and the protruding direction of the core die has a circular external shape.

According to further another aspect of the present invention, there is provided a mold for producing an optical element, characterized in that the recess of the cavity die has a polygonal cross-sectional shape with respect to the direction of fastening the protruding part of the core die, and further this polygonal shape has a reference side and a first and a second side, the longer the distance from the reference side, the shorter the inter-distance between the first and second side.

According to further another aspect of the present invention, there is provided an optical element having a prismatic shape body portion comprising a plurality of side surface parts and two bottom surface parts, a lens portion formed in either one of the bottom surface parts of the body portion, and protrusions which are each formed in the corner parts of the body portion, and which are protruded in the thicknesswise direction of the lens portion.

It is noted here that the present invention is characterized by the above-mentioned lens portion which is a convex lens portion, and the above-mentioned protrusions which are higher than the convex lens portion. Further, the body portion is characterized by including a bulged portion which is bulged out in the thicknesswise direction of the lens portion at the periphery of the lens portion, and in that the protrusions are protruded from the bulged portion. Further, there is characterized by the protrusions which are formed on both incident side and emergent side of the lens portion.

In view of the above-mentioned objects of the present invention, the optical element includes a mark which is formed in a side surface part of the body portion, and which can be externally recognized.

It is noted here that the present invention is characterized by the mark which is line-like, being extended in the direction of the optical axis of the lens portion. Further, it is characterized in that the mark is formed on the body portion, being protruded therefrom. Further, it is characterized in that the mark which is recessed in the above-mentioned leg portion.

In view of the above-mentioned objects, according to the present invention, there is provided an optical element characterized by comprising a lens portion, a body portion integrally incorporated with the lens portion and made of a material the same as that of the lens portion, a base surface formed in the body portion and serving as a led portion upon mounting of the body portion, and a first and a second side surface which are formed on the body portion so as to extend in the thicknesswise direction of the lens portion, the nearer both side surfaces approach the base surface, the longer the inter distance between the first and the second side surface.

It is noted here that the present invention is characterized by the body portion which is formed substantially in a trapezoidal shape, as viewed in the direction of the optical axis of the lens portion, the base surface and the first and the second side surfaces partly constituting the sides of the trapezoidal shape. Further, it is characterized by the body portion which is substantially formed in a triangular shape, as viewed in the direction of the optical axis of the lens portion, the base surface and the first and the second side surface partly constituting the sides of the triangular shape. Further, it is characterized in that the body portion which is formed substantially in a pentagonal shape, as viewed in the direction of the optical axis of the lens portion, the base surface and the first and the second side surface partly constituting the sides of the pentagonal shape.

According to further another aspect of the present invention, there is provided an optical element characterized in that one of the side surfaces of the body portion is the base surface serving as the leg portion upon mounting of the body portion, and in the case of setting those of the side surfaces of the body portion, which are adjacent to the base surface, as the first and second side surfaces, the angle included between the base surface and the first side surface is acute while the angle included in the base surface and the second side surface is acute.

Further, the present invention is characterized by the body portion which includes protrusions which are each formed in the corner parts thereof, and which are protruded in the direction of the lens portion, each of the corner parts of the body portion being rounded so as to have a circular curved surface.

According to further another aspect of the present invention, there is provided an optical element including a prismatic shape body having a plurality of side surfaces and two bottom surfaces, a lens portion formed in either one of the bottom surfaces of the body portion, protrusions which are each formed in the corner parts of the body portion around the lens portion, and which are protruded in the thicknesswise direction of the lens portion, and a mark which is formed in a part of the body portion, other than the lens portion, and which indicates the positional relationship between the body portion and the lens portion.

It is noted that the present invention is characterized by the mark which is formed in the upper surface part of the body portion, remote from the leg portion. Further, it is characterized in that the body portion has a flat part, the mark being formed in the flat part of the body portion. Further, it is characterized by the body portion which have a plurality of flat parts, the mark being formed in one of the flat parts of the body portion.

According to the present invention, there can be provided a method of producing an optical element with a high productivity.

Further, according to the present invention, there can be provided an optical element capable of ensuring a wider bonding area.

BEST MODE FOR IMPLEMENTING THE INVENTION

Explanation will be hereinbelow made of several embodiments of the present invention with reference to the accompanying drawings.

[First Embodiment]

FIG. 1 is a schematic perspective view which shows an external appearance of an optical element 1 in a first embodiment of the present invention. FIGS. 2A and 2B are longitudinal sectional views which show the optical element 1 shown in FIG. 1, that is, FIG. 2A is a sectional view along line IIA-IIA in FIG. 1, and FIG. 2B is a sectional view along line IIB-IIB in FIG. 1.

The optical element 1 shown in FIG. 1 incorporates a body portion (quadrate body portion) 11 having a substantially rectangular parallelepiped shape, a lens portion (incident side lens or a first lens portion) 12 having a curved shape lens surface 12a which is formed being protruded from one surface (upper surface) of the body portion 11, a flat part 13 formed in the one surface of the body portion 11, adjacent to the lens portion 12, and the protrusions (bulged portions) which are each formed at four corners of the one surface of the body portion 11, adjacent to the flat part 13.

Further, the optical element 1 incorporates a lens portion (an emergent side lens or a second lens portion) 15 having a curved shape lens surface 15a which is formed being protruded from another surface (lower surface) of the body portion 11 on the side remote from the lens surface 12a, a flat part 16 formed in the other surface of the body portion 11, adjacent to the lens portion 15, and protrusions 17 which are each formed at four corners of the other surface of the body portion 11, adjacent to the flat part 16.

In addition, the protrusions 14 are formed being protruded in a direction the same as the thicknesswise direction of the lens portion 12 (the direction of the optical axis), and are higher than the lens portion 12. In other words, the protrusions 14, 17 are located surrounding the lens portions 12, 15.

The body portion 11, the lens portions 12, 15, the flat parts 13, 16 and the protrusions 14, 17 of the optical element 1 are produced by integral molding with the use of dies, as will be explained later, and are made of glass. Although the manufacturing costs of glass lenses are higher than that of plastic lenses, the glass lenses can be used as lenses which require a high degree of accuracy.

The body portion 11 have four side surfaces (peripheral side surface) 11a, 11b, 11c, 11d. The side surface 11a is located on the side remote from the side surface 11c, and the side surface 11b is located on the side remote from the side surface 11d. Every one of the side surfaces 11 has a flat surface shape. The side surfaces 11a, 11c are formed being parallel with each other, and the inter-space distance between the side surfaces 11b, 11d (the external dimension) is set to a predetermined value. Further, the side surface 11b and the side surface 11d are formed being parallel with each other, and the inter-space distance between the side surface 11b and 11c (the external dimension) is set to a predetermined value.

The flat part 13 is formed being belt-like so as to be extended over the entire periphery of the edge part of the lens portion 12. Further, the protrusions 14 are formed at positions on the side of the flat part 13 which is remote from the lens portion 12. Similarly, the flat part 16 is formed being belt-like so as to be extended over the entire periphery of the edge part of the lens portion 15, and the protrusions 17 are formed at positions on the side of the flat part 16 which is remote from the lens portion 15.

It is noted here that the optical element 1 in this embodiment has the side surfaces 11a, 11b, 11c, 11d so as to have a shape which facilitate the setting of the optical element 1, and accordingly, the optical element 1 can be set only by locating the same on a flat surface which have been manufactured with a high degree of accuracy, without using any additional component. The optical element 1 having the above-mentioned shape is the so-called square or quadrate lens. In view of this configuration, the side surfaces 11a, 11b, 11c, 11d may serve as leg potions.

Further, the combination of the lens portion 12 and the lens portion 15 may be the so-called convex lens or convex-lens portion. Further, although the optical element 1 incorporates the body portion 11 and the lens portions 12, 15, as stated above, it may be considered, in another view point, that the optical element 1 incorporates the lens portions 12, 15, and the leg portions or flange portions extending from the lens portions 12, 15 in directions crossing the optical axis.

The optical element 1 in this embodiment incorporate the four protrusions 14 protruding on the lens part 12 side, in the same direction as that of the lens portion 12. Every one of these four protrusions 14 is formed being higher than the lens portion 12. Accordingly, the lens portion 12 can be protected by the protrusions 14. In more specific explanation, it is possible to prevent the lens portion 12 from being scratched even though the optical element 1 is accidentally rolled down during setting thereof.

Further, it is possible to prevent the optical element from making contact with another component so as to be damaged during setting thereof. Moreover, should the thickness D (refer to FIG. 12A) of the side surfaces 11a, 11b, 11c, 11d of the body portion 11 of the optical element 1 be small, the optical element 1 would be unstable when it is set at any of the four side surfaces 11a, 11b, 11c, 11d. Even in this case, if the optical element 1 is set with the use of any one of the protrusions 14 formed at the corners of the square lens, the optical element 1 can become stable, and as well, the lens portion 12 can be protected by the four protrusions 14, thereby, it is possible to prevent the lens portion 12 from being scratched.

Thus, since the optical element 1 incorporates the protrusions 14, it may have a function of protecting the lens portion 12. This function would be more effective if the protrusions 14 would be higher than the lens portion 12. However, with the protrusions having a height which is more or less high, the above-mentioned function can be in part materialized even though the protrusions 14 are not higher than the lens portion 12.

Similarly, the optical element 1 incorporates the protrusions 17 which are protruded in the same direction as that of the lens portion 12, and accordingly, it can be said that the protrusions have a function of protecting the lens portion 15.

It is noted that the optical element 1 in this embodiment is a square lens having a body portion 11 which is quadrangular. However, it may have another polygonal shape such as a triangular shape or a pentagonal shape.

FIG. 3 is a view for explaining an optical coupling device 50 utilizing the optical element 1 in this embodiment. It is noted that the optical element 1 in this embodiment may be used in another device in addition to the optical coupling device 50, or an equipments, including a transceiver.

The optical coupling device 50 shown in FIG. 3 incorporates the optical element 1, a flat bench 51 on which the optical element 1 is mounted being bonded thereto through the intermediary of the side surface 11a, a laser diode 52 for allowing its output light beam to be incident upon the optical element 1, a block member 53 for allowing the output light from the laser diode 52 to be coincident with the height of the optical axis of the optical element 1, and an optical fiber which is not shown and onto which the light beam emerged from the optical element 1 is incident. The block member 53 is set being adjacent to the optical element 1, and the laser diode 52 is attached to the block member 53.

Further, the output light beam from the laser diode 52 is refracted in the lens portion 12 and the lens portion 15 of the optical element 1, and thereafter, is incident upon the light incident face of the optical fiber which is not shown.

It is noted that the optical element 1 in this embodiment incorporates the four protrusions 14 which increase the areas of the side surfaces 11a, 11b, 11c, 11d. Thus, the bonding area of the optical element 1 can be increased when the optical element 1 is bonded onto the flat bench 51 with the use of an adhesive, Thus the bonding can be more firmly made.

Next, explanation will be made of a mold assembly (a mold assembly for forming an optical element) 100 which is used for producing the optical element 1.

FIG. 4 is a plan view which shows the mold assembly 100.

The mold assembly 100 shown in FIG. 4 is adapted to be used for producing the optical element 1 shown in FIG. 1. The mold assembly 100 incorporates a sleeve (a quadrate sleeve, a second die or a cavity die) 110 which is a die for forming the peripheral side surfaces of the optical element 1, a cope mold (a first die or a core die) 120 located on the upper side, and a drag mold (a second die, a cavity die) 130 located on the lower side. In more specific explanation, the interior space (a recess in the cavity die) S (refer to FIG. 5A) is defined by the sleeve 110 and the drag mold 130, and upon die fastening, the cope mold 120 is moved in a die fastening direction (refer to FIG. 5A) and is then introduced into the interior space S. Further, in the cooperation among the sleeve 110, the cope mold 120 and the drag die 130, a preform is press-molded in order to produce the optical element 1.

The sleeve 110 is composed of a plurality of dies 111, 112, 113, 114 which are arranged at the peripheral side surfaces thereof, and which define the inner wall surface (the inner peripheral surface of the recess in the cavity die) 110a (refer to FIG. 5a) of the sleeve 110, and which also define a space having a quadrate shape in a cross-section (which corresponds to the protruding part of the core die, that is, an aperture, and which will be sometimes referred simply to "cross-section") with respect to the direction of die fastening. Further, the cope mold 120 has a round shape part (the protruding part of the core die) 121 (refer to FIG. 5A) which is formed in a rounded external shape having dimensions which allow the round shape part to be accommodated in the space in the sleeve 110. Further, the drag mold 130 has a round shape part 131 (refer to FIG. 5A) which is formed in a rounded external shape having dimensions which allow the round shape part to be accommodated in the space in the sleeve 110. The round shape part 121 of the cope mold 120 is arranged being opposed to the round shape part 131 of the drag mold 130.

As stated hereinbelow, during molding, a preform (an optical blank for an optical element, which is softened by heating, which will be sometimes referred simply to "blank") and which is set between the round shape part 121 of the cope mold 120 and the round shape part 131 of the drag mold 120 is pressed by both round shape parts 121, 131 therebetween in order to form the optical element 1. It is noted that the sleeve 110 may be called as a die for forming the peripheral side surfaces of the molding product (optical element 1). Further, the cope mold 120 may be called as a die for forming the upper surface (one surface) of the molding product, and the drag mold 130 may be called as a die for forming the lower surface (the other surface) of the molding die.

It is noted here that the space in the sleeve 110 has a quadrate cross-sectional shape while the round shape parts 121, 131 which are located in the space in the sleeve 110 have rounded shapes, that is, both shapes are different from each other in their shapes. Accordingly, during the molding of the optical element 1, the preform not only has parts which are directly pressed by the round shape parts 121, 131, but also has parts which are not directly pressed. In a more specific explanation, during the molding of the optical element 1, the round shape part 121 of the cope mold 120 and the round shape part 131 of the drag mold 130 press directly to the center pars of the perform as viewed in the planewise direction of the preform (in the direction parallel to the sheet surface of the figure) while their round shape parts 121, 131 do not directly press the four corner parts (peripheral part) of the preform in the planewise direction thereof, that is, the four corner parts are not directly pressed by the round shape parts 121, 131.

As stated above, in the mold assembly 100 in this embodiment, the space on the sleeve 110 has a quadrate cross-sectional shape while the cope mold 120 and the drag mold 130 which are located in the space in the sleeve 110 incorporate the round shape parts 121, 131. Thus, the contact areas between the sleeve 110 and the round shape parts 121, 131 are small, that is, they are made into the so-called point-contact with each other, resulting in high workability and molding stability. That is, during the assembly of the mold assembly 100, the positioning of the round shape part 121 of the cope mold 120 and the round shape part 131 of the drag mold 130 in the sleeve 110 can be facilitated therebetween. More specifically, in order that the sleeve 110 and the round shape 121 of the cope mold 120 are positioned, relative to each other, it is only required to adjust the positional relationship therebetween. Accordingly, the adjustment to their postures with respect to each other is not required, or the working for the adjustment is simple even though the adjustment is required. The same can be said for positioning the sleeve 110 and the round shape part 131 of the drag mold 130, relative to each other. Further, the same can also be said for positioning the round shape part 121 of the cope mold 120 and the round shape part 131 of the drag mold 130, relative to each other.

Should two parts formed in the shape corresponding to the cross-sectional shape of the space in the sleeve 110 be used being opposed to each other in the space, instead of the round shape parts 121, 131, not only the adjustment to the relative postures between the two quadrate shape parts in the space in the sleeve 110, but also adjustment to the relative postures between the sleeve 110 and the two quadrate shape part would be required. Thus, the horizontal angular adjustment would be required for three components in total, that is, the sleeve 110 and the two quadrate shape parts. Should the angular adjustment be made without a high degree of accuracy, a molding product with a high quality cannot be produced. Further, the angular adjustment with a high degree of accuracy can not be readily made. Thus, in the case of using such quadrate parts, the workability becomes lower, in comparison with mold assembly 100 in this embodiment.

It is noted that the working for positioning an quadrate shape recess and a round shape protrusion, relative to each other, is simple in comparison with the working for positioning a quadrate shape recess and a quadrate shape protrusion, relative to each other. Further, the working for positioning two round shape protruding parts, relative to each other, is simple in comparison with the working for positioning two quadrate shape protrusions, relative to each other. In more detailed explanation, if no orientation is required between a quadrate shape recess and a round shape protrusion, no adjustment to their postures is required, relative to each other. Further, if no orientation is required between two round shape protrusions, no adjustment to their postures is required, relative to each other.

Further, in this embodiment, the mold assembly 100 is configured so as to form the optical element 1 under compression between the round shape parts 121, 131 within the space in the sleeve 110. That is, the relative movement (die fastening) between the cope mold 120 and the drag mold 130 is carried out before and after the molding of the optical element 1. In the case of the provision of a quadrate shape part formed into a quadrate shape which corresponds to the quadrate cross-sectional shape of the space in the sleeve 110, the sleeve 110 and the quadrate shape part are made into surface contact with each other in their adjacent parts, and accordingly, an appropriate clearance should be set in order to prevent occurrence of galling therebetween during their movement. Thus, the clearance should be taken into consideration for the design, the assembling and the maintenance of the mold assembly 100, which are laborious and time-consuming so as to incur expensive costs. Further, due to the occurrence of galling and biting therebetween which are though more or less, it inevitably causes the dies to have a short service life.

On the contrary, in this embodiment, either one or both of the round shape parts 121, 131 can be moved in the space which has a quadrate cross-sectional shape, in the sleeve 110, and accordingly, the occurrence of galling and biting between the quadrate shape parts 121, 131 and the sleeve 110 can be prevented with lower costs. Thus, cost reduction can be made, and further, the degree of accuracy for the dies can be enhanced. Further, the service life of the dies can be prolonged. It is noted here that the manufacture of a round shape part is simpler than that of a quadrate shape part in view of the manufacturing costs of dies, and accordingly, the manufacturing costs of the dies can also be reduced.

FIGS. 5A, 5B, 6A and 6B are views for explaining the method of manufacturing the optical element 1 with the use of the mold assembly 100. FIGS. 5A and 5B show a condition before the optical element 1 is molded, and FIGS. 6A and 6B show the condition that the optical element 1 has been molded. In more detail, FIGS. 5A and 6A are longitudinal sectional views, corresponding to line A-A in FIG. 4, which show the mold assembly 100, and FIGS. 5B and 6B are longitudinal sectional views, corresponding to along line B-B in FIG. 4, which show the mold assembly 100.

As shown in FIGS. 5A to 6B, the round shape part 121 of the cope mold 120 is formed therein with a concave curved surface part having a shape corresponding to the lens portion 12 of the optical element 1, (which has a role of press-molding the lens surface 12a), and an end surface part 123 having a shape for molding the flat part 13 of the optical element 1. Further, the round shape part 121 is formed at its edge part with a chamfering part which is not shown, over the entire periphery thereof. That is, the cope mold 120 has the concave curved surface part 122 and the end surface part 123 which serve as pressing surfaces.

Further, the round shape part 131 of the drag mold 130 is formed therein with a concave curved surface (the part having a role of press-molding the lens surface 15a, that is, the part for transferring the lens surface 15a) 132 having a shape for molding the lens part 15 of the optical element 1, and an end surface part 133 having a shape for molding (transferring) the flat part 16 of the optical element 1. Further, the edge part of the round shape part 131 is formed with a chamferred part which is not shown, over the entire periphery thereof.

The optical element 1 is molded in a cavity defined by the inner wall surface 110a of the sleeve 110, the round shape part 121 of the cope mold 120 and the round shape part 131 of the drag mold 130. In other words, the press-molding surface is constituted by the concave curved surface part 122 and the end surface part 123 of the cope mold 120, the concave curved surface 132 and the end surface part 132 of the drag mold 130, and the inner wall surface 110a of the sleeve 110. Further, the press-molding surface is formed therein with gaps where no press-molding is carried out, which will be detailed later.

It is noted here that the sleeve 110 and drag mold 130 are those on the stationary side. That is, the cope mold 120 is arranged so as to be elevatable by an elevating means which is not shown. Thus, the cope mold 120 can be moved upward and downward, relative to the sleeve 110 and the drag mold 130.

It is noted that the cope mold is the one on the moving side while the drag mold 130 is the one on the stationary side in this embodiment. However, there may be considered the cope mold 120 which is the one on the stationary side and the drag mold 131 which is the one on the moving side.

Next, explanation will be made of a method of producing the optical element 1 with the use of the mold assembly 100.

Referring to FIGS. 5A and 5B, when the cope mold 120 is moved upward so as to open the molds, a preform is charged by a predetermined amount into the mold assembly 110. That is, the preform is carried on the round shape part 131 of the drag mold 130.

Thereafter, when the cope mold 120 is moved downward for closing the molds, the preform carried on the round shape part 131 of the cope mold 130 is being pressed.

Then, as shown in FIGS. 6a and 6B, when the cope mold 120 is moved to a predetermined position (mold fastening position), the preform is molded into the optical element 1 by means of the inner wall surface 110a of the sleeve 110, the round shape part 121 of the cope mold 120 and the round shape part 131 of the drag mold 130.

It is noted here that the inner wall surface 110a of the sleeve 110 and the round shape parts 121, 131 are made into point contact with each other. In other words, there are presented gap parts (gaps between the first die and the second die, non-pressing zones or a space where the material flows) 140 (refer to FIG. 4 or FIG. 5) where the outer peripheral surfaces 121a, 131a of the round shape parts 121, 131 are separated from the inner wall surface 110a by a relatively large degree so as to define gaps, in comparison with the other parts. These gap parts 140 are located at four corners. In these gap parts, the preform is prevented from being pressed directly by the round shape part 1221 of the cope mold 120 and the round shape part 131 of the drag mold 130. It is noted that the inner wall surface 11a of the sleeve 110 and the outer peripheral surfaces 121a, 131 of the round shape part 121 and the round shape part 131 are separated from each other by a largest degree on the diagonal lines of the cross-section of the inner wall surface 11a of the sleeve 110, that is, the gap parts 140 become largest on the diagonal lines.

During the molding, the center part of the preform is directly pressed by the round shape parts 121, 131 so as to press-mold the perform. That is, the lens portions 12, 15 and the flat parts 13, 16 (refer to FIG. 2) of the optical element 1 are press-molded by the round shape parts 121, 131, and the four side surfaces 11a, 11b, 11c, 11d of the optical element 1 are press-molded by the inner wall surface 110a of the sleeve 110.

Further, during the press-molding, a part of the perform flows in gap parts 140 defined between the outer peripheral surfaces 121a, 131a of the round shape parts 121, 131 and the inner wall surface 11a of the sleeve 110. These gap parts 140 are not pressurized directly by the round shape parts 121, 131, and accordingly, the perform which flows in part in the gap parts 140 is regulated by the inner wall surface 110a of the sleeve 110 so as to flow in the protruding direction (upward direction) of the lens portion 12 along the inner wall surface 11a on the cope mold 120 side, but flow in the protruding direction (downward direction) of the lens portion 1 along the inner peripheral surface 110a of the sleeve 110 on the drag mold 130 side. As a result, the preform is in part bulged out in the gap parts 140 (refer to FIG. 5B) so as to form the protrusions 14, 17. Thus, the gap parts 140 have a role of relief margin during the press-molding. With this configuration, even though the bulk of the preform is not even, the optical element 1 can be molded with no problems. Thus, the tolerance of the blocks of preforms to be used for the press-molding could be relaxed, thereby it is possible to enhance the productivity.

Although explanation has been made of the optical element 1 in this embodiment together with the method of producing thereof, there may be considered various variant forms thereof, in addition to the embodiment as stated above.

FIGS. 7A, 7B and 7C are longitudinal sectional views which show an optical embodiment 1M in a variant form of this embodiment, that is, FIG. 7A is a sectional view similar to FIG. 2, and FIG. 7B is similar to FIG. 2B.

The optical element 1M shown in FIGS. 7A and 7B, includes a substantially parallelepiped body portion 11 formed with two lens portions 12, 15, similar to the optical element 1 shown in FIGS. 2A and 2B, and further includes, on the lens portion 12 side, a flat part 13 and protrusions 14. Meanwhile, different from the optical element 1 shown in FIGS. 2A and 2B, the optical element 1 only has, on the lens portion 15 side, a flat part 16M. That is, the optical element 1M does not have protrusions corresponding to the protrusions 17 which are formed on the optical element 1, on the lens portion 15 side of the optical element 1M.

Thus, even with the optical element 1M which has the protrusions 14 formed on only one side thereof, the optical element 1M has the function of protection for the lens portion 12, as stated above. In more detailed explanation, the configuration of the optical element 1M is effective in the case that the optical element 1 having the protrusions 14, 17 as shown in FIGS. 2A and 2B cannot be used in view of the installation space on the optical equipment side which uses the optical element.

FIG. 8 is a view for explaining a mold assembly 100M adapted to be used for producing the optical element 1M, which is a longitudinal sectional view corresponding to the longitudinal sectional view long line B-B in FIG. 4, similar to FIG. 6B.

As shown in FIG. 8, the mold assembly 100M is composed of a sleeve 110 which is a die for defining peripheral side surfaces, a cope mode 120 arranged on the upper side, and a drag mold 130M arranged on the lower side. That is, the mold assembly 100M has the basic configuration the same as that of the mold assembly 100 shown in FIG. 6B, except incorporating the drag mold 130M instead of the drag mold 130.

The drag mold 130M has a quadrate shape part 131M having a quadrate shape corresponding to the cross-section of the space in the sleeve 110.

Accordingly, there are presented gap parts 140 (refer to FIG. 5B) on the cope mold 120 side, but no gap parts corresponding to the gap parts 140 on the drag mold 130M side. Thus, the preform is not bulged out in part on the drag mold 130M side during the molding. It is noted that the cope mold 120 of the mold assembly 100M is movable but the drag mold 130M thereof is stationary.

It is noted here that since cope mold 120 has the round shape part 121 in this mold assembly 100M, the relative positioning between the round shape part 121 and the sleeve 110 can be facilitated during the assembly or the maintenance thereof. Further, since the cope mold 120 is the one which is on the movable side, it is possible to prevent occurrence of galling and biting between the cope mold 120 and the sleeve 110.

In detailed explanation, since the mold assembly 100M has gap parts 140 on the cope mold 120 side, the preform can be accommodated therein even though the bulk of the perform is uneven, thereby it is possible to relax the tolerance of the perform and to enhance the workability.

[Third Embodiment]

FIG. 9 is a schematic perspective view which shows the external appearance of an optical element 2 in a second embodiment of the present invention. FIGS. 10A and 10B are longitudinal sectional views which show the optical element 2 shown in FIG. 9, that is, FIG. 10A is a sectional view along line XA-XA in FIG. 9, and FIG. 10B is a sectional view along line XB-XB in FIG. 9.

The optical element 2 shown in FIG. 9, is composed of a substantially parallelepiped body portion 21, a lens portion (incident side lens, a first lens portion) 22 having a curved lens surface (22a) which is formed so as to be protruded from one surface (upper surface) of the body portion 21, and a bank portion 23 which is formed adjacent to the lens portion 22 on the one surface of the body portion 21. This bank portion 23 is formed so as to be protruded in the same direction as the direction in which the lens portion 22 is protruded, and is extended along the edge of the lens portion 22 over the entire periphery of the lens portion 22. Further, the bank portion 23 is formed so as to be higher than that of the lens portion 22. In detailed explanation, the bank portion 23 has a slope part (bulged part) 23a which is inclined from the edge of the lens portion 23 in the direction in which the lens portion 22 is protruded, protrusions 23b which are adjacent to the slope part 23a and which are formed respectively at four corners of the one surface of the body portion 21.

Further, the optical element 2 is composed of a lens portion (emergent side lens, second lens portion) 25 having a curved lens surface 25a which is formed so as to be protruded from the other surface (the lower surface) of the body portion 21 on the side remote from the lens surface 22a, and a bank portion 26 which is formed adjacent to the lens portion 25 on the other surface of the body portion 21. This bank portion 26 is formed so as to be protruded in the same direction as the direction in which the lens portion 25 is protruded, and is formed so as to be extended along the edge of the lens portion 25 over the entire periphery of the lens portion 25. Further, the bank portion 26 is formed so as to be higher than the lens portion 25. In detailed explanation, the bank portion 26 has a slope part 26a which is inclined from the edge of the lens portion 25 in the direction in which the lens portion 25 is protruded, and protrusions 26b which are adjacent to the slope part 26a and which are formed respectively at four corners of the other surface of the body portion 21.

It is noted that the body portion 21, the lens portions 22, 25 and the bank portions 23, 26 of the optical element 2 are adapted be integrally molded with the use of dies, similar to the optical element 1 in the first embodiment as stated above, and is made of glass or plastic.

The body portion 21 has four side surfaces 21a, 21b, 21c, 21d. The side surface 21a located, opposite to the side surface 21c, and the side surface 21b is located, opposite to the side surface 21d.

Further, every of the four surfaces 21a, 21b, 21c, 21d is planar. There are formed the side surface 21a and the side surface 21c in parallel with each other. The side surfaces 21a and the side surface 21c are formed so as to have a predetermined inter distance therebetween, that is, they defines an external shape having predetermined dimensions. Further, there are formed the side surface 21b and the side surface 21d in parallel with each other. Further, the side surface 2b and the side surface 2d are formed so as to have a predetermined inter distance therebetween, that is, they define an external shape having predetermined dimensions. In detailed explanation, the side surfaces 21a, 21b, 21c, 21d define the thickness D of the optical element 1 which is one of factors influencing the optical characteristic of the optical element 2.

It is noted that the optical element 2 in this embodiment have the side surfaces 21a, 21b, 21c, 21d which can facilitate the setting of the optical element 2, similar to the optical element 1 in the first embodiment.

Since the optical element 2 in this embodiment has the bank portion 23 which is formed so as to be protruded in the same direction as the direction of the lens portion 22 and to be higher than the lens portion 22, the lens portion 22 can be protected by the bank portion 23. It is noted here that the optical element 1 is adapted to protect the lens portion 22 by means of the bank portion 23 formed around the lens portion 22. That is, it is configured so as to cause the periphery of the lens portion 22 to be bulged outward. Thus, the optical element 2 can surely protect the lens portion 22 in comparison with the optical element 1 stated in the first embodiment in which the lens portion 12 is protected by the protrusions 14 formed at four corners of the optical element 1. Further, the strength of the bank portion 23 which serves as a protecting member, is higher than that of the protrusions 14 which serves as protecting members in the first embodiment. Further, since the strength of the bank portion 23 is increased, it is possible to enhance the strength of the optical element 2 in its entirety.

Although explanation has been made of the lens portion 22 and the bank portion 23, the same can be said as to the lens portion 25 and the bank portion 26 which are protruded in the same direction as the direction of the lens portion 22.

FIGS. 11A, 11B, 12A and 12B are views for explaining a method of producing the optical element 2 with the use of a mold assembly 200. FIGS. 11A and 11B show the condition that the optical element 2 has not yet been molded, and FIG. 12A and FIG. 12B show the condition that the optical element 2 has been molded.

In detailed explanation, FIG. 11A and FIG. 12A are sectional views corresponding to line A-A in FIG. 4 which show the mold assembly 200, and FIGS. 11B and 12B are views corresponding to line B-B in FIG. 4.

It is noted that the lower-order double figures of reference numerals used in the mold assembly 200 are the same as that of the lower-order figures of reference numerals used to denote the parts of the mold assembly 100. That is, the mold assembly 200 shown in FIGS. 11A to 12B, is incorporated with a sleeve 210 which is a die for constituting the peripheral side surfaces, a cope mold 220 arranged on the upper side, and a drag mold 230 arranged on the lower side. Further, the sleeve 210 is composed of a plurality of dies 211, 212, 213, 214 which are arranged at the peripheral side surfaces. Further, the cope mold 220 has a round shape part 221 (refer to FIG. 11A) having a round shape appearance with dimensions which allow the round shape part 221 to be accommodated in the space in the sleeve 210. Further, the drag mold 230 has a round shape part 231 (refer to FIG. 11A) which has a round shape with dimensions which allow the round shape part 231 to be accommodated in the space in the sleeve 210.

As shown in FIGS. 11A to 12B, the round shape part 221 of the cope mold 220 is formed therein with a concave curved surface part 222 having a shape corresponding to the lens portion 22 of the optical element 2, and a taper-like end surface part (slope surface) 223 corresponding to the slope part 23a of the optical element 2. That is, the cope mold 220 has a concave curved surface part 222 and the end surface part 223 serving as pressing surfaces.

Further, the round shape part 231 of the drag mold 200 is formed therein with a concave curved surface 232 corresponding to the lens portion 25 of the optical element 2, and a taper-like end surface part 233 corresponding to the slope part 26a of the optical element 2. Further, the optical element 2 is press-molded by the press-molding surfaces which are defined by the inner wall surface 210a of the sleeve 210, the round shape part 221 of the cope mold 210 and the round shape part 231 of the drag mold 230.

It is noted here that the sleeve 220 and the drag mold 230 are those set on the stationary side, and the cope mold 220 is the one set on the movable side. However, there may be set the cope mold 220 on the stationary side and the drag mold 230 on the movable side.

Next, explanation will be made of the method of manufacturing the optical element 2 with the use of the mold assembly 200.

As shown in FIGS. 11A and 11B, the cope mold 220 is moved upward in order to set a preform having a predetermined bulk, on the round shape part 231 of the drag mold 230. Thereafter, the cope mold 220 is moved downward in order to press the preform carried on the round shape part 231 of the drag mold 230.

Then, as shown in FIGS. 12A and 12B, when the cope mold 220 is moved to a predetermined position, the preform is molded into the optical element 2 by the inner wall surface 210a of the sleeve 210, the round shape part 221 of the cope mold 220 and the round shape part 231 of the drag mold 230.

It is noted here that the inner wall surface 210a of the sleeve 210 are made into point-contact with the round shape parts 221, 231 in the mold assembly 200, similar to the mold assembly 100, and the outer peripheral surfaces of the round shape parts 221, 231 are spaced from the inner wall surface 210a so as to form gap parts 240 (refer to FIG. 11B) therebetween which define gaps therein. These gap pars 240 are located at the four corners of the sleeve 210 where the perform is not directly pressed by the round shape part 221 of the cope mold 220 and the round shape part 231 of the cope mold 230.

In more derailed explanation, when the center part of the preform is directly pressed by the round shape parts, 221, 231, the preform is formed therein with the lens portions 22, 25 by the round shape parts 221, 231 together with the slope parts 23a, 26a. Further, the preform flows, in part, into the gap parts 240 where it is not directly pressed, that is, the preform is bulged out so as to form the protrusions 23b, 26b. Thus, the bank portions 23, 26 are also molded during the molding of the lens portions 22, 25.

Even with the mold assembly 200, similar to the mold assembly 100, the optical element 2 can be molded with no problems even though the bulk of the preform is uneven, and accordingly, the management of the preform volume could become easier. Thereby, it is possible to improve the productivity.

There may be considered a variant form of this embodiment with respect to the optical element 2 and the method of producing thereof.

FIGS. 13A, 13B are longitudinal sectional views which show an optical element 2M in a variant form of this embodiment, that is, FIG. 13A is a sectional view corresponding to FIG. 10A, and FIG. 13B is a sectional view corresponding to FIG. 10B.

Similar to the optical element 2 shown in FIG. 10a and 10b, the optical element 2M shown in FIGS. 13A and 13B, is incorporated with a body portion 21, and two lens portions 22, 25 formed on the body portion 21, and is also incorporated therein with a bank portion 23 composed of a slope part 23a and the protrusion 23B. Meanwhile, different from the optical element 2 shown in FIGS. 10A, 10B, the optical element 2M only has a flat part 26M on the lens portion 25 side. That is, the optical element 2M does not have a portion which corresponds to the bank portion 26 of the optical element 2 on the lens portion 25 side.

Thus, even the optical element 2 which is formed therein with the bank portion 23 alone can also exhibit the function for protecting the lens portion 22, that is, it is bulged up in its entirety. In more detailed explanation, the optical element 2M has an effective configuration in the case that the optical element 2 incorporating the protrusions 23b, 26b as shown in FIGS. 10A, 10B cannot be used due to the installation space of an optical equipment which uses the optical element.

It is noted here that the configuration of a mold assembly 200M which is used for producing the optical element 2, can be materialized by the combination between the mold assembly 100M which has been explained with reference to FIG. 8 and the mold assembly 200 which has been explained with reference to FIGS. 11A to 12B, and accordingly, the explanation thereto will be abbreviated.

[Third Embodiment]

FIG. 14 is a perspective view which shows the external appearance of an optical element 1 in a third embodiment of the present invention. Further, FIGS. 15A to 15C are views which shows an projection of the optical element 1 shown in FIG. 14, that is, FIG. 15A is a front view, FIG. 15B is a rear view and FIG. 15C is a plan view. Further, FIG. 16A and FIG. 16B are longitudinal sectional views which show the optical element 1 shown in FIG. 14, that is, FIG. 16A is a sectional view along line XVIA-XVIA in FIG. 15A and FIG. 15B is a sectional view along line XVIB-XVIB in FIG. 15A.

The optical element 1 shown in FIGS. 14 to 16B is composed of, similar to the first embodiment, a substantially parallelepiped body portion (quadrate body portion) 11, a lens portion (an incident side lens, a first lens portion) 12 having a lens surface 12a of a curved surface shape, which are formed on one surface (front side surface) of the body portion 11 so as to be protruded from the surface thereof, a flat part 13 which is formed adjacent to the lens portion 12 in the one surface of the body portion 11, protrusions (bulged portions) 14 which are formed on the one surface at the four corners thereof, and a slope part 15 located between the flat part 13 and the protrusions 14. Further, a mark (alignment mark) 2 which is not provided in the first embodiment, is formed in the upper surface 11A of the body portion 11. This mark 2 is line-like, extending along the direction of the optical axis of the lens portions 12, 15. Further, this mark 2 is formed so as to be projected from the upper surface 11a.

It is noted here that the optical element 1 has the upper surface 11a, side surfaces 11b, 11c and the bottom surface 11d, and accordingly, the setting thereof can be facilitated, that is, it can be set only by locating it on a surface (mounting surface) of a member which has been produced with a high degree of accuracy, without using any additional component. There is used an adhesive or the like for securing the optical element 1, on the lower surface (bonding surface). The optical element having the above-mentioned configuration is sometimes referred to "quadrate lens", "quadrate shape lens" or "square lens". In this configuration, it may be said that the upper surface 1A, the side surfaces 11b, 11C, and the bottom surface 11d have a role of leg portions. That is, either one of the upper surface 11a, the side surfaces 11b, 11c and the bottom surface 11d of the optical element 1 may be used as a bonding surface.

In this connection, since the ridge-like mark 2 is formed on the upper surface 11a, if a recess-like groove for receiving the mark 2 is formed in the mounting surface on which the optical element 1 is mounted, the upper surface 11a can be used as the bonding surface. Further, although the mark 2 in this embodiment, has a ridge-like shape, it may be formed in a recess-like (groove-like) shape. Further, this mark 2 may be formed by an ink or the like.

Further, although the optical element 1 in this embodiment is a square lens having the body portion 11 which has a quadrangle shape, the optical element may have the body portion which has a polygonal shape such as a triangle, or a pentagon, in addition to the quadrangle shape.

Next, explanation will be made of a mold assembly (for molding an optical element) 1 which is used for producing the optical element 1.

Similar to the first embodiment, a die 113 among dies 111 to 114 which constitute the sleeve 110 has at least one groove pat 1131 for forming the mark 2. This groove part 1131 has a V-like cross-sectional shape, and is extended in the direction perpendicular to the sheet surface of FIG. 4 (refer to 18A and FIG. 19A).

FIGS. 18A, 18B, 19A and 19B are views for explaining a method of producing the optical element 1 with the use of the mold assembly 100. FIGS. 18A and 18b are views for explaining a condition in which the optical element 1 has not yet been molded, and FIGS. 19a and 19b are views which show a condition in which the optical element 1 has been molded. In detailed explanation, FIGS. 18A and 19A are longitudinal sectional views which show the mold assembly 100, corresponding to line XVIIIA-XVIIIA in FIG. 17, and FIGS. 18B and 19B are longitudinal sectional views which show the mold assembly, corresponding to line XVIIIB-XVIIIB in FIG. 17. Different from the first embodiment, there is shown the groove part 1131 in the section of the die.

Next, explanation will be made of the method of producing the optical element 1 with the use of the mold assembly 100.

As shown in FIGS. 18A and 18B, during the die opening in which the cope mold 120 is moved upward, a preform having a predetermined bulk is charged into the mold assembly 100. That is, the preform is set on the round shape part 131 of the drag mold 130. Thereafter, the perform set on the round shape part 131 of the drag mold 130 is gradually pressed during the die-fastening in which the cope mold is moved downward.

As shown in FIGS. 19A and 19B, after the cope mold 120 is further moved to a predetermined position (die-fastening position), the preform is molded into the optical element 1 by the inner wall surface 110 of the sleeve 110, the round shape part 121 of the cope mold 121 and the round shape part 131 of the drag mold 130. It is noted that the preform is forced into the groove part 1131 formed in the sleeve 110, and accordingly, the mark 2 is integrally incorporated with the optical element 1.

As stated above, it is noted here that the round shape part 121 of the cope mold 120 and the round shape part 131 of the drag mold 130 are made into point-contact with the inner wall surface 110a of the sleeve 110. In other words, there are presented gap parts (gaps between the first die and the second die, no pressing zones, spaces in which the material flows) 140 (refer to FIG. 17 or FIG. 18B) where the round shape parts 121, 131 are greatly spaced from the inner wall surface 110 in comparison with the remainder parts thereof so as to define gaps therebetween. These gap parts 140 are located at the four corners (corner parts) of the sleeve 110. Further, in the gap parts 140, the preform is not directly pressed by the round shape part 121 of the cope mold 120 and the round shape part 131 of the cope mold 130 during the molding. It is noted that the inner peripheral surface 110a and outer peripheral surfaces 121a, 131a of the round shape parts 121, 131 are spaced from each other on the diagonal lines of the cross-section of the inner wall surface 110a of the sleeve 110 by a furthest distance, and accordingly, the gap parts 140 becomes largest.

During the molding, when the center part of the preform is directly pressed by the round shape parts 121, 131, the preform is press-molded into the optical element 1. That is, the lens portions 12, 16, the flat parts 13, 17 and the slope portions 15, 19 (refer to FIG. 15A and FIG. 15B or FIG. 16A and FIG. 16B) of the optical element 1 are press-molded by the round shape parts 121, 131. Further, the upper surface 11a, the side surfaces 11b, 11c and the bottom surface 11d of the optical element 1 are press-molded by the inner wall surface 110a of the sleeve 110.

Further, during the press-molding, the preform flows in part into the gap parts 140 located between the outer peripheral surfaces 121a, 131a of the round shape parts 121, 131 and the inner wall surface 11a of the sleeve 110. These gap parts 140 are not pressurized directly by the round shape parts 121, 131, and accordingly, the preform having flown into the gap parts 140 are regulated by the inner wall surface 110a of the sleeve 110 so as to flow in the protruding (upward) direction of the lens portion 12 along the inner peripheral surface 110a on the cope mold 120 side, and to flow in the protruding direction of the lens portion 16 along the inner peripheral surface 110a on the drag mold 130 side. As a result, in the gap parts 140 (refer to 18B), the preform is in part bulged out so as to form the protrusions 14, 18. Thus, the gap parts 140 have a role of a relief margin for the preform during the molding. Thus, the molding can be made with no problems, even though the bulk of the preform is uneven. Thus, the tolerance of the bulks of preforms to be used for the molding could be relaxed, thereby it is possible to enhance the workability.

FIG. 20 is a view for explaining process steps for forming the groove part 1131 in the sleeve 110M which constitutes a part of the mold assembly 100. It is noted that the sleeve 110M shown in FIG. 7 is constituted by one and the same die 113M so as to be different from the sleeve 110 which is shown in FIG. 17 and which is composed of a plurality of dies 111 to 114.

The die 113M is formed therein with a through-hole 1132M having a quadrangular shape so as to define the inner wall surface 110a. Thereafter, a tool 200 is set in the through-hole 1132M. In detailed explanation, the tool 200 is set so as to be slightly spaced from the inner wall surface 110 of the sleeve 110M. This tool 200 has a blade part 201 for forming the groove part 1131. Then, the tool 200 is reciprocated (in the direction perpendicular to the sheet surface of FIG. 20) within the through-hole 1132M by a drive mechanism which is not shown, and accordingly, the blade part 201 of the tool 200 gradually forms the groove part 1131. It is noted that the cross-sectional shape of the groove part 1131 in this embodiment is V-like in this embodiment. However, the groove part 1131 may have any other cross-sectional shape such as a trapezoidal cross-sectional shape or a semicircular cross-sectional shape.

FIG. 21 is a view for explaining an optical coupling unit 50 which utilizes the optical element in this embodiment. It is noted that the optical element 1 in this embodiment may be also used in a device or an equipment such as a transceiver, in addition to the optical coupling unit 50.

The optical coupling unit 50 shown in FIG. 21 is incorporated therein with the optical element 1, a flat bench 51 on which the optical element 1 is set at its bottom surface 11d so as to be bonded thereto, a laser diode 52 for emitting an output light beam which is incident upon the optical element 1, a block member 53 with which the output light beam from the laser diode 52 is aligned in height with the optical element 1, and an optical fiber, and upon which a light beam emerged from the optical element 1 is incident. The block member 53 is arranged adjacent to the optical element 1, and the laser diode 52 is attached to the block member 53.

Further, the output light beam from the laser diode 52 is refracted through the lens portions 12 and the lens portion 15 of the optical element 1, and thereafter, is incident upon the light incident surface of the optical fiber.

It is noted that the optical element 1 in this embodiment is incorporated with the protrusions 14, 18 which increase the areas of the upper surface 11a, the side surfaces 11b, 11c, and the bottom surface 11d. Thus, the bonding area with which the optical element 1 is bonded to the flat bench 51 with an adhesive can be increased, thereby it is possible to firmly bond the optical element by a large degree.

FIG. 22 is a block diagram for explaining process steps for bonding the optical element 1 in this embodiment onto the flat bench 51 with the use of a handler unit 300. This hander unit 300 includes a hander 301 which can be moved by means of a shift mechanism which is not shown, a gripper 302 attached to the handler 301, for gripping the optical element 1, a camera 303 for picking up an image of the mark 2 of the optical element 1 which has been gripped by the gripper 302, a control part 304 for processing an image picked up by the camera 303 so as to recognize the position and the direction of the mark 2, and for controlling the handler 301 and the gripper 302 in accordance with a result of the recognition.

The control part 304 in the handler unit 300 carries out the control that the optical element 1 set on a predetermined position is gripped by the gripper 302 under instructions by the user. The optical element 1 gripped by the gripper 302 is moved to a zone where image pick-up can be made by the camera 303. Thus, an image of the mark 2 of the optical element 1 is picked up by the camera 303. The control part 304 subjects the picked-up image to an image process so as to recognize the positions of the lens portion 12, 16 and the direction of the mark 2 in order to confirm the positions and the optical axis direction of the lens portions 12, 16. In this connection, the control part 304 also recognizes the position of the bottom surface 11d of the optical element 1 by recognizing the position and the direction of the mark 2.

The control part 304 instructs the handler 301 in order to cause the handler 301 to move to an adhesive sump which is not shown. Thus, the handler 301 has moved to the adhesive sump where the bottom surface 11d of the optical element 1 gripped by the gripper 302 is applied thereover with an adhesive from the adhesive sump which is not shown. Thus, the adhesive has been applied over the bottom surface 11d of the optical element 1. It is noted that explanation has been made of the application of the adhesive over the bottom surface 11d. However, the adhesive may be applied over another surface, other than the bottom surface 11d.

Thereafter, the handler 301 moves under the control by the control part 304 so as to attach the optical element 1 on the flat bench 53 at a predetermined position. That is, the handler 301 moves so that the optical element 1 gripped by the gripper 302 is bonded at its bottom surface 11d onto the flat bench 51 at the predetermined position. Accordingly, the optical element 1 has been bonded to the flat bench 51 at the predetermined position.

Thus, the mark 2 of the optical element 1 is used for the recognition of the posture of the optical element 1 by the handler unit 300 when the optical element 1 is installed in an equipment, thereby it is possible to aim at automating the assembling of the optical element 1.

[Fourth Embodiment]

FIG. 23 is a perspective view which shows a optical element 1 in a fourth embodiment of the present invention. Further, FIG. 24 is a front view which shows the optical element 1 shown in FIG. 23.

The optical element 1 shown in FIGS. 23 and 24, includes a quadrate body portion (a quadrangular body portion) 11, a lens portion (incident side lens, first lens portion) 12 having a lens surface 12a in a curved surface shape, which is protruded from one surface (front side surface) of the body portion 11, a flat part 13 which is formed in the one surface of the body portion 11, adjacent to the lens portion 12, protrusions 16 (bulged portions) formed in the one surface of the body portion 11, respectively at the four corners thereof, and a slope portion 15 located between the flat part 13 and the protrusions 14.

Further, the optical element 1 also includes a lens portion (an emergent side lens, second lens portion) 15 having a lens surface 16a in a curved surface shape, which is formed on another surface on the side remote from the one surface so as to be protruded from the other surface, a flat part 17 which is formed in the other surface of the body portion 11, adjacent to the lens portion 16, protrusions 18 which are formed on the other surface of the body portion 11, respectively at the four corners thereof, and a slope portion 19 located between the flat part 17 and the protrusions 14.

In this connection, the flat part 13 is formed so as to be extended over the entire periphery of the edge part of the lens portion 12. Further, the protrusions 14 are formed on the side of the flat part 13, remote from the lens portion 12. Similarly, the flat part 17 is formed so as to be extended over the entire periphery of the edge part of the lens portion 16, and the protrusions 18 are formed on the side of the flat part 13, remote from the lens portion 16.

Further, the protrusions 14 are formed so as to be protruded in the same direction as the thicknesswise direction (direction perpendicular to the sheet surface of FIG. 24) of the lens portion 12, being lower than the lens portion 12. The protrusions 18 are formed so as to be protruded in the same direction as that the thicknesswise direction of the lens portion 16, being higher than the lens portion 16. In other words, the protrusions 14, 18 are arranged so as to surround the lens portions 12, 16.

Further, the slope portion 15 surrounds the flat part 13, and is formed so as to connect the flat part 13 and the protrusions 14 to each other. Further, the slope part 19 surrounds the flat part 17, and is formed so as to connect the flat part 17 and the protrusions 18 to each other.

It is noted here that the body portion 11 of the optical element 1 has a substantially trapezoidal shape as viewed in a front view, as shown in FIG. 24, and has a predetermined thickness in the direction of the optical axis of the lens portions 12, 16. Further, as shown in FIGS. 23 and 24, all eight corners of the body portion 11 are rounded so as to have circular surfaces.

In detailed explanation, the body portion 11 has an upper surface 11a (the surface which corresponds to the upper side of a trapezoidal shape). serving as a side part (flat part), a side surface (first side surface, slope surface, a surface corresponding to the line which connects the upper side and the lower side of the trapezoidal shape) 11b, a side surface (second side surface, a slope surface, corresponding to the line which connects the upper side and the lower side of the trapezoidal shape) 11c and a bottom surface (corresponding to the lower side of the trapezoidal shape, base surface, lower surface, bonding surface) 11d. The upper surface 11a is located on the side remote from the bottom surface 11d, and the side surface 11b is located on the side remote from the side surface 11c. Further, the upper surface 11a, the side surfaces 11c, 11b and the bottom surface 11d have predetermined planar shapes (flattened shapes), respectively.

The upper surface 11a and the bottom surface 11d are forms so as to be parallel with each other, and the inter distance between the upper surface 11a and the bottom surface 11d, or the external size (the height of the body portion 11) is set to a predetermined value.

Further, the side surface 11b and the side surface 11c are not in parallel with each other. That is, the side surface 11b and the side surface 11c are formed, the nearer they approach the bottom surface 11d, the longer the inter distance between them. In other words, the further they are from the bottom surface 11d, the shorter the inter distance between them. Further, in the other view point, the included angle between the side surface 11c and the side surface 11d is less than 90 deg. Further, the included angle between the side surface 11c and the bottom surface 11d is less than 90 deg. In specific explanation, in the case of this embodiment, the angle α1 included between the phantom line VLb of the side surface 11b and the phantom line VLd of the bottom surface 11d is acute (α1<90 deg.), and further, the angle β1 included between the phantom line VLc of the side surface 11c and the phantom line VLd of the bottom surface 11d is acute (β1<90 deg.). Thus, among the upper surface 11a, the side surfaces 11b, 11c and the bottom surface 11d, the bottom surface 11d is longest as seen in the front view (refer to FIG. 24).

In this context, the upper surface 11a, the side surfaces 11b, 11c, and the bottom surface 11d have a predetermined thickness D which is one of the factors influencing the optical characteristic of the optical element 1.

As stated above, the optical element 1 in this embodiment has the upper surface 11a, the side surfaces 11b, 11c and the bottom surface 11d so as to have a shape which can facilitate the setting thereof, and accordingly, without any additional component, it can be set by arranging it on a surface (mounting surface) of a member which has been manufactured with a high degree of accuracy. That is, the optical element 1 can secured by setting the same on the mounting surface with, for example, an adhesive applied on the bottom surface 11d. Further, the bottom surface 11d corresponding to the lower side of a trapezoidal shape has a widest planar shape part, and accordingly, a largest bonding surface can be ensured, thereby it is possible to firmly secure the optical element 1 on the mounting surface. Further, the gravitational center of the optical element 1 is low, and accordingly, the optical element 1 is restrained from falling down during the securing thereof onto the mounting surface, thereby it is possible to enhance the workability.

It is noted here that the optical element 1 having the above-mentioned configuration is the so-called quadrate lens or square lens. In view of this point, the bottom surfaced can be called as the leg portion.

Further, the lens portion 12 and the lens portion 16 may be, in a bundle, called as a convex lens or a convex lens potion. Further, although the optical element 1 includes the body portion 11 and the lens portions 12, 16, as sated above, it includes, in another view point, the lens portions 12, 16 and the leg portion or the flange portion which is extended from the lens portions 12, 16 in a direction crossing the direction of the optical axis thereof.

In more detailed explanation, the optical element 1 in this embodiment includes, on the lens portion 16 side, the four protrusions 18 which are protruded in the same direction as that of the lens portion 16. These four protrusions 18 are formed so as to be all higher than the lens portion 16. Thus, the lens portion 16 can be protected by the protrusions 14, 18. In specific explanation, it is possible to prevent the optical element 1 from being scratched as the optical element 1 is rolled down in accident during the setting thereof. Further, it is possible to prevent the lens portion 16 from making contact with another component during the setting thereof, in order to prevent occurrence of damage to the lens portion 16. Further, should the thickness of the upper surface 11a, the side surfaces 11b, 11c and the bottom surface 11d of the body potion 11 of the optical element 1 be small, it would become unstable when the optical element 1 is set at the bottom surface 11d. Even in this case, it can be stable if the optical element 1 is set by means of the four protrusions 18 which are adjacent to the bottom surface 11d of the quadrate lens, and further, the lens portion 16 can be protected by the four protrusions 18, thereby it is possible to prevent the lens portion 16 from being scratched.

Thus, the optical element 1 includes the protrusions 18, and accordingly, it can be said that the optical element 1 incorporates a function for protecting the lens portion 16. The lens protecting function is effective if the protrusions 18 are formed so be higher than the lens portion 16. However, if it has a height which is high more or less, the protecting function can be in part materialized even though the protrusions are not higher than the lend portion.

It is noted that the protrusions 14 which are protruded in the same direction as that of the lens portion 12, are formed so as to be lower than lens portion 12, and accordingly, it has not the lens protecting function as owned by the protrusions 18. However, if the protrusions 14 are formed so as to be higher than the lens portion 12, it may have a lens protecting function.

Next, explanation will be made of a mold assembly (an optical element mold assembly) 100 which is used for producing the optical element 1.

FIG. 25 is a plan view which shows the mold assembly 100 which is used for producing the optical element in this embodiment.

The mold assembly 100 shown in FIG. 25, is adapted to be used for producing the optical element 1 shown in FIGS. 23 to 24. This mold assembly 100 is incorporated with the sleeve (quadrate sleeve, a cavity die) 110 for defining peripheral side surfaces, a cope mold (core die) 120 arranged on the upper side, and a drag mold (cavity die) arranged on the lower side. In detailed description, an interior space (recess in the cavity die) S is defined by the sleeve 110 and the drag mold 130, during die-fastening, the cope mold 120 is moved in the direction of the die-fastening so as to come into the interior space S. Further, a preform is press-molded by the sleeve 110, the cope mold 120 and the drag mold 130 which are cooperated with one another, and accordingly, the optical element 1 is produced.

The sleeve 110 includes a plurality of dies 111, 112, 113, 114 which are arranged at the peripheral side surfaces, respectively. The inner wall surfaces (inner surfaces of the recess in the cavity die) 110a, 110b, 110c, 110d of the sleeve 110 are defined by these dies 111, 112, 113, 114, and further, they define a space having a trapezoidal shape in the cross-section (cross-section or aperture area corresponding to the protrusion of the core die, which will be sometimes simply referred to "cross-section") with respect to the die-fastening direction.

In detailed explanation, the inner wall surface 110a of the sleeve 110 is the part which forms the upper surface 11a (refer to FIG. 24) of the optical element 1. Further, the inner wall surface 110b is the part which forms the side surface 11b (refer to FIG. 24) of the optical element 1, and the inner wall surface 110c is the part which forms the side surface 110c (refer to FIG. 24) of the optical element 1. Moreover, the inner wall surface 110d is the part which forms the bottom surface 11d (refer to FIG. 24) of the optical element 1. It is noted that the inner wall surface 110d constitutes a reference side in the trapezoidal shape, the inner wall surface 110b constitutes a first side, and the inner wall surface 110c constitutes a second side. That is, the first side and the second side as stated above are arranged so as to have an inter distance therebetween, the further they are away from the reference side, the shorter the inter distance.

The cope mold 120 has a round shape part (the protruding part of the core die) 121 which is formed into a round shape with a size which allows the round shape part 121 to be accommodated in the space in the sleeve 110. The cope mold 130 has a round shape part 131 which is formed in a round shape with a size which allows the round shape part 131 to be accommodated in the space in the sleeve 110. The round shape part 121 of the cope mold 120 is arranged so as to be opposed to the round shape part 131 of the drag mold 130.

As will be detailed later, during the molding, a preform (an optical element material or a material which has been softened by heating) which is set between the round shape part 121 of the cope mold 120 and the round shape part 131 of the drag mold 130 is pressed by the round shape parts 121, 131, and accordingly, the optical element 1 is molded. It is noted that the sleeve 110 may be the so-called die for forming the peripheral side surfaces of a molding product (optical element). Further, the drag mold 120 is a die for molding one surface of the molding product, and the drag mold 130 is a die for molding the other surface of the molding produce.

It is noted here that the space in the sleeve 110 has a trapezoidal cross-sectional shape while the round shape parts 121, 131 located within the space in the sleeve 110 have round shapes, and accordingly, the space is different from the round shape parts 121, 131 in their molding surfaces (which are the same in a rare case). Accordingly, during the molding of the optical element 1, the preform has a part which is pressed directly by the round shape part 121 of the cope mold 120 and the round shape part 131 of the drag mold 130, and a part which is not pressed directly thereby. In specific explanation, during the molding of the optical element 1, the round shape part 121 of the cope mold 130 and the round shape part 131 of the drag mold 131 are adapted to directly press the center part of the preform as viewed in a planar direction (direction parallel with the sheet surface of the FIG. 25). Meanwhile, they does not directly press the four corner parts (peripheral parts) of the preform as viewed in the planar direction. That is, the four corner parts are not pressed directly by the round shape parts 121, 131.

As stated above, in the mold assembly 100 in this embodiment, the cross-section of the space in the sleeve 110 is quadrangular, and the cope mold 120 and the drag mold 130 which are located in the space in the sleeve 110 are incorporated with the round shape parts 121, 131. Accordingly, the area of contact between the sleeve 110 and the round shape parts 121, 131 is small, that is, they are made into point-contact with each other, and accordingly, they are excellent in workability and molding stability. That is, it can be said that the sleeve 110, the cope mold 120 and the drag mold 130 can be easily positioned, relative to one another during assembling of the mold assembly. In more detailed explanation, during the positioning among the sleeve 110 and the round shape part 121 of the cope mold 120, it is only required to adjust the positional relationship theremong. That is, no adjustment to the relative postures thereof is required, or even if it is required, the working therefor is simple. It is similar in positioning the sleeve 110 and the round shape part 131 of the drag mold 130, relative to each other. Further, it is also similar in positioning the round shape part 121 of the cope mold 120 and the round shape part 131 of the drag mold 120, relative to each other.

Should two quadrangular shape parts which are formed into a quadrangular shape corresponding to the cross-sectional shape of the space in the sleeve 110 be used so as to be arranged being opposed to each other, the postures of the two quadrangular shape parts should be aligned with each other within the space in the sleeve 110, and as well the postures of the sleeve 110 and those of the two quadrate shape parts should be aligned, relative to each other. Thus, all three components or the sleeve 110 and the two quadrangular shape parts should be angularly adjusted in a rotating direction within a plane orthogonal to the direction of the die-fastening. Should the angular adjustment be made without a high degree of accuracy, the quadrangular shape parts could not be inserted in the sleeve 110, and as a result, a mold product having a high degree of quality could not be produced. Further, the angular adjustment with a high degree of accuracy cannot be easily made. Thus, in the case of using two quadrangular shape parts, the workability would be low in comparison with the case of using the mold assembly 100 in this embodiment.

In this connection, the working for positioning a quadrate recess and the round shape protruding part, relative to each other, is easier than the working for positioning the a quadrate recess and a quadrate protruding part, relative to each other.

Further, the working for positioning a round shape parts, relative to each other, is easier than the working for positioning quadrate shape protruding parts, relative to each other. In more detailed explanation, if no directivity is present between the quadrate recess and the round shape protruding part in a plane orthogonal to the direction of die-fastening, no adjustment to the relative postures therebetween is required. Further, if no directivity is present between the round shape protruding parts, no adjustment to the relative postures thereof is required.

The mold assembly 100 in this embodiment is configured so that the optical element 1 is formed under the relative pressing action between the round shape parts 121, 131 in the space in the sleeve 110. That is, the relative movement between the cope mold 120 and the drag mold 130 (die-fastening) is carried out before and after the molding of the optical element 1. In the case that quadrangular shape parts which have been formed in a quadrangular shape corresponding to the cross-sectional shape of the space in the sleeve 110 are provided respectively in both cope mold 120 and the drag mold 130, the adjacent components are made into surface contact with each other, and accordingly, an appropriate clearance should be taken for preventing occurrence of galling therebetween during the movement thereof. Accordingly, sufficient consideration should be taken for the clearance during the designing, the assembling and the maintenance of the mold assembly 100 which are therefore laborious, and time-consuming so as to increase the costs. Further, if galling and biting would occur more or less, the service life of the mold assembly would be inevitably shortened.

On the contrary, in this embodiment, since either one of both of the round shape parts 121, 131 is moved in the space which has a quadrangular cross-sectional shape, and since the peripheral edges of the front end parts thereof which are located in the interior space S side are formed with chamfered parts 124, 134 (which will be detailed later), it is possible to prevent occurrence of galling and biting between the round shape parts 120, 130 and the sleeve 110 at low costs. Thus, the cost reduction can be made, and further, the degree of accuracy for the dies can be enhanced. Further, the service life thereof can be prolonged. In this context, the manufacture of the round shape parts is easier than that of the quadrangular shape parts in view the manufacturing costs of dies. Thus, the manufacturing costs of the dies can be reduced, thereby it is possible to reduce the burden for the maintenance for the dies.

As shown FIGS. 6A to 7B, the round shape part 121 of the cope mold 120 is formed therein with a concave curved surface part (part having a role of press-molding the lens surface 12*a*, a part for transferring the lens surface 12*a*) 122 having a shape corresponding to the lens portion 1 of the optical element 1, an end surface part 123 having a shape for molding (transferring) the flat part 13 of the optical element 1, and a chamfered part 124 formed by chamfering the peripheral edge of the front end part of the round shape part 121. That is, the cope mold 120 has the concave curved surface 122, the end surface part 123 and the chamfered part 124 serving as the pressing surfaces.

Further, the round shape part 131 of the drag mold 130 is formed therein with a concave surface part (having a role of press-molding the lens surface 16*a*, a part for transferring the lens surface 16*a*) 132 having a shape for forming the lens portion 16 of the optical element 1, an end surface part 133 having a shape for molding (transferring) the flat part 17 of the optical element 1, and a chamfered part 134 formed by chamfering the peripheral edge of the front end part of the round shape part 131.

The optical element 1 is press-molded in a cavity defined by the inner wall surfaces 110*a*, 110*b*, 110*c*, 110*d* of the sleeve 110, the round shape part 121 of the cope mold 130 and the round shape part 131 of the drag mold 130. In other words, the press-molding surfaces are defined by the concave curved surface part 122 and the end surface part 133 of the cope mold 120, the concave curved surface part 132 and the end surface part 133 of the drag mold 130, and the inner wall surfaces 110*a*, 110*b*, 110*c*, 110*d* of the sleeve 110. Further, these press-molding surfaces are formed therein with gaps where no press-molding occurs.

It is noted here that the sleeve 110 and the drag mold 130 are on the stationary side, but the cope mold 120 is on the movable side. That is, the cope mold 120 can be moved up and down by means of an elevating means which is not shown. Thus, the cope mold 120 is moved in the vertical direction, relative to the sleeve 110 and the drag mold 130.

It is noted that although the cope mold is on the movable side in this embodiment, but the drag mold 130 is on the stationary side, there may be configured the cope mold 120 which is on the stationary side, and the drag mold 130 which is on the movable side.

It is noted here that the inner wall surfaces 110*a*, 110*b*, 110*c*, 110*e* of the sleeve 110 are made into point-contact with the round shape parts 121, 131, as stated above. In other words, there are presented gap parts (gaps between the first die and the second die, non-pressurized zones, spaces in which the material flows) 140 (refer to FIG. 25) in which the outer peripheral surfaces 121*a*, 131*a* of the round shape parts 121, 131 are spaced from the inner wall surfaces 110*a*, 110*b*, 110*c*, 110*d* by a large distance, in comparison with the other parts, so as to define gaps therein. These gap parts 140 are located, respectively at the four corners (corner parts). Further, in these gap parts 140, the preform is not pressed directly by the round shape part 121 of the cope mold 120 and the round shape part 131 of the drag mold 130. It is noted that the inner wall surfaces 110*a*, 110*b*, 110*c*, 110*d* of the sleeve 110 are spaced from the outer peripheral surfaces 121*a*, 131*a* of the round shape parts 121, 131 by a longest distance on the diagonal lines of the cress-section of the inner wall surfaces 110a, 110b, 110c, 110d of the sleeve 110, that is, the gap parts 140 thereon are largest.

During the molding, when the center part of the preform is pressed directly by the round shape parts 121, 131, the preform is press-molded. That is, the lens portions 12, 16, the flat parts 13, 17 and the slope portions 15, 19 (refer to FIGS. 23 to 24) of the optical element 1 are press-molded by the round shape parts 121, 131. Further, the upper surface 11a, the side surfaces 11b, 11d and the bottom surface 11d of the optical element 1 are formed by the inner wall surfaces 110a, 110b, 110c, 110d of the sleeve 110.

Further, during the press-molding, the preform flows in part in the gap parts 140 located between the outer peripheral surfaces 121a, 131a of the round shape parts 121, 131 and the inner wall surfaces 110a, 110b, 110c, 110c of the sleeve 110. These gap parts 140 are not pressed directly by the round shape parts 121, 131, and accordingly, the preform flowing in these gap parts is regulated by the inner wall surfaces 110a, 110b, 110c, 110d, and the preform flows in the protruding (upward) direction of the lens portion 12 along the inner wall surfaces 110a, 110b, 110c, 110d on the cope mold 120 side while the preform flows in the protruding direction of the lens portion 16 along the inner wall surfaces 110a, 110b, 110c, 110d on the drag mold 130 side. As a result, the preform is in part bulged out in the gap parts 140 so as to form the protrusions 14, 18. Thus, the gap parts 140 have a role of relief margins for the preform during the molding. Accordingly, the molding can be made with no problems even though the bulk of the preform is uneven. Thus, the management of bulks of preforms used for the molding can be simplified, thereby it is possible to enhance the workability.

FIG. 26 is a front view which shows a optical element 2 in the variant form of the fourth embodiment, corresponding to FIG. 24 which shows the optical element 1 in the fourth embodiment. It is noted that the optical element 2 is though different as viewed in the front view, but the basic configuration is common to the optical element 1, and accordingly, a perspective view and a longitudinal sectional view which show the optical element 2 are abbreviated. Further, explanation to the mold assembly and the method of producing thereof will be omitted.

The optical element 2 shown in FIG. 27 is incorporated therein with a quadrate body portion 31, a lens portion 32 having a lens surface which is formed so as to be protruded from one surface (front surface) of the body portion 31, having a curved surface shape, a flat part 33 which is formed in the one surface of the body portion 31, adjacent to the lens portion 32, protrusions 34 formed in the one surface of the body portion at three corners thereof, and a slope portion 25 located between the flat part 33 and the protrusions 34. It is noted that the lens portion 32, the flat part 33, the projections 24 and the slope portion 35 of the optical element 3 correspond respectively to the lens portion 12, the flat part 13, the protrusions 14 and the slope portion 35 of the optical element 1.

The optical element 2 also incorporates a configuration similar to that on the one surface thereof, even on the other surface (opposite side surface) thereof. However the configuration on the other side is not shown in the figure and the explanation thereto will be abbreviated.

It is noted here that the body portion 21 of the optical element 2 is triangular as viewed in a front view, having its corner parts which are rounded so as to have a circular surface shape. Further, the body portion 21 has the side surfaces 21b, 21c and the bottom surface 21d. The side surfaces 21d, 21c and the bottom surface 21d have all flat shapes, respectively.

The side surfaces 21b, 21c and the bottom surface 21c of the optical element 2 correspond respectively to the side surfaces 11b, 11c and the bottom surface 11d of the optical element 1.

In more detailed explanation, the included angle between the side surface 21b and the bottom surface 21d is less than 90 deg., and further, the included angle between the side surface 11c and the bottom surface 11d is less than 90 deg. In specific explanation, in this embodiment, an angle α2 included between the phantom line VLb of the side surface 11b and the phantom line VLd of the bottom surface 11d is acute (α2<90 deg.), and an angle β2 included between the phantom line VLc of the side surface 11c and the phantom line VLd of the bottom surface 11d is acute (β2<90 deg.). It is noted that the optical element 2 in this embodiment is formed so as to have a substantially equilateral triangular shape having three sides whose lengths are substantially equal to one another. However, it may have another triangular shape such as a substantially isosceles triangular shape.

Thus, the optical element 2 in this embodiment has its gravitational center which is lower than that of the optical element 1 in the first embodiment, and accordingly, the optical element 2 is more hard to fall down upon securing thereof onto a mounting surface, thereby it is possible to enhance the workability. Further, since the optical element 2 is formed in a substantially equilateral triangular shape, either one of the side surfaces 21b, 21c may be used as the surface on which an adhesive or the like is applied, instead of the bottom surface 21d. Accordingly, no consideration is required for adjustment to the posture of the optical element 2 during securing of the optical element 2 onto the mounting surface, thereby it is possible to further enhance the workability.

FIG. 27 is a front view which shows an optical element 3 in another variant form of the fourth embodiment of the present invention, corresponding to FIG. 24 which shows the optical element 1 in the fourth embodiment of the present invention. It is noted that the basic configuration of the optical element 3 is common to that of the optical element 1 although the shape thereof as viewed in a front view is different therefrom, and accordingly, a perspective view and a longitudinal sectional view for illustrating the optical element are abbreviated. Further, the explanation as to a mold assembly for molding the optical element 3 and a method for producing the same will be omitted.

The optical element 3 shown in FIG. 27 includes a quadrate body portion 31, a lens portion 32 having a lens surface which is formed so as to be protruded from one surface (front side surface) of the body portion 31, having a curved surface shape, a flat part 33 which is formed in the one surface of the body portion 31, adjacent to the lens portion 32, protrusions 34 which are formed on the one surface of the body portion 32, respectively at the five corners thereof, and a slope portion 35 located between the flat part 33 and the protrusions 34. It is noted that the lens portion 32, the flat part 33, the protrusions 34 and the slope portion 35 of the optical element 3 correspond respectively to the lens portion 12, the flat part 13, the protrusions 14 and the slope portion 15 of the optical element 1.

The body portion 32 incorporates a configuration at the other surface (rear side surface) thereof, which is similar to that formed in the one surface thereof, which is though not shown, and the explanation of which will be omitted.

It is noted here that the body portion 31 of the optical element 3 has a substantially pentagonal shape as viewed in a front view, having corner parts each of which is rounded so as to have a circular curved surface. Further, the body portion 31 has side surfaces 31b, 31c, 31e, 31f and a bottom surface 31d. The side surfaces 31b, 31c and the bottom surface 31d have planar shapes, respectively. The side surfaces 31b, 31c and the bottom surface 31d correspond respectively to the side surfaces 11b, 11c and the bottom surface 11d of the optical element 1.

In more detailed explanation, the included angle between the side surface 31b and the bottom surface 31d is less than 90 deg., and the included angle between the side surface 31c and the bottom surface 31d is also less than 90 deg. In specific explanation, in this embodiment, an angle α3 included between the phantom line VLb of the side surface 31b and the phantom line VLd of the bottom surface 31d is acute (α3<90 deg.), and an angle β3 included between the phantom line VLc of the side surface 11c and the phantom line VLd of the bottom surface 31d is acute (β3<90 deg.). It is noted that the optical element 3 in this embodiment may be formed into a substantially pentagonal shape as viewed in a plan view, other than that shown in FIG. 27.

Thus, the optical element 3 in the variant form, has its gravitational center which is lower than that of the optical element 1 in the other variant form of the forth embodiment, and accordingly, the optical element 3 is more hard to fall down during mounting thereof on its mounting surface, thereby it is possible to enhance the workability. Further, the bottom surface 31d of the optical element 3 can be easily found and recognized in comparison with the optical element 2 in the second embodiment, thereby it is possible to further enhance the workability in the case of securing the optical element onto its mounting surface.

BRIEF DESCRIPTION OF THE DRAWINGS

FIG. 5A is a view for explaining a method of producing an optical element with the use of the mold assembly;

FIG. 12A is a view for explaining a method of producing the optical element with the use of a mold assembly;

INDUSTRIAL APPLICABILITY

Figure 1:
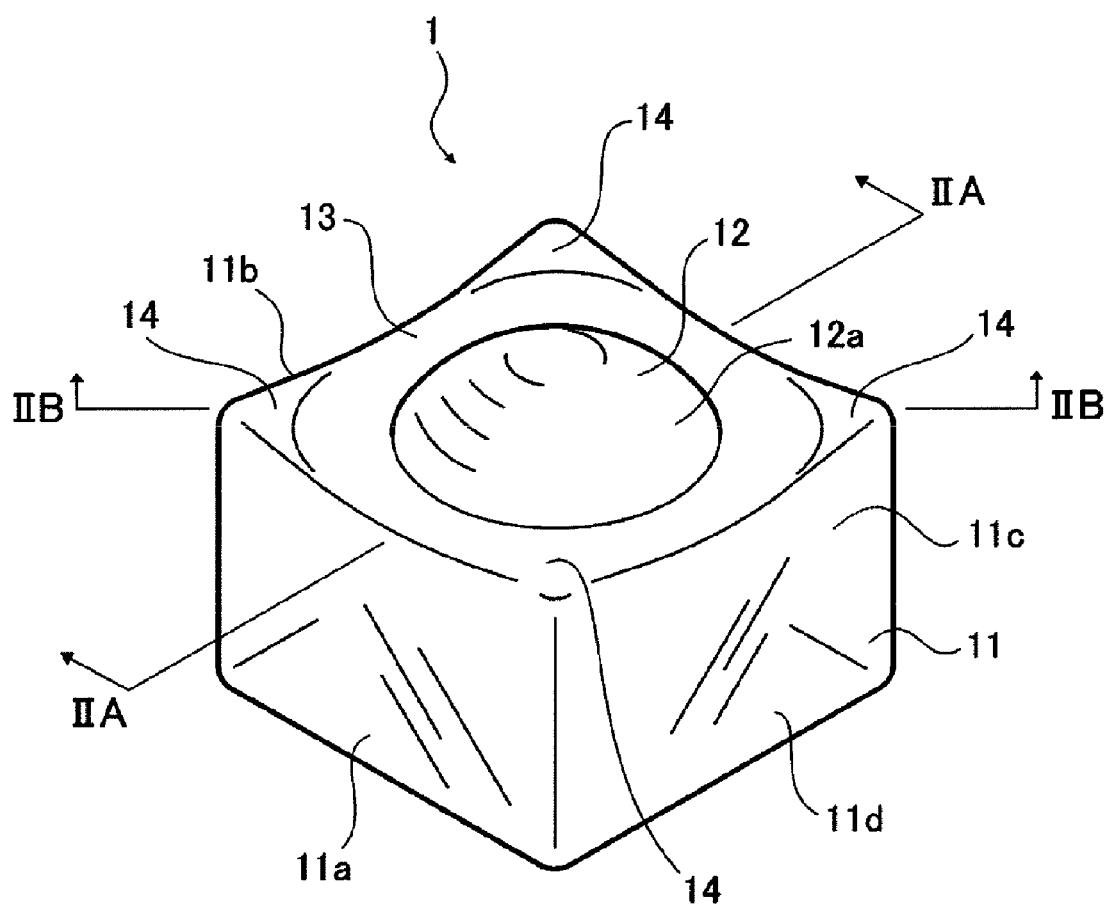
FIG. 1 is a schematic perspective view illustrating an external shape of an optical element in a first embodiment 1.
Figure 2A:
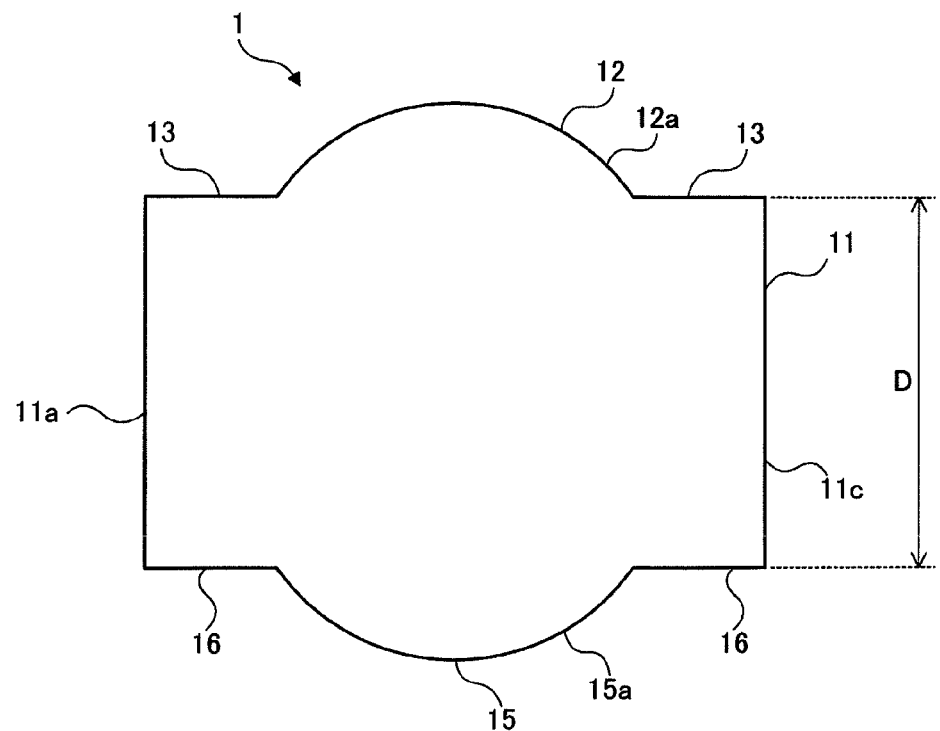
FIG. 2A is a longitudinal sectional view illustrating the optical element shown in FIG. 1.
Figure 2B:
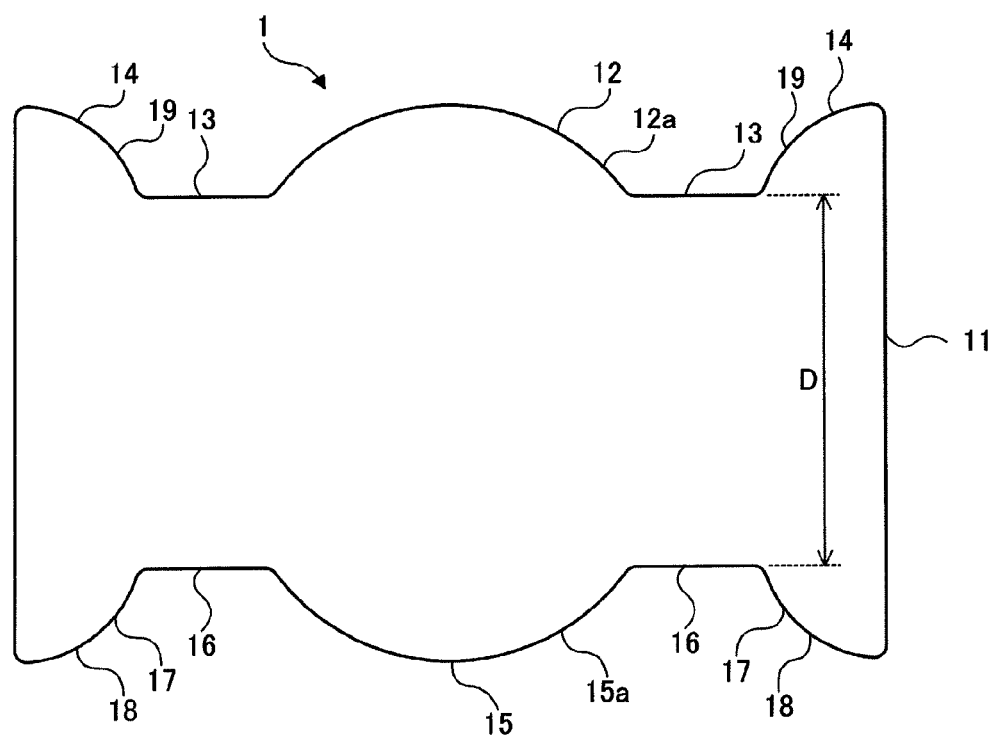
FIG. 2B is a longitudinal sectional view illustrating the optical element 1 shown in FIG. 1.
Figure 3:
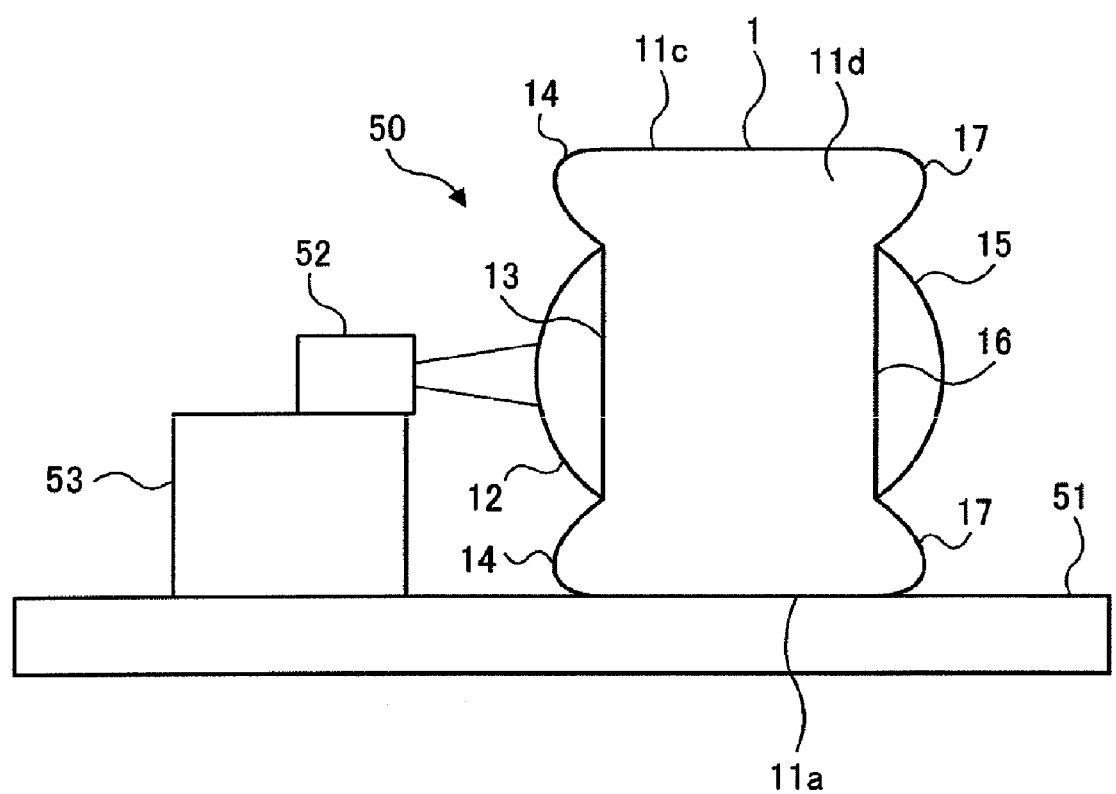
FIG. 3 is a view for explaining an optical coupling unit using an optical element.
Figure 4:
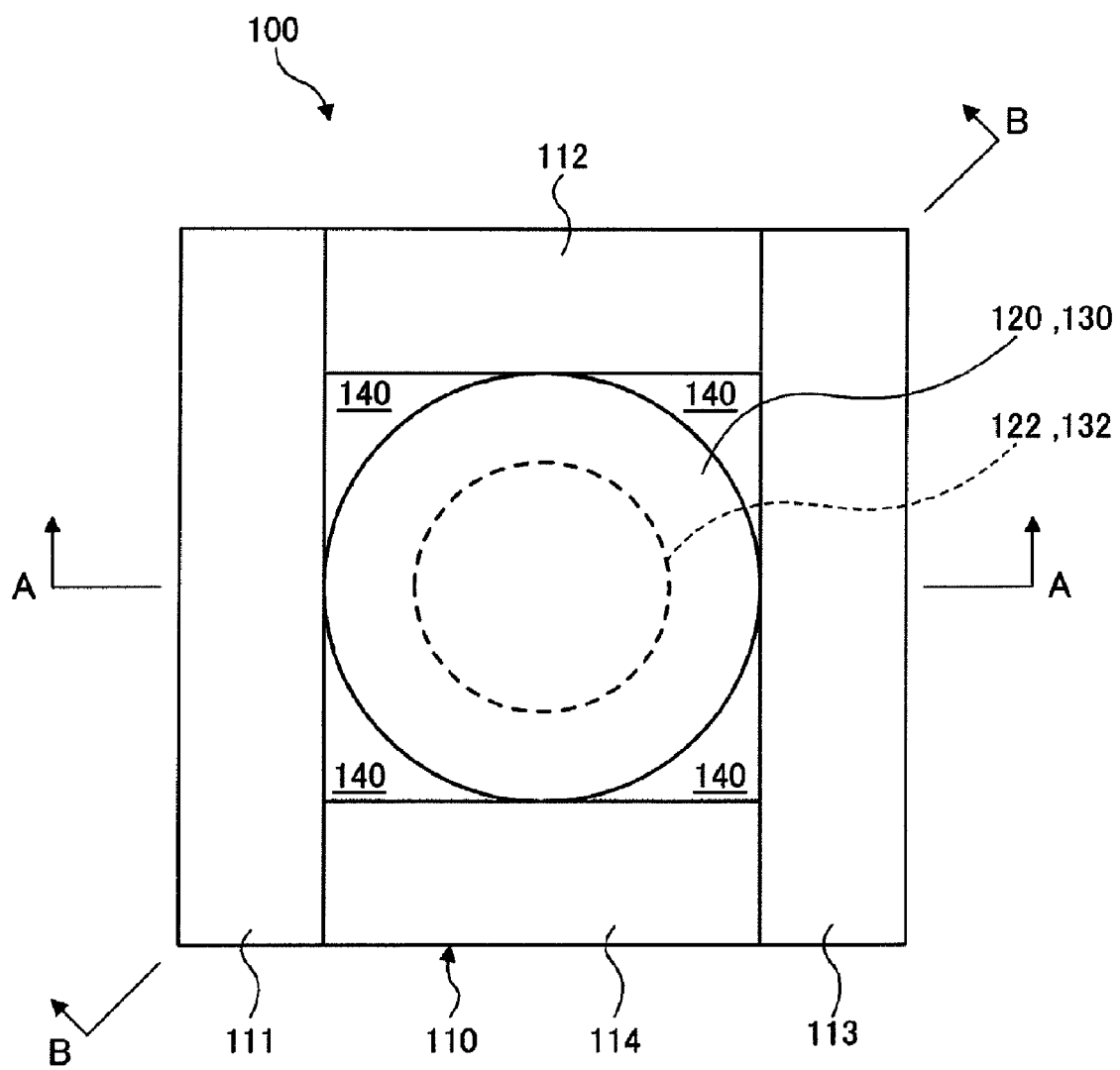
FIG. 4 is a plan view illustrating a mold assembly.
Figure 5B:
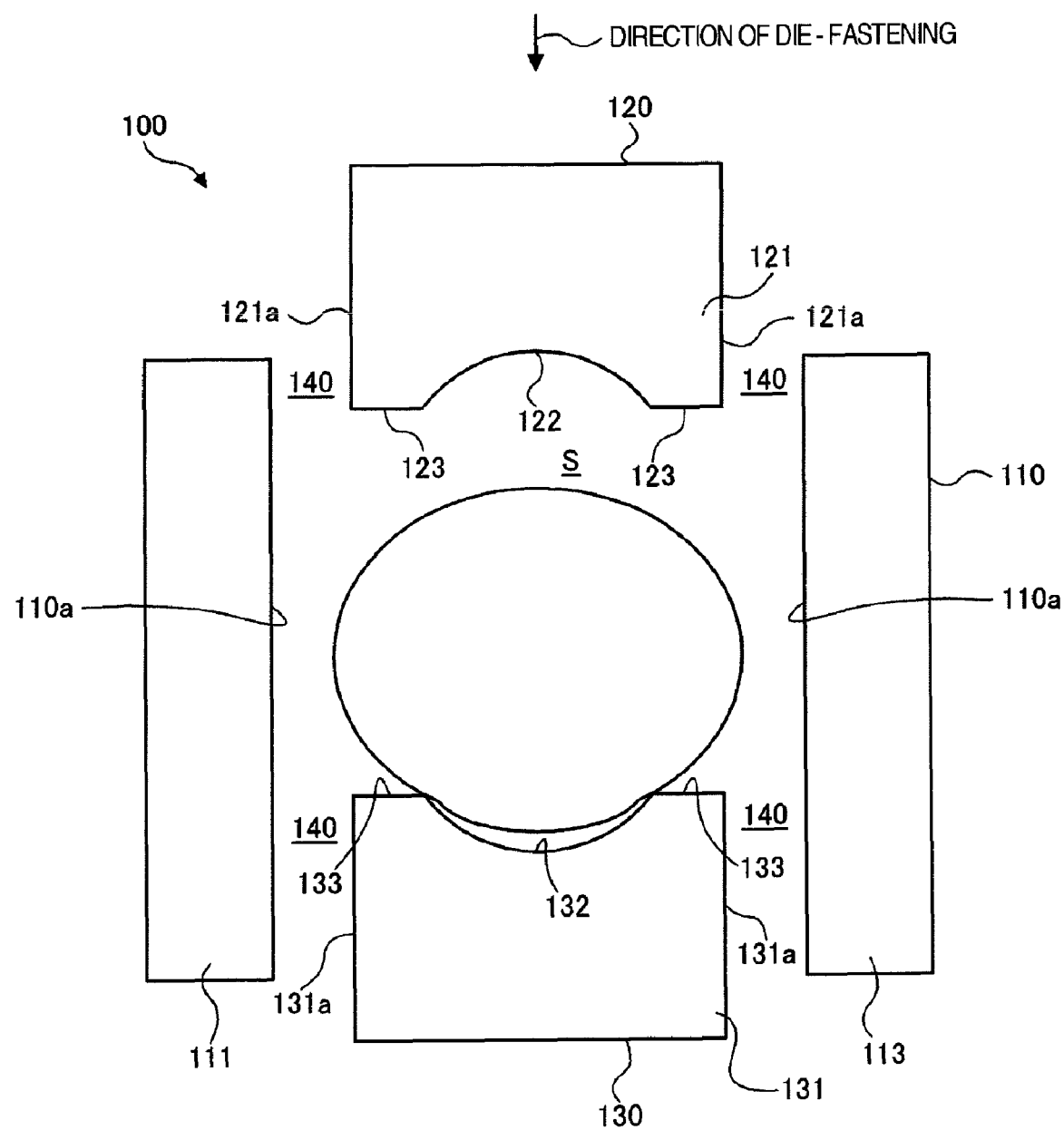
FIG. 5B is a view for explaining a method of producing an optical element with the use of the mold assembly.
Figure 6A:
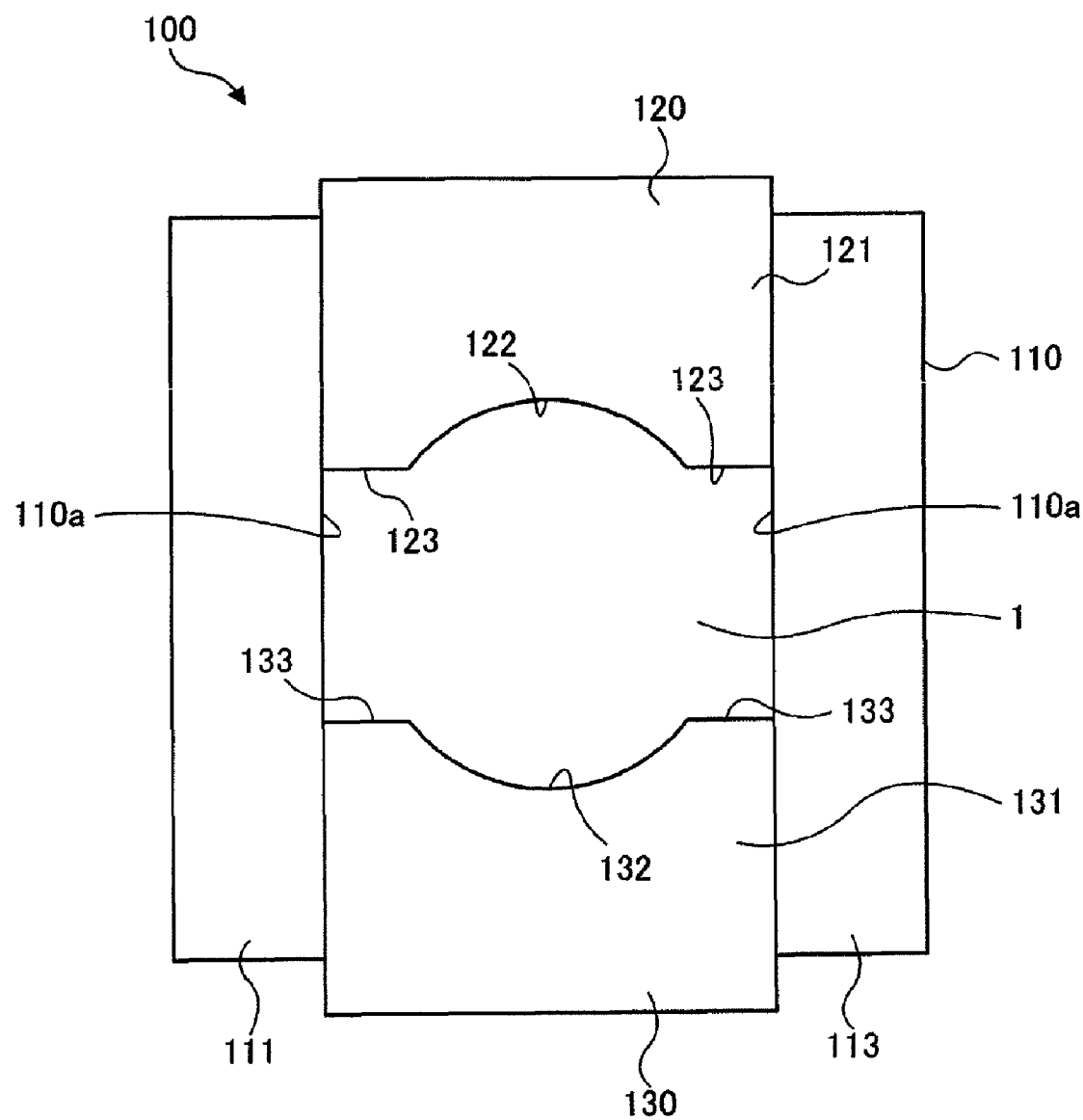
FIG. 6A is a view for explaining a method of producing an optical element with the use of the mold assembly.
Figure 6B:
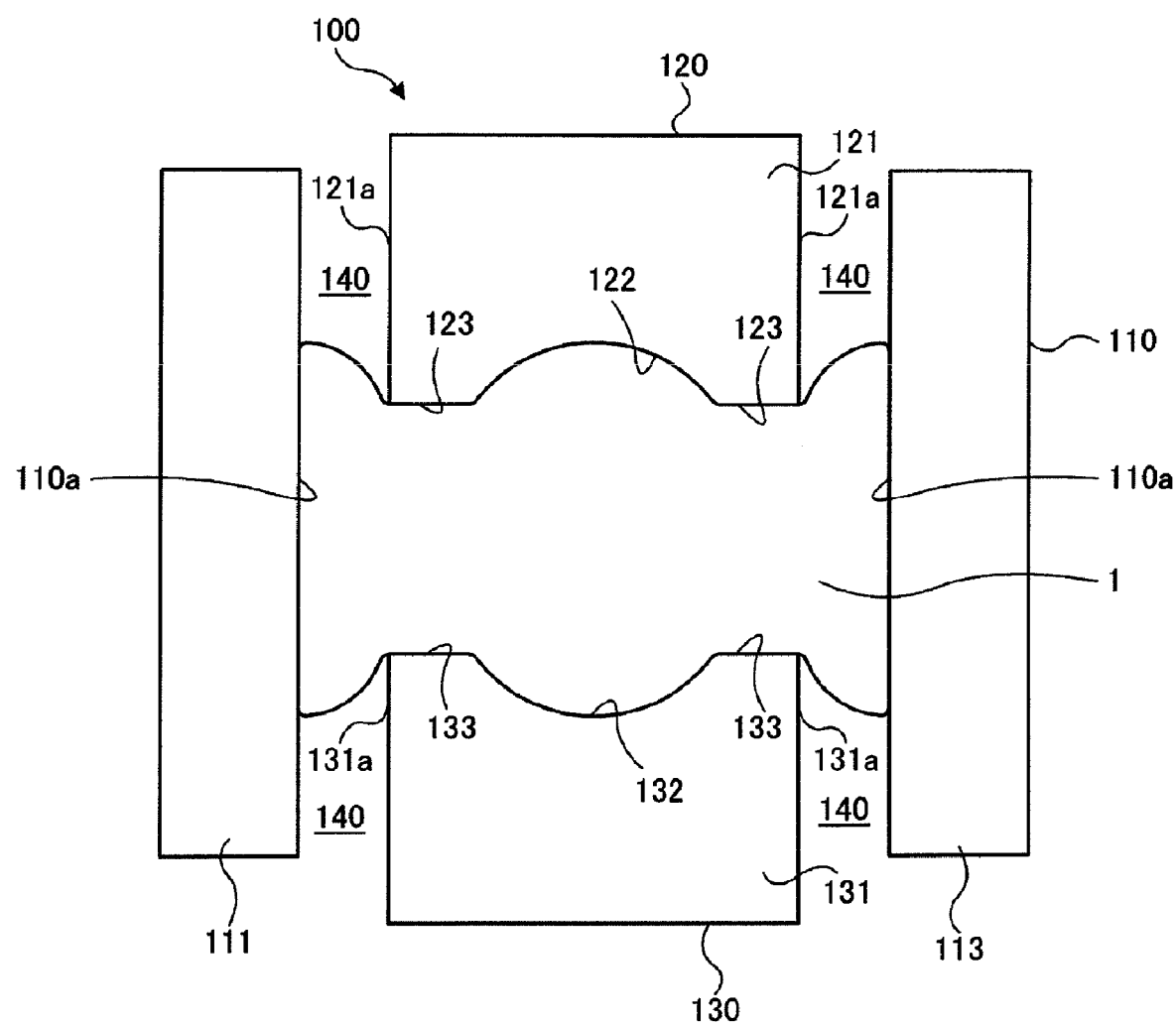
FIG. 6B is a view for explaining a method of producing an optical element with the use of the mold assembly.
Figure 7A:
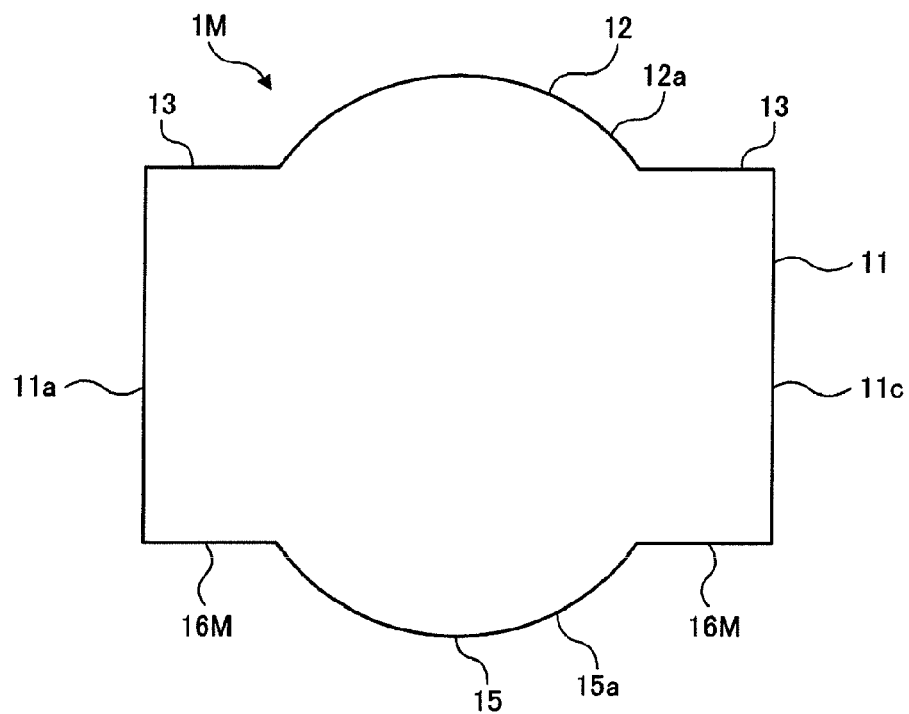
FIG. 7A is a longitudinal sectional view illustrating an optical element in a variant form of the first embodiment.
Figure 7B:
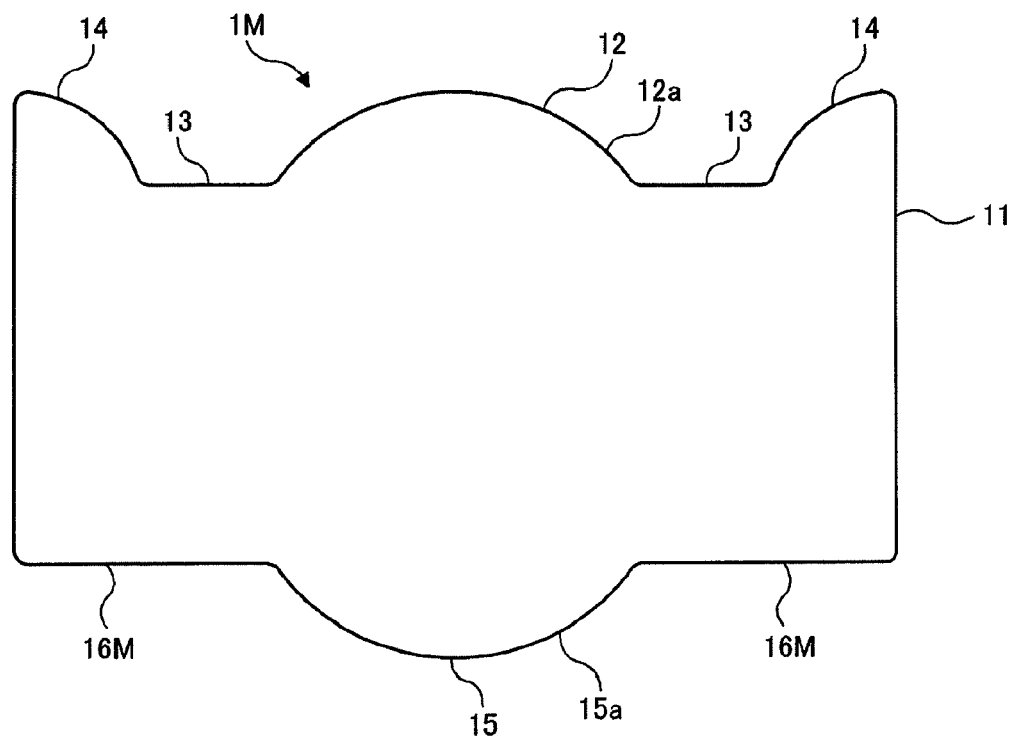
FIG. 7B is a longitudinal sectional view illustrating an optical element in a variant form of the first embodiment.
Figure 8:
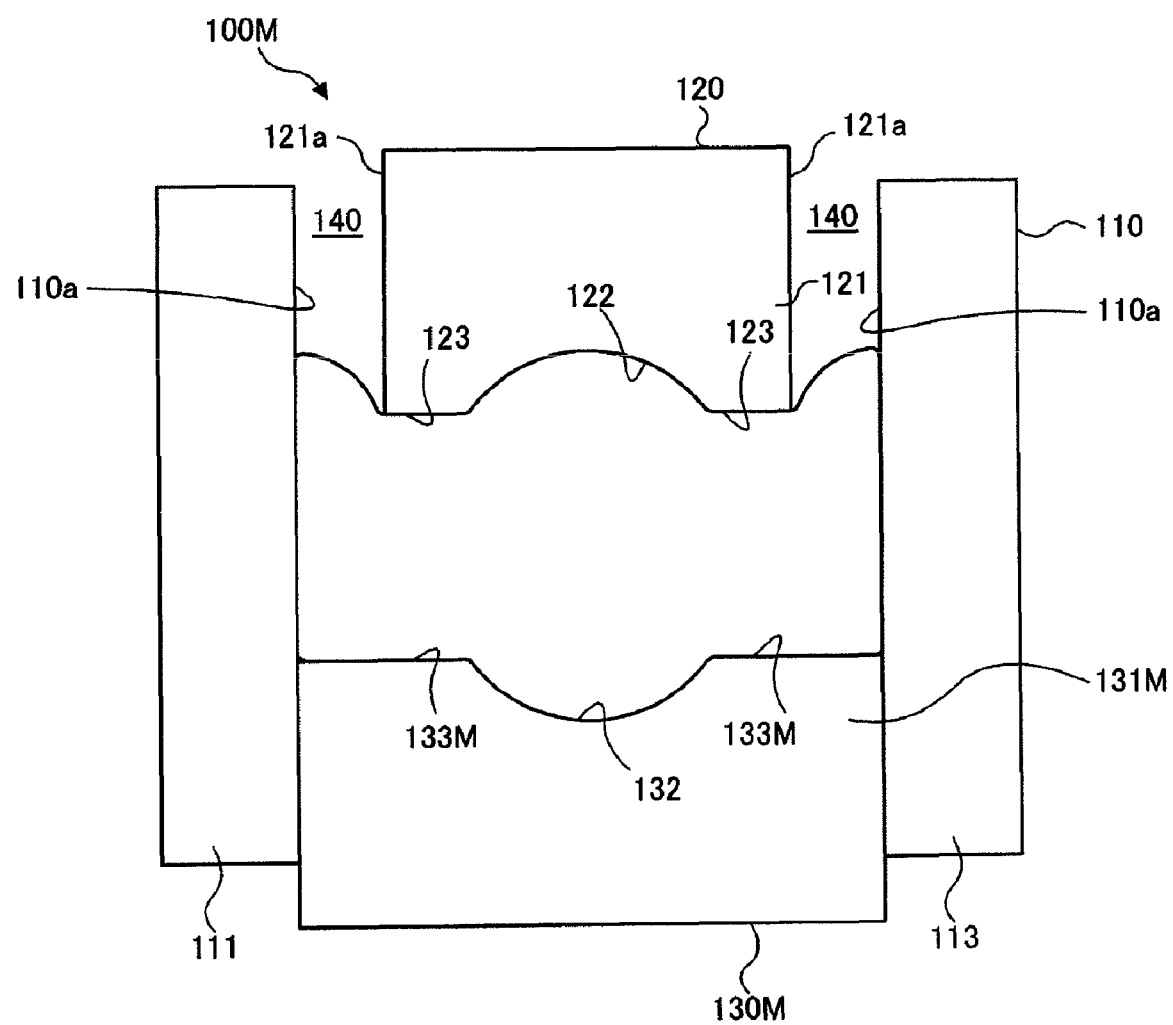
FIG. 8 is a view for explaining a mold assembly used for producing the optical element.
Figure 9:
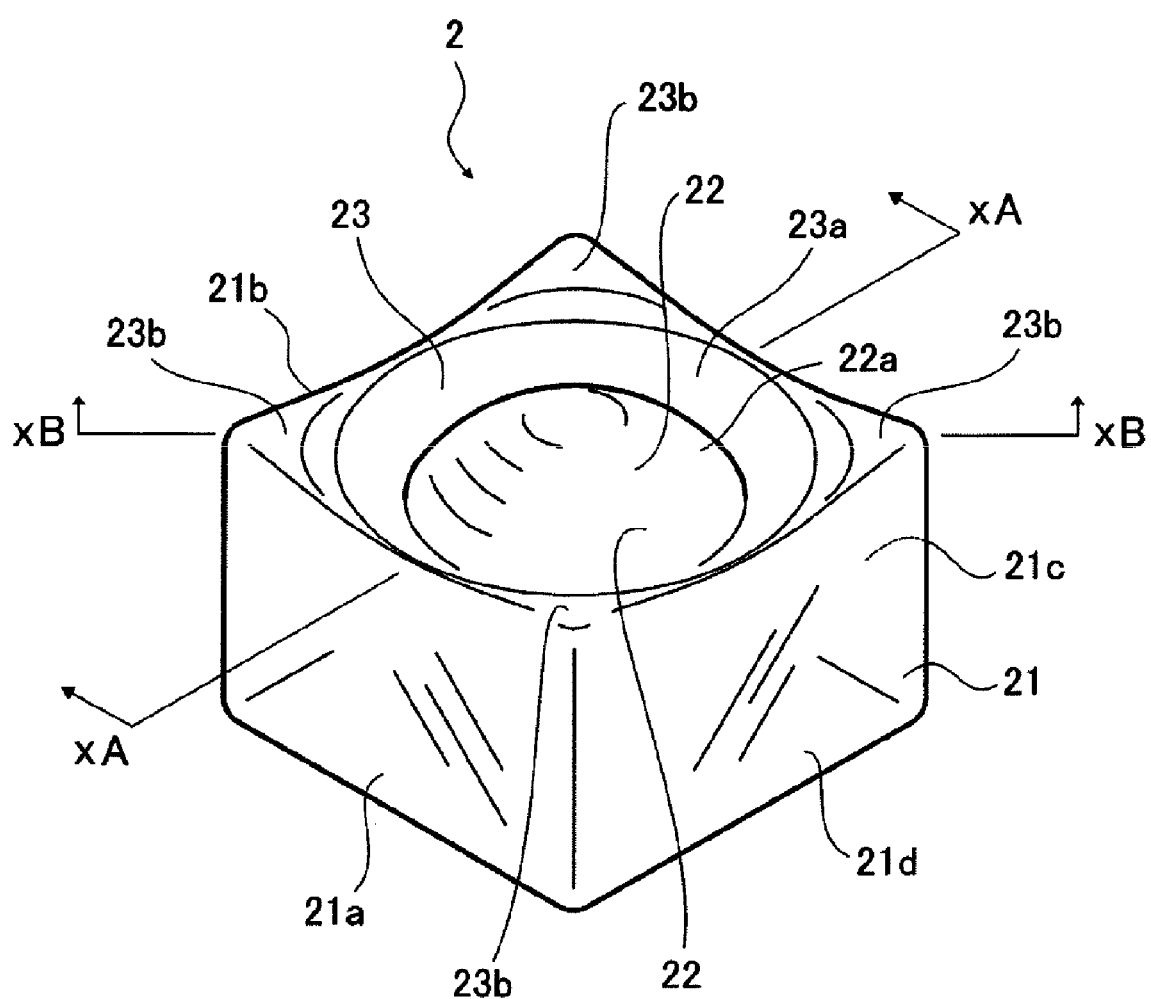
FIG. 9 is a schematic perspective view illustrating an external shape of an optical element in a second embodiment of the preset invention.
Figure 10A:
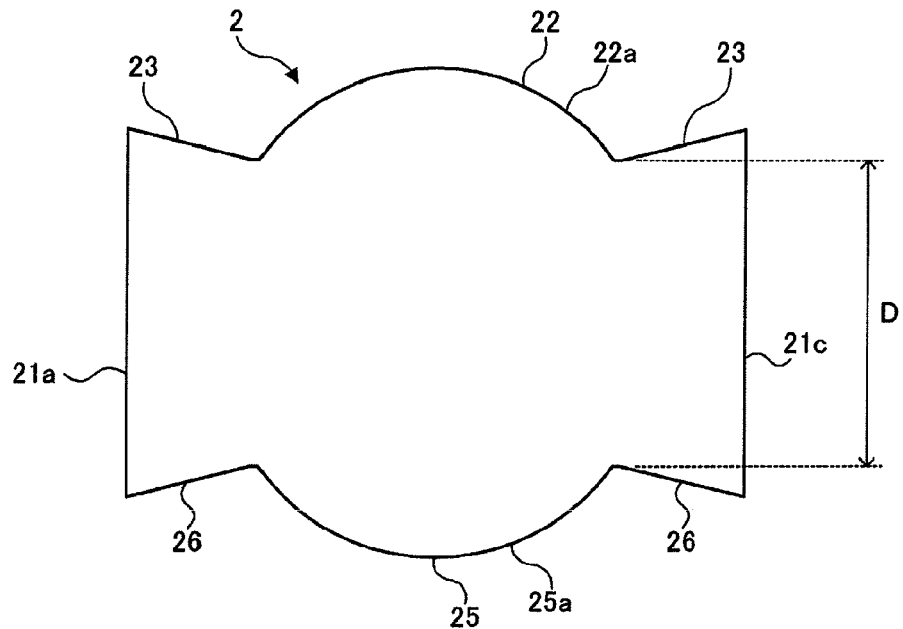
FIG. 10A is a longitudinal sectional view illustrating the optical element shown in FIG. 9.
Figure 10B:
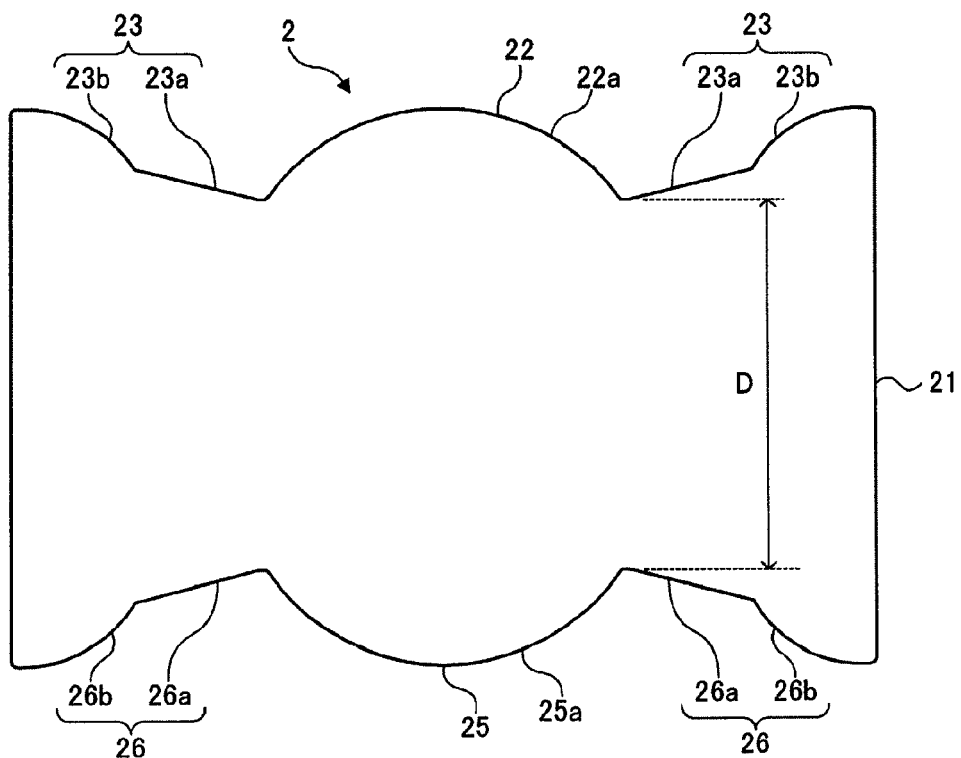
FIG. 10B is a longitudinal sectional view illustrating the optical element shown in FIG. 9.
Figure 11A:
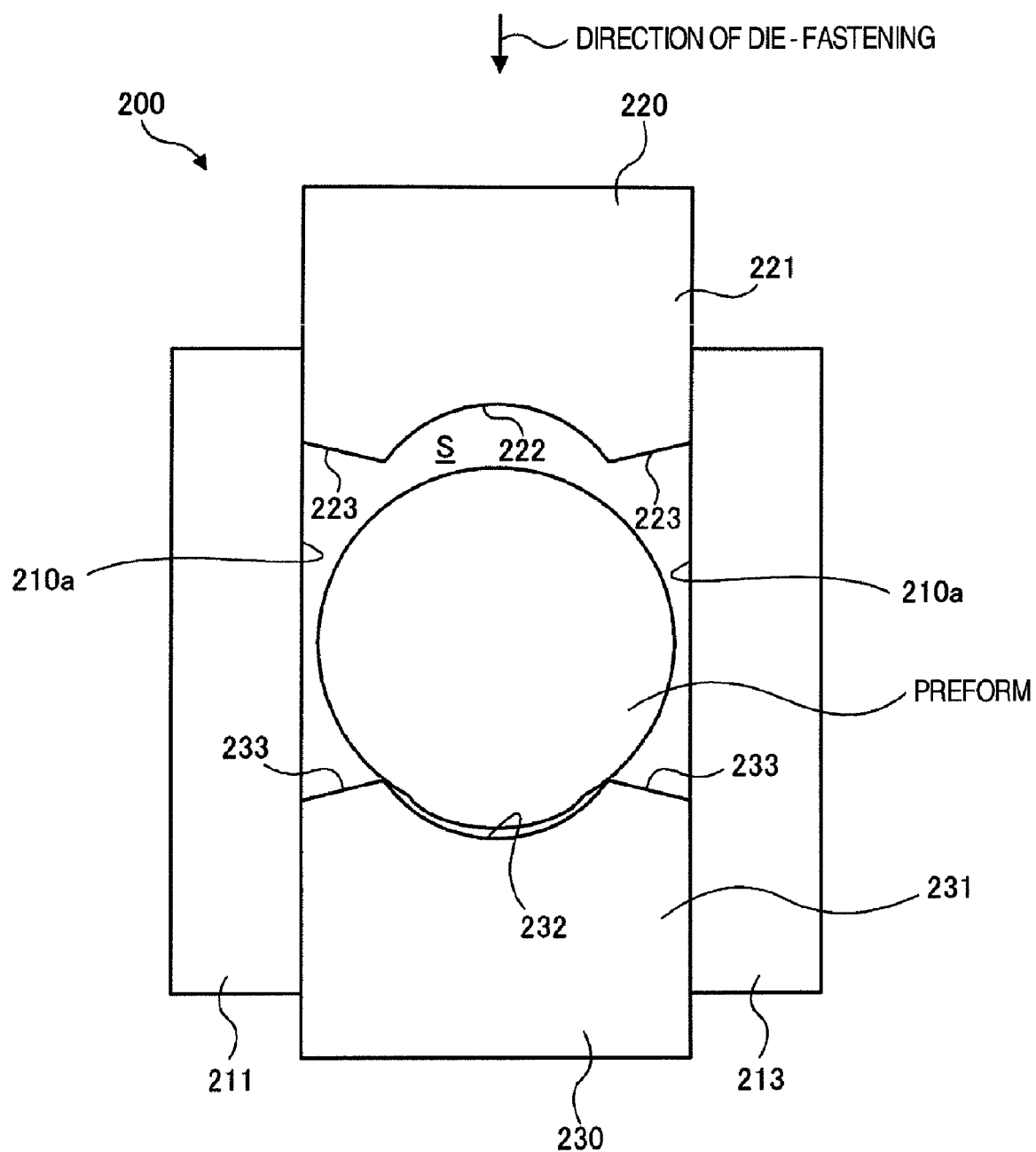
FIG. 11A is a view for explaining a method of producing the optical element with the use of a mold assembly.
Figure 11B:
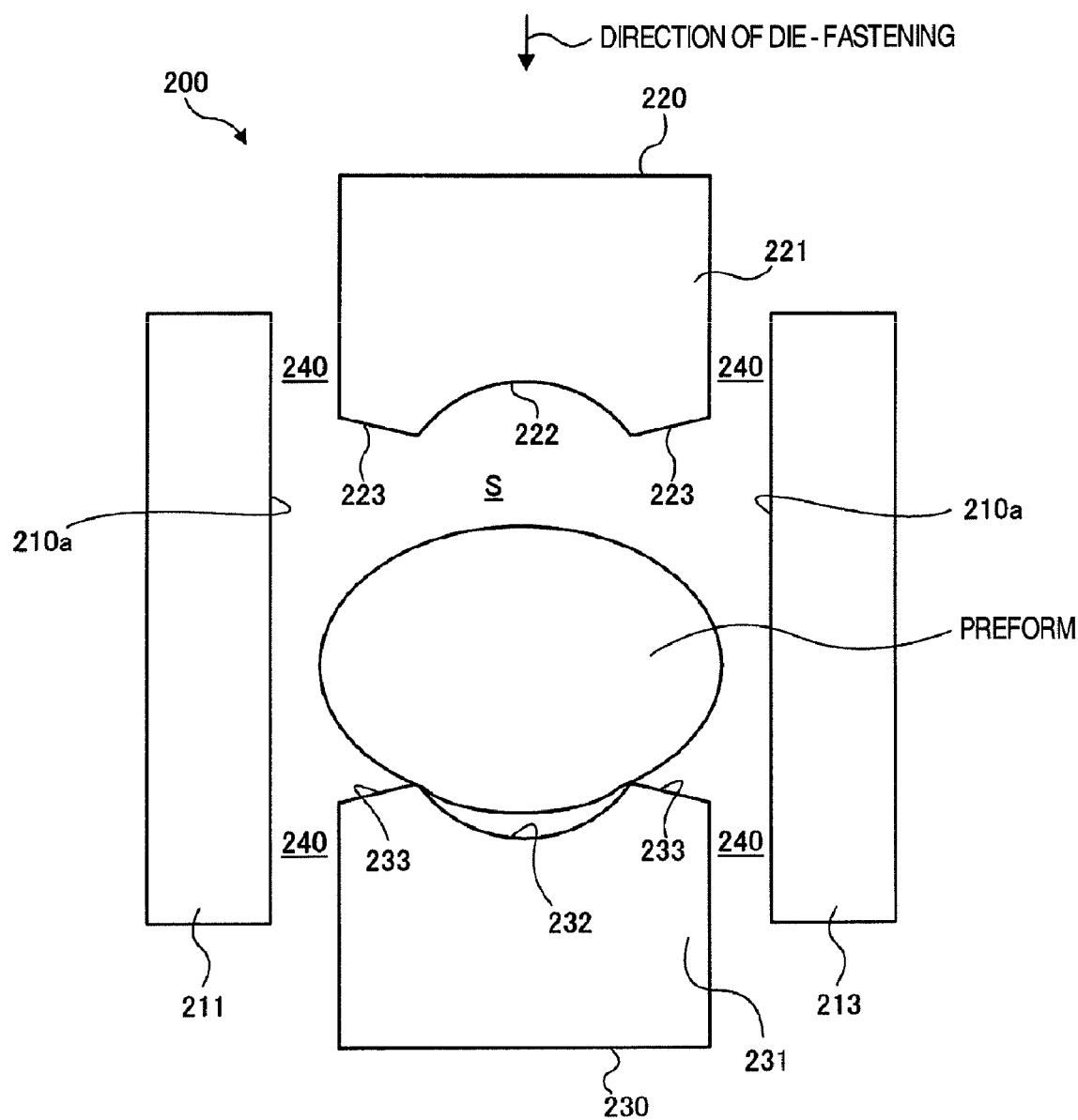
FIG. 11B is a view for explaining a method of producing the optical element with the use of a mold assembly.
Figure 12B:
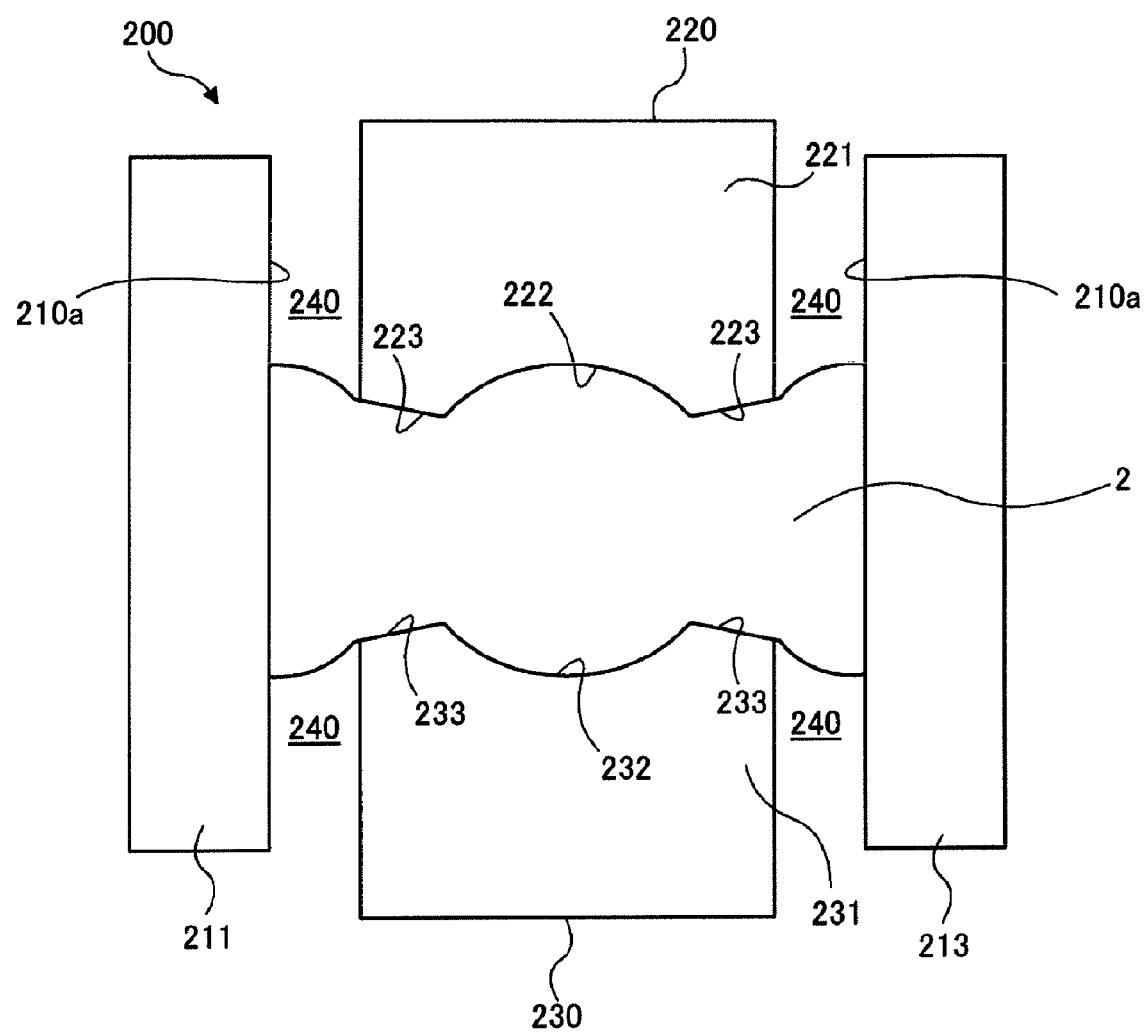
FIG. 12B is a view for explaining a method of producing the optical element with the use of a mold assembly.
Figure 13A:
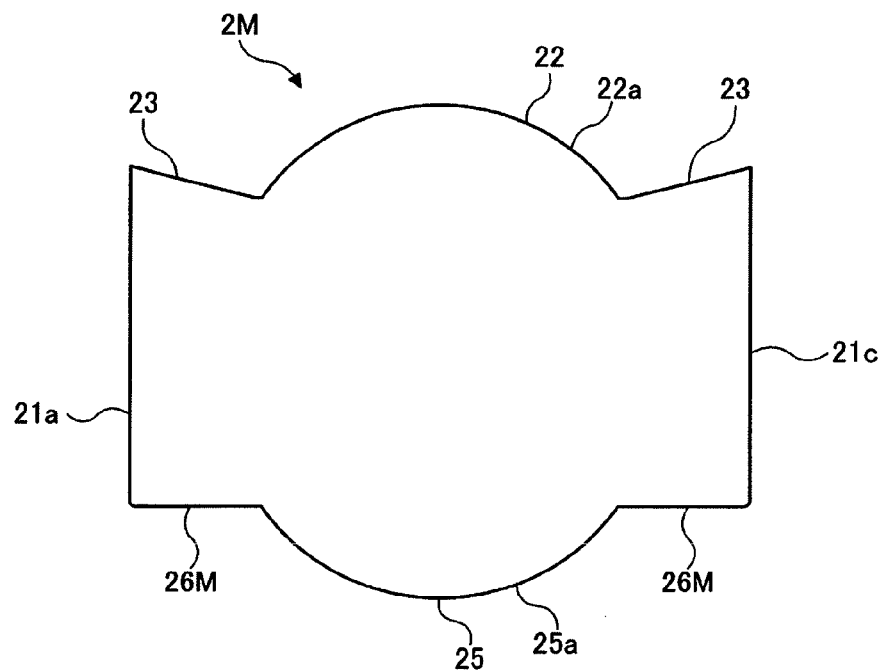
FIG. 13A is a longitudinal sectional view illustrating an optical element in a variant form of the second embodiment of the present invention.
Figure 13B:
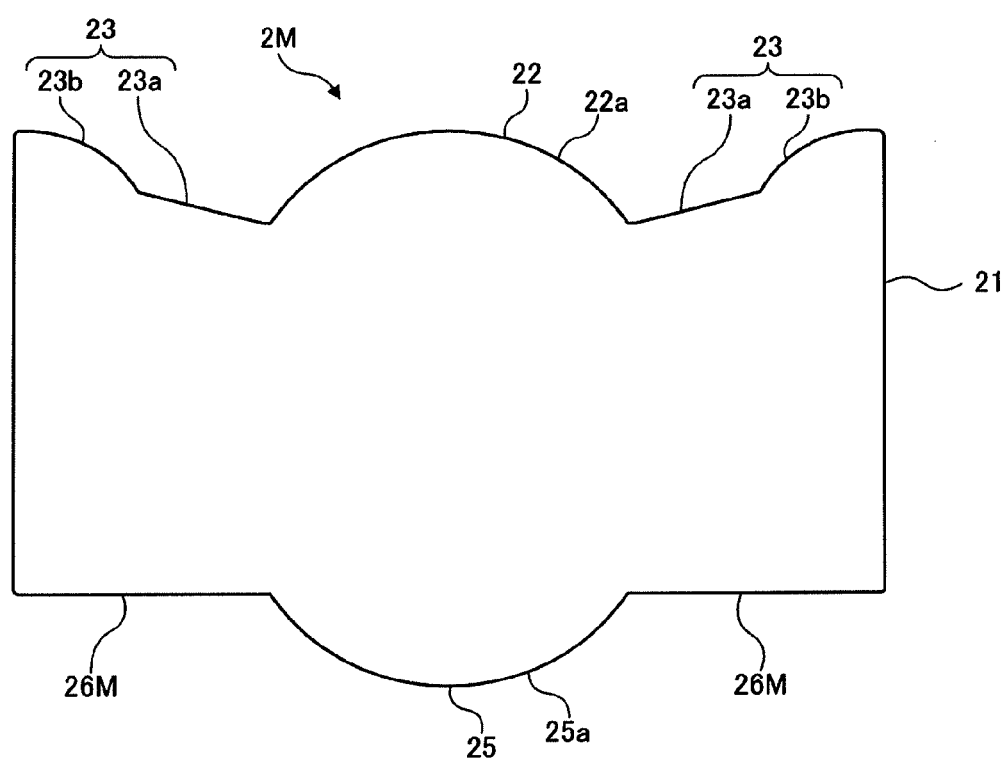
FIG. 13B is a longitudinal sectional view illustrating an optical element in a variant form of the second embodiment of the present invention.
Figure 14:
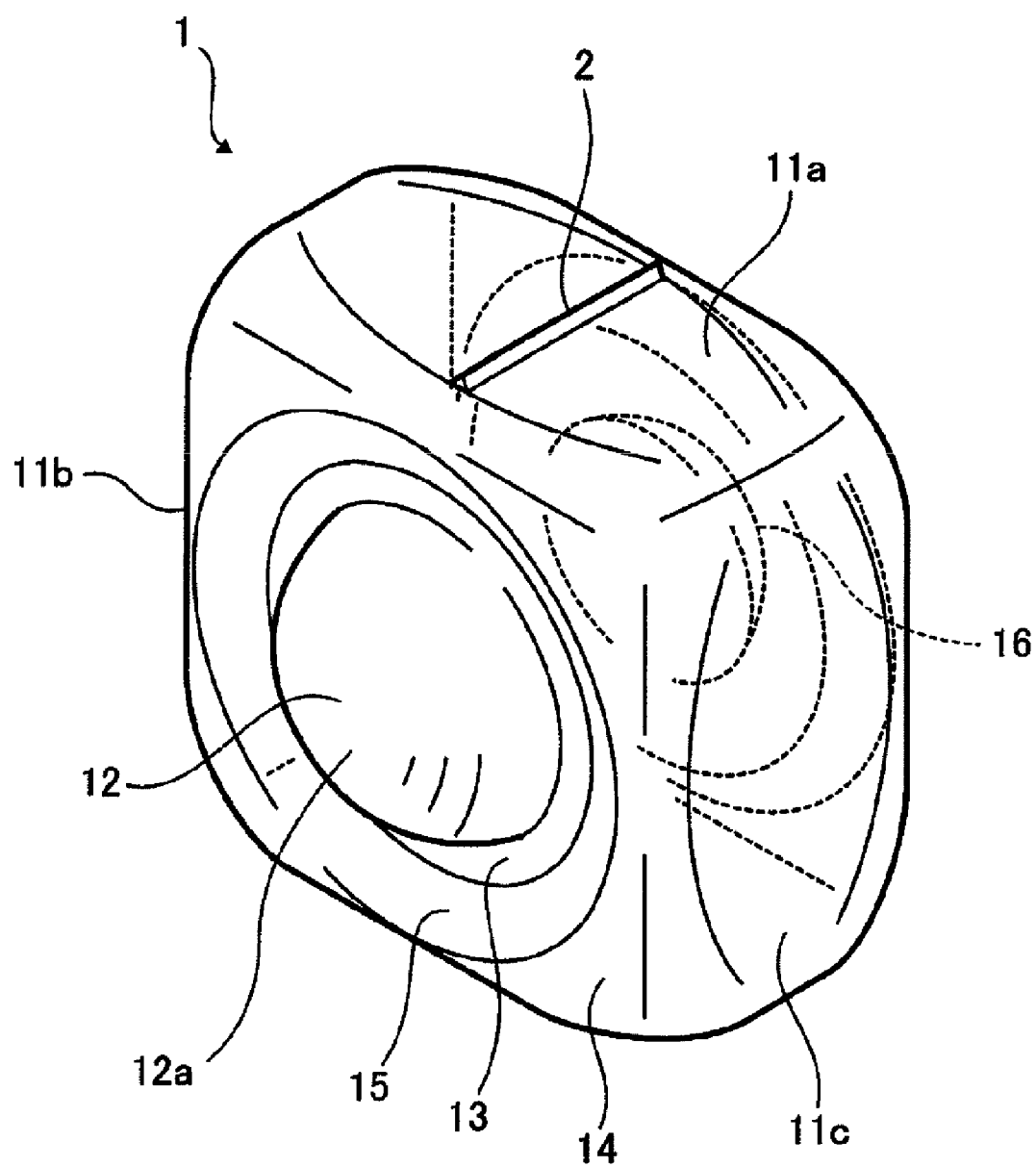
FIG. 14 is a perspective view illustrating an external shape of an optical element in a third embodiment of the present invention.
Figure 15A:
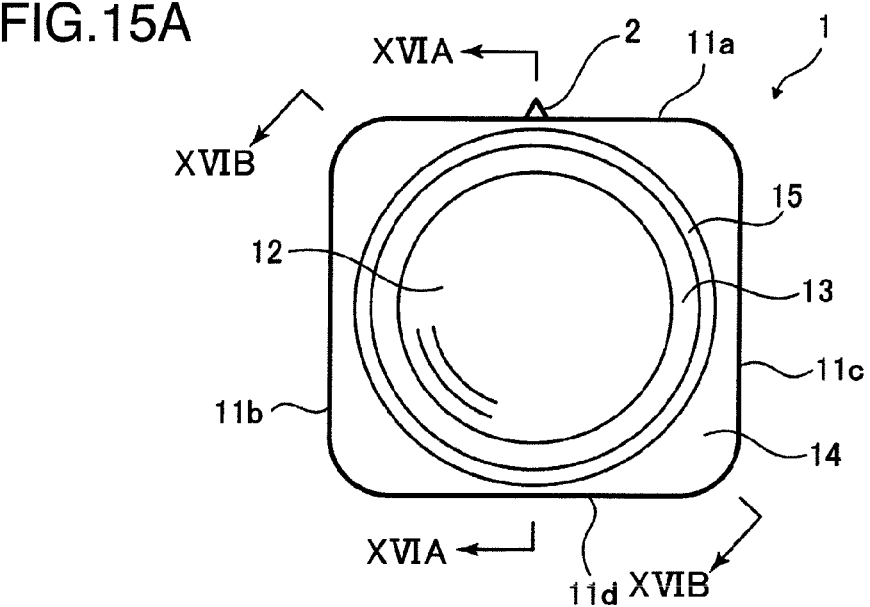
FIG. 15A is a front view illustrating a projection of the optical element shown in FIG. 14.
Figure 15B:
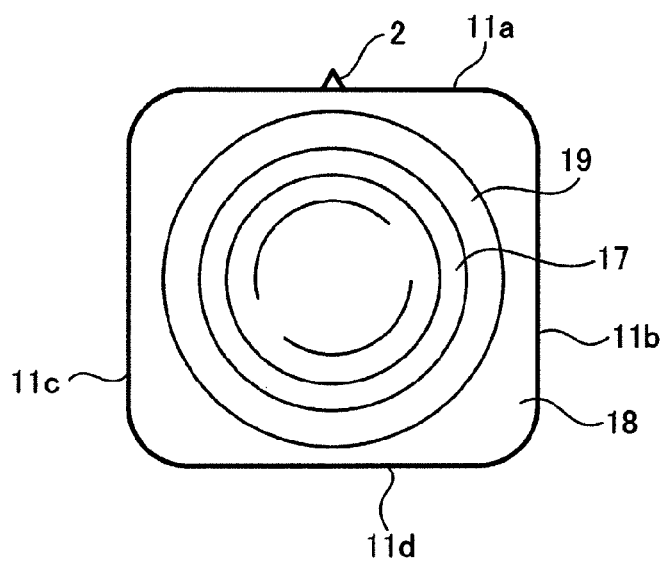
FIG. 15B is a rear view illustrating a projection of the optical element shown in FIG. 14.
Figure 15C:
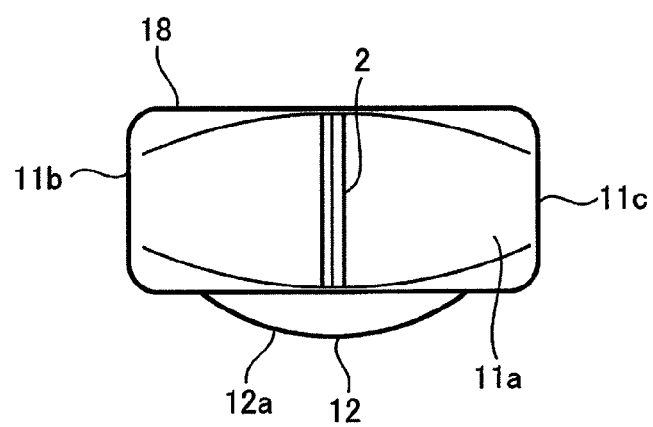
FIG. 15C is a plan view illustrating a projection of the optical element shown in FIG. 14.
Figure 16A:
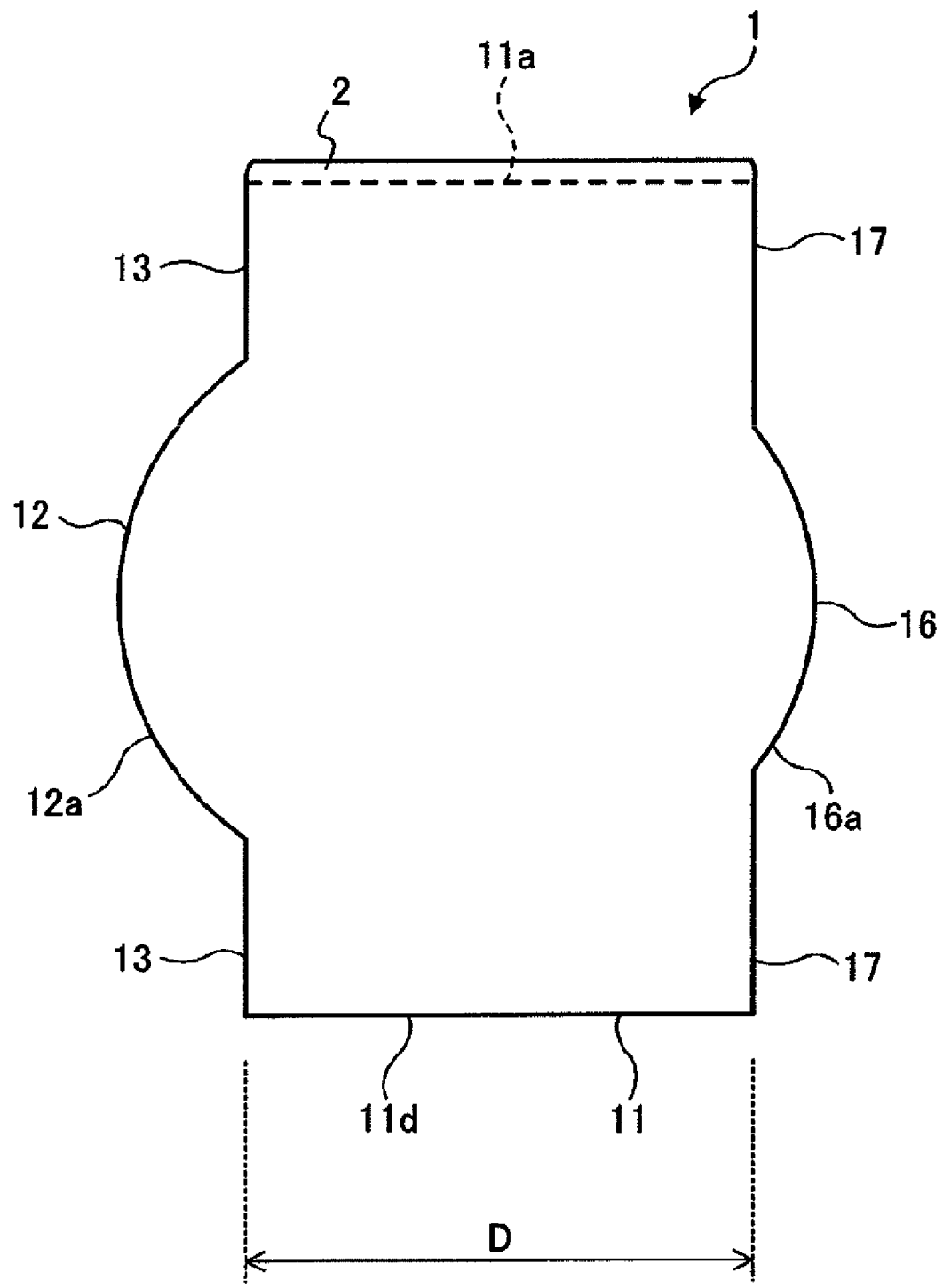
FIG. 16A is a longitudinal sectional view illustrating the optical element shown in FIG. 14, along line XVIA-XVIA in FIG. 15A.
Figure 16B:
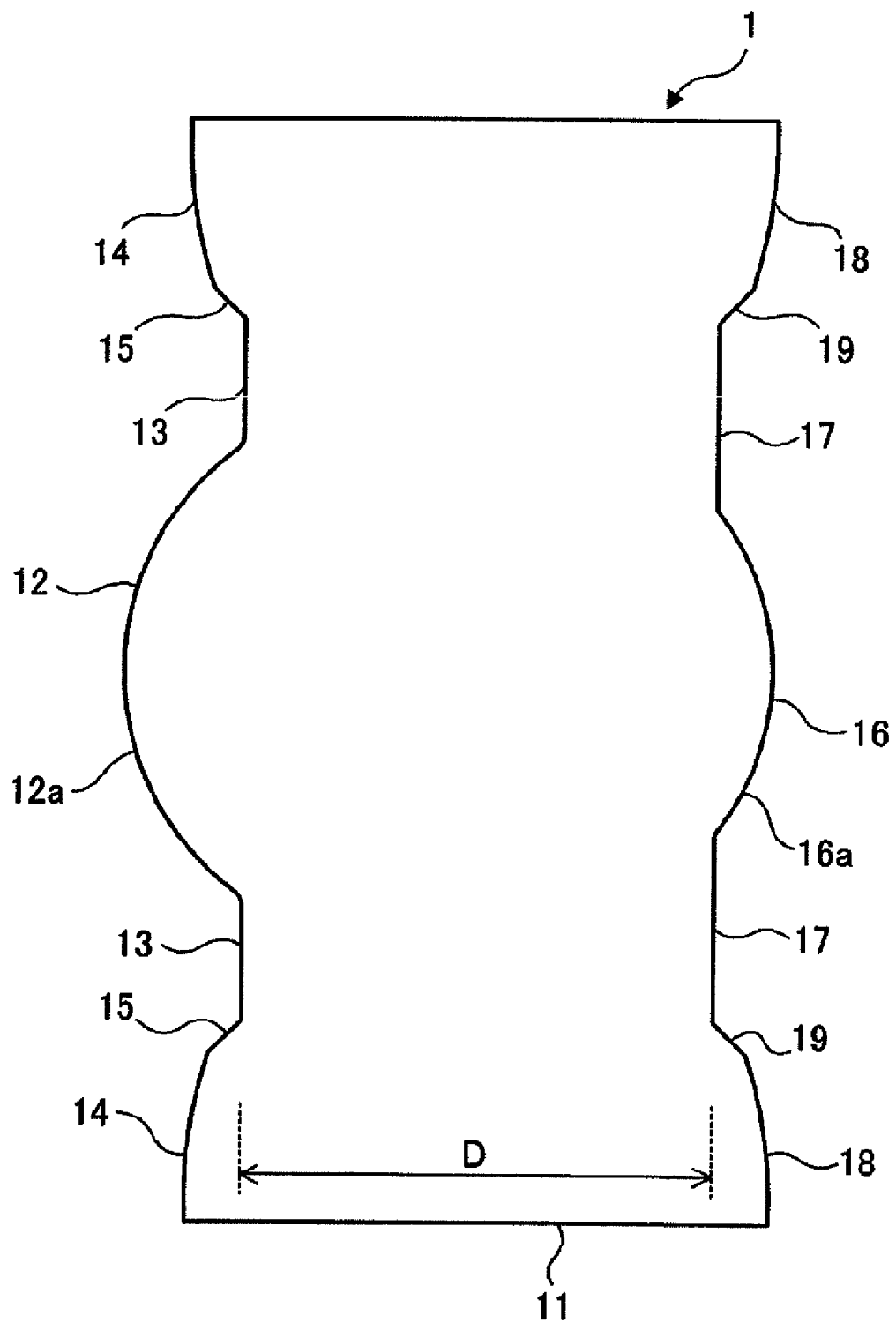
FIG. 16B is a longitudinal sectional view illustrating the optical element shown in FIG. 14, along line XVIB-XVIB in FIG. 15A.
Figure 17:
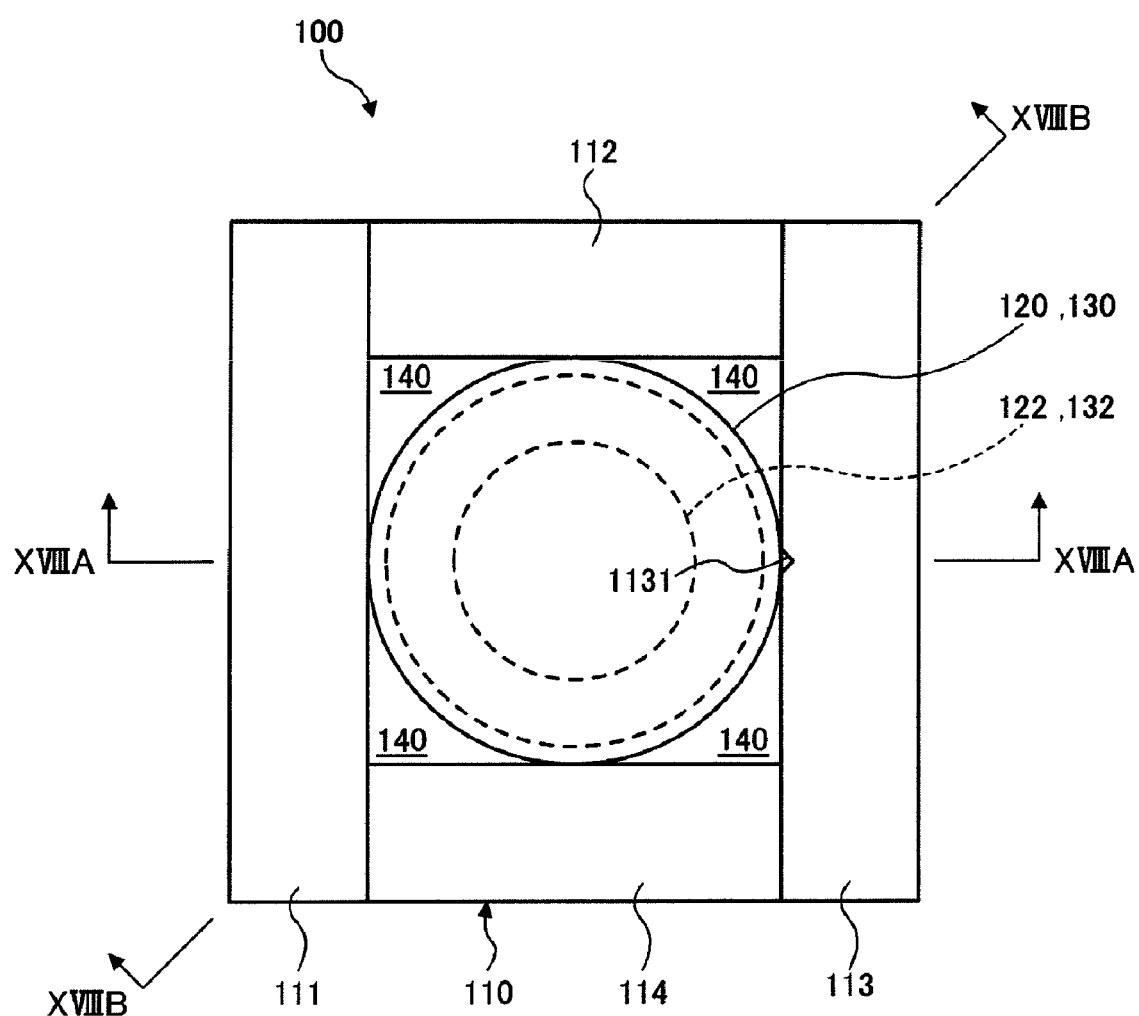
FIG. 17 is a plan view illustrating a mold assembly used for producing the optical element in the third embodiment of the present invention.
Figure 18A:
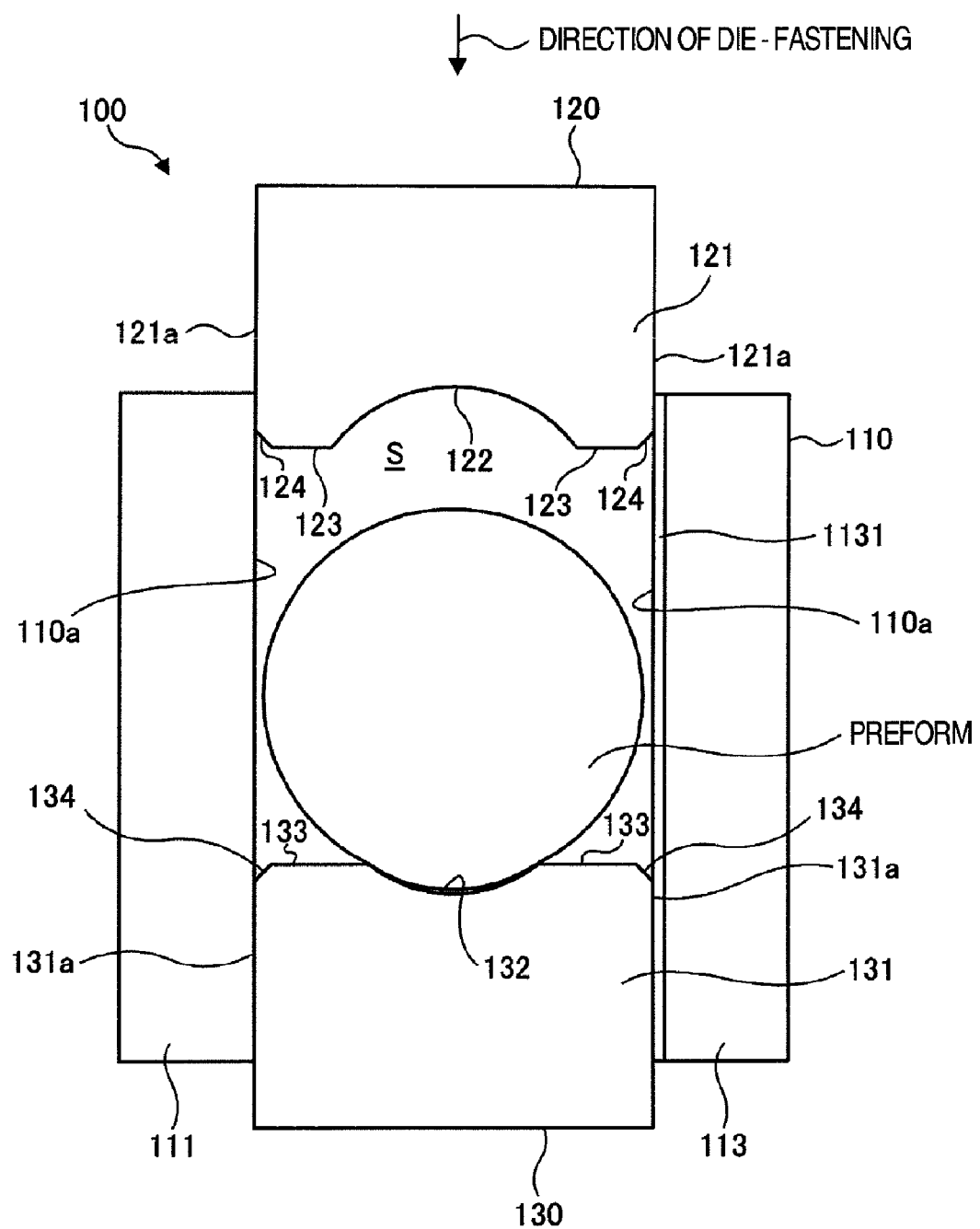
FIG. 18A is a view for explaining a method producing the optical element with the use of the mold assembly.
Figure 18B:
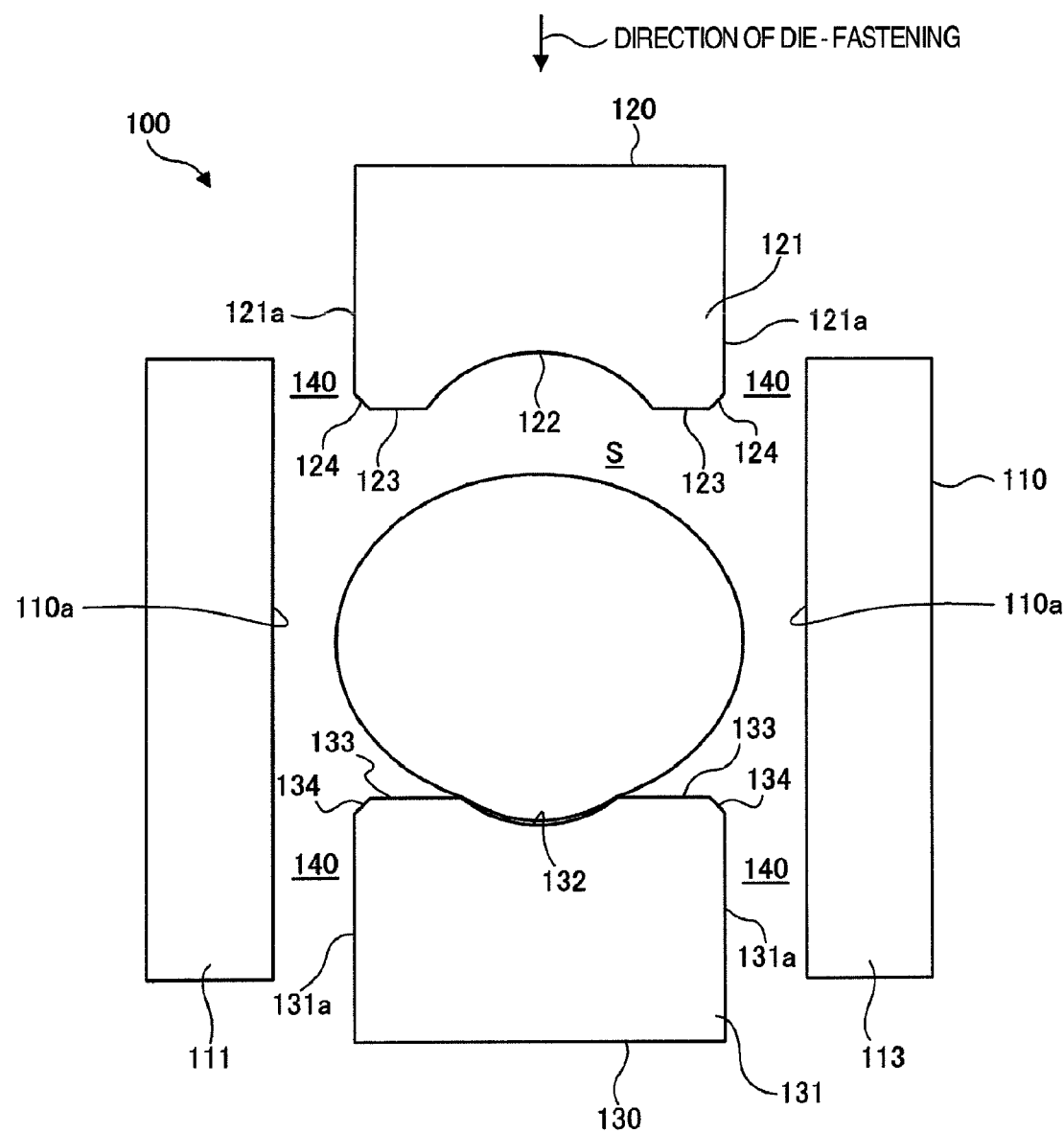
FIG. 18B is a view for explaining a method producing the optical element with the use of the mold assembly.
Figure 19A:
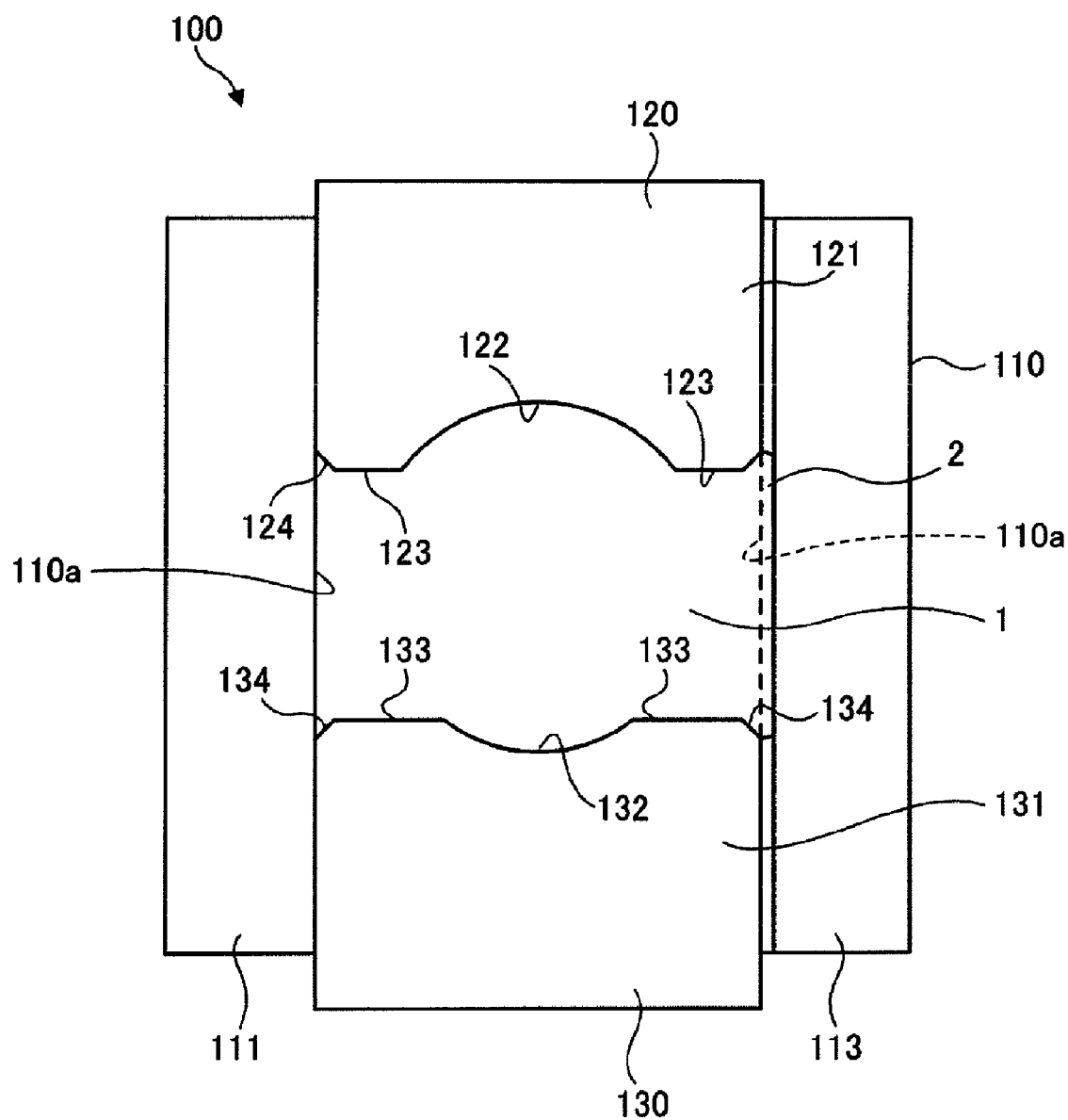
FIG. 19A is a view for explaining a method producing the optical element with the use of the mold assembly.
Figure 19B:
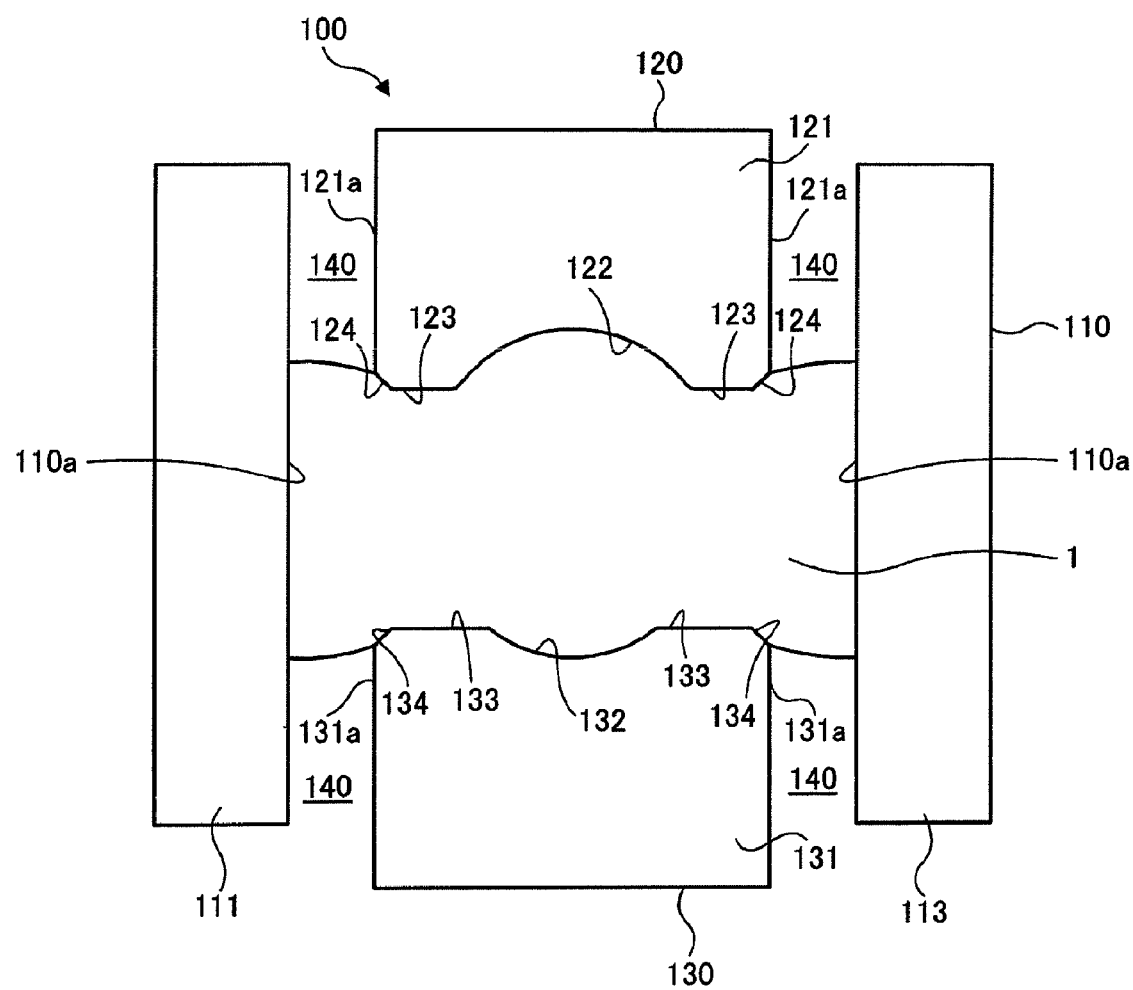
FIG. 19B is a view for explaining a method producing the optical element with the use of the mold assembly.
Figure 20:
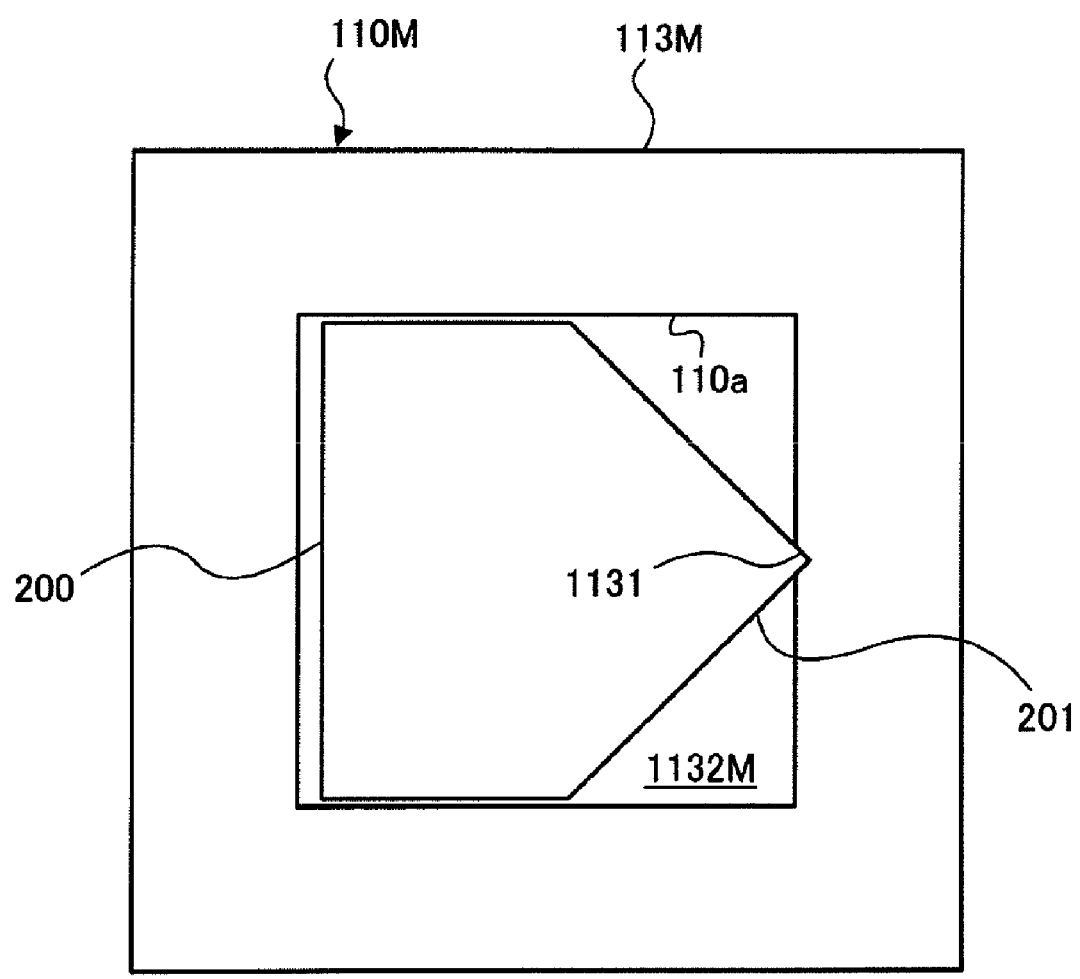
FIG. 20 is a view for explaining process steps for forming a groove part in a sleeve which constitutes a part of the mold assembly.
Figure 21:
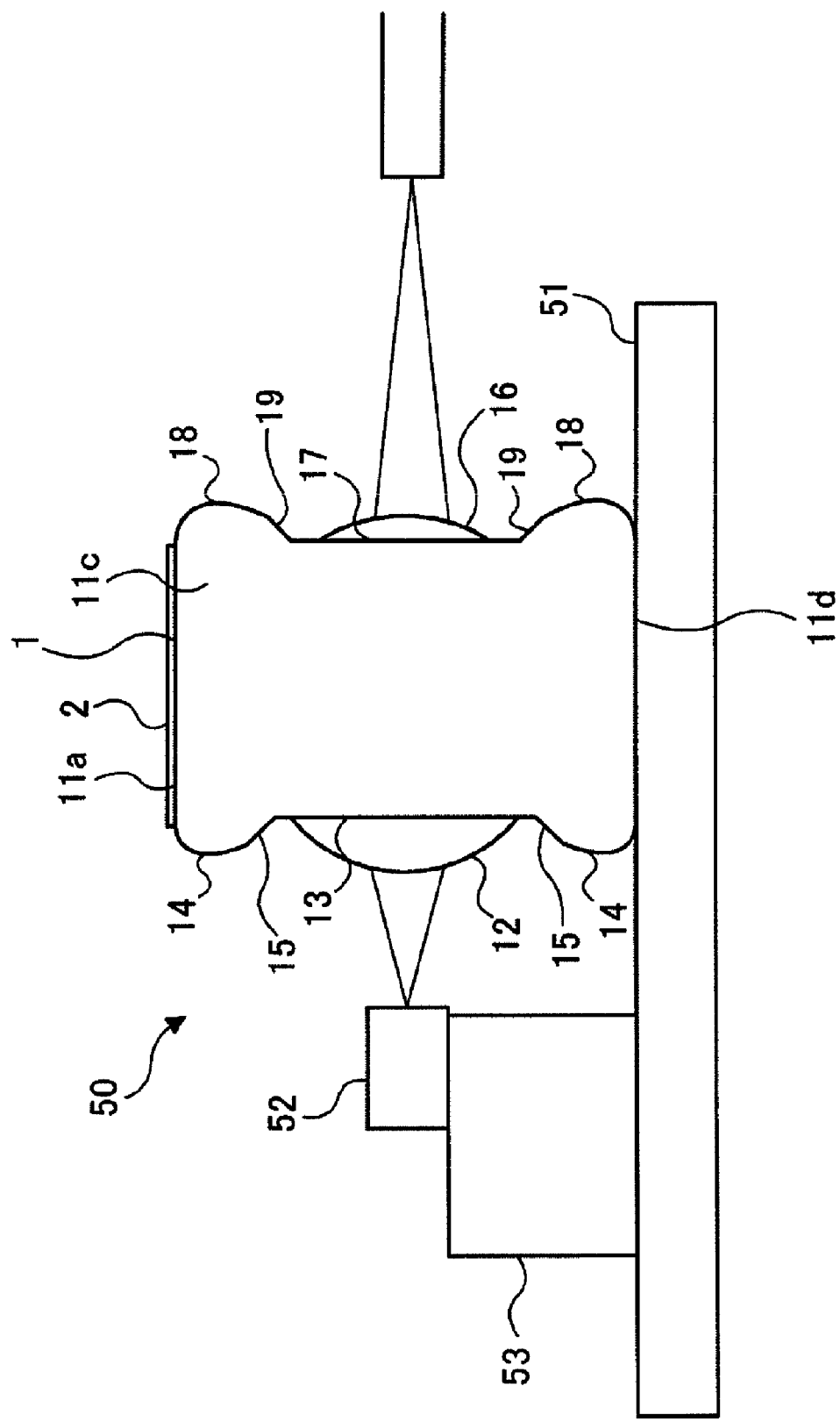
FIG. 21 is a view for explaining an optical coupling unit using the optical element in the third embodiment of the present invention.
Figure 22:
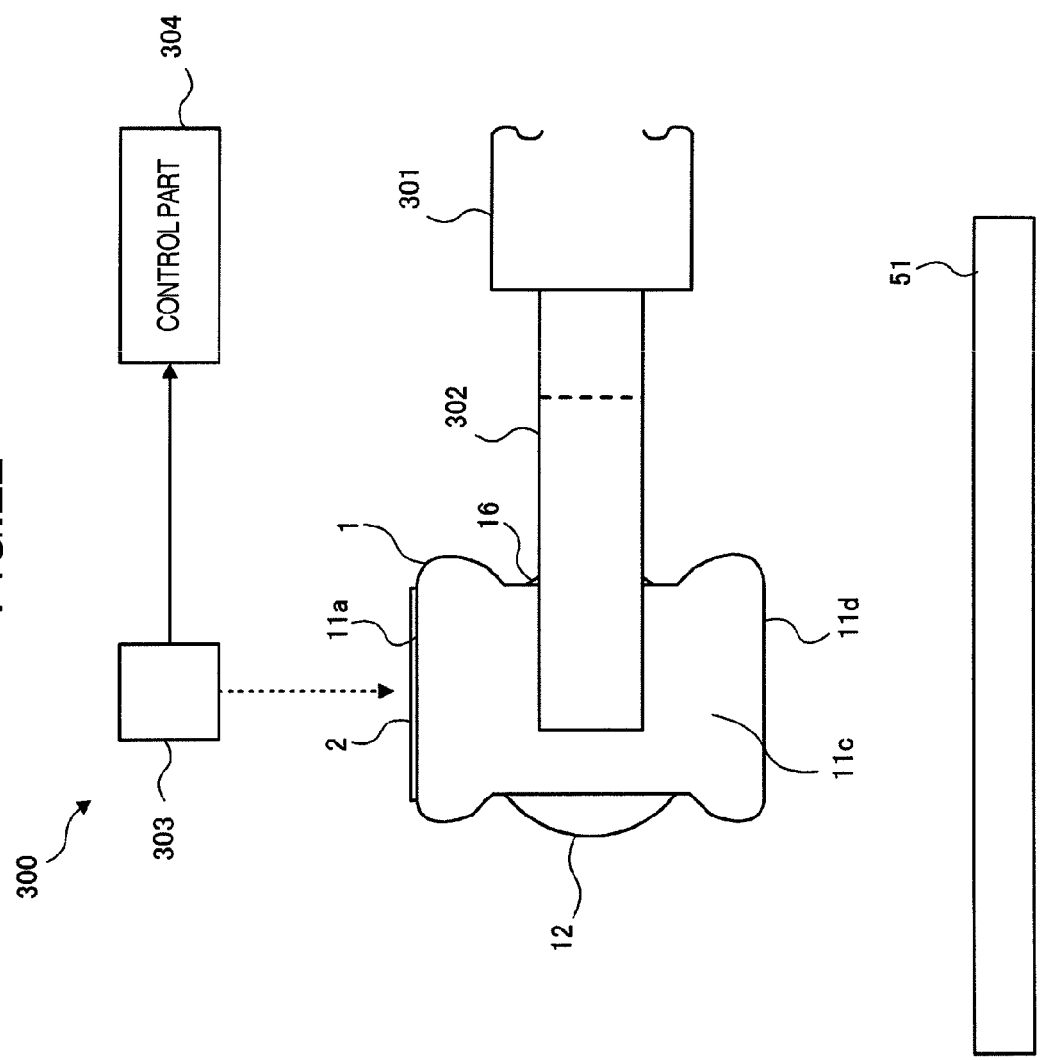
FIG. 22 is a block diagram for explaining process steps for bonding the optical element in the third embodiment of the present invention, onto a flat bench.
Figure 23:
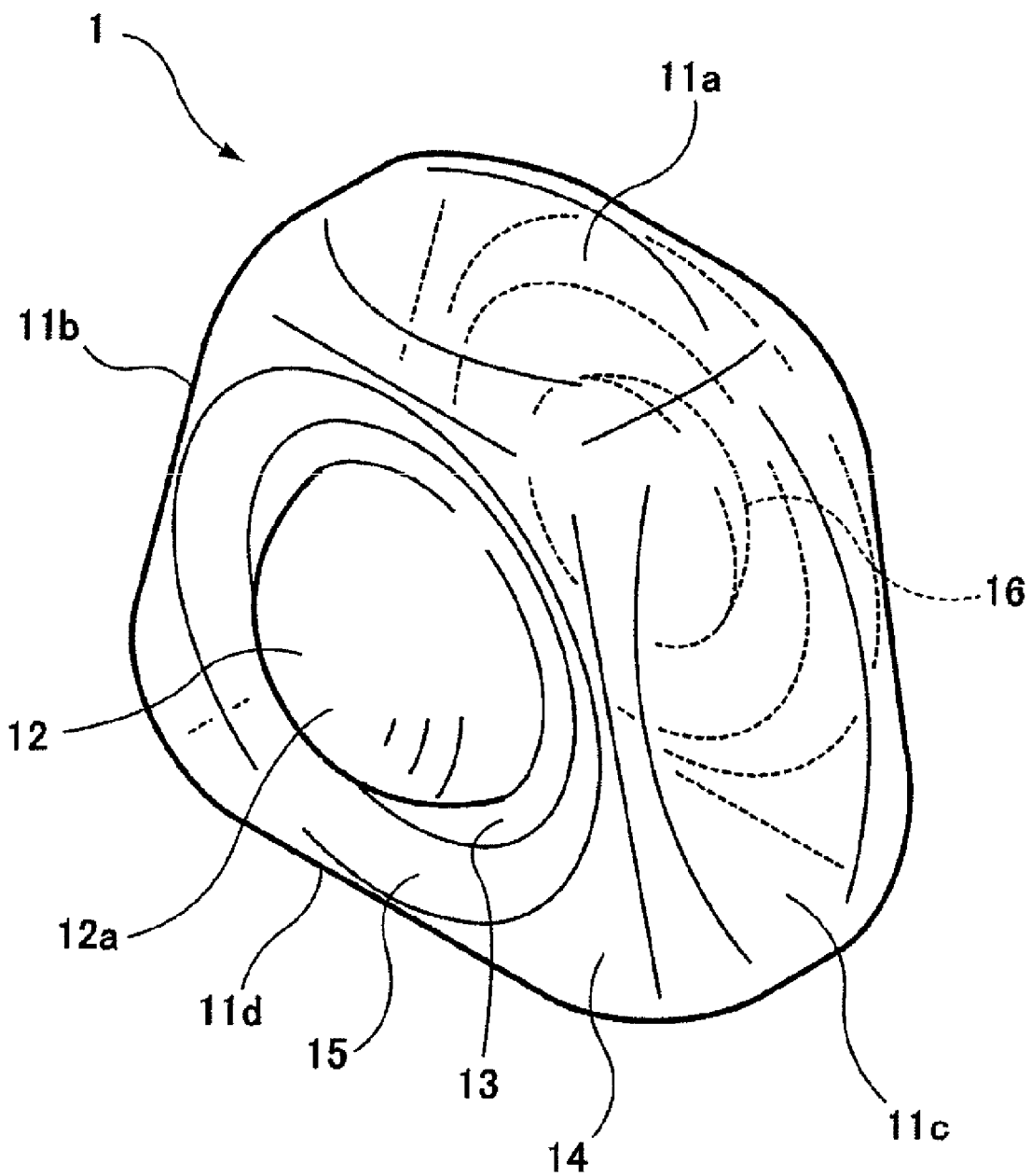
FIG. 23 is a perspective view illustrating an external appearance of an optical element in a fourth embodiment of the present invention.
Figure 24:
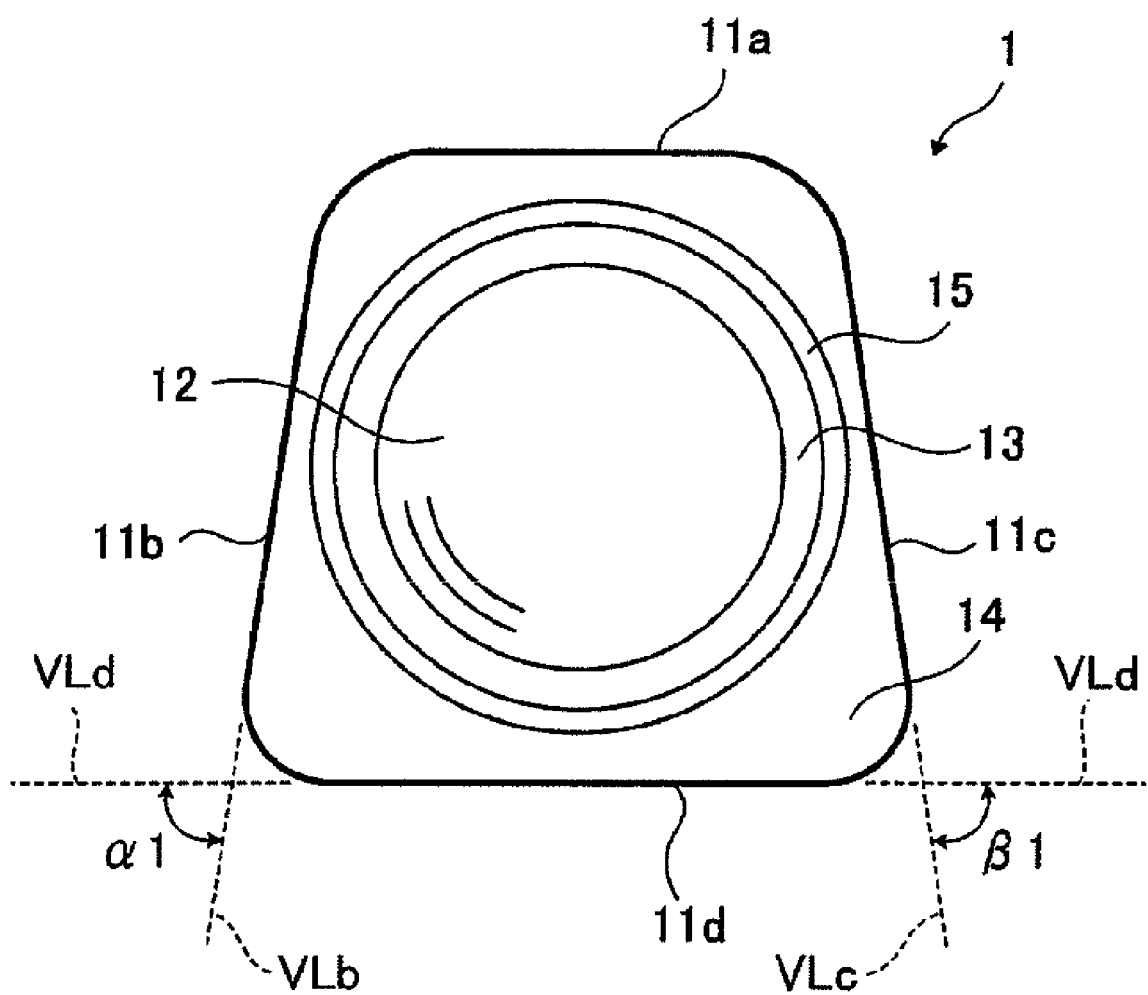
FIG. 24 is a front view illustrating the optical element shown in FIG. 23.
Figure 25:
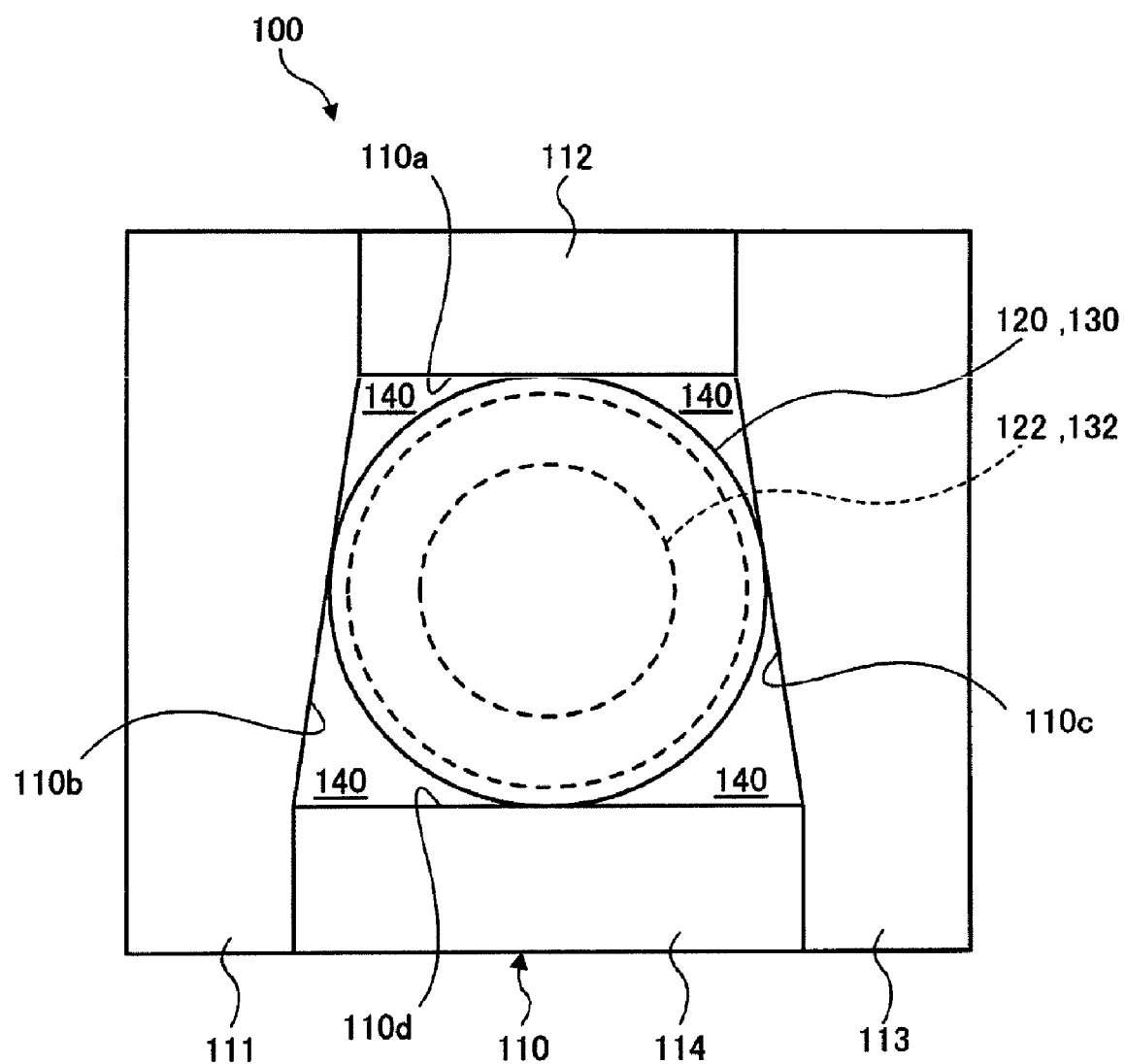
FIG. 25 is a plan view illustrating a mold assembly used for producing the optical element in the fourth embodiment of the present invention.
Figure 26:
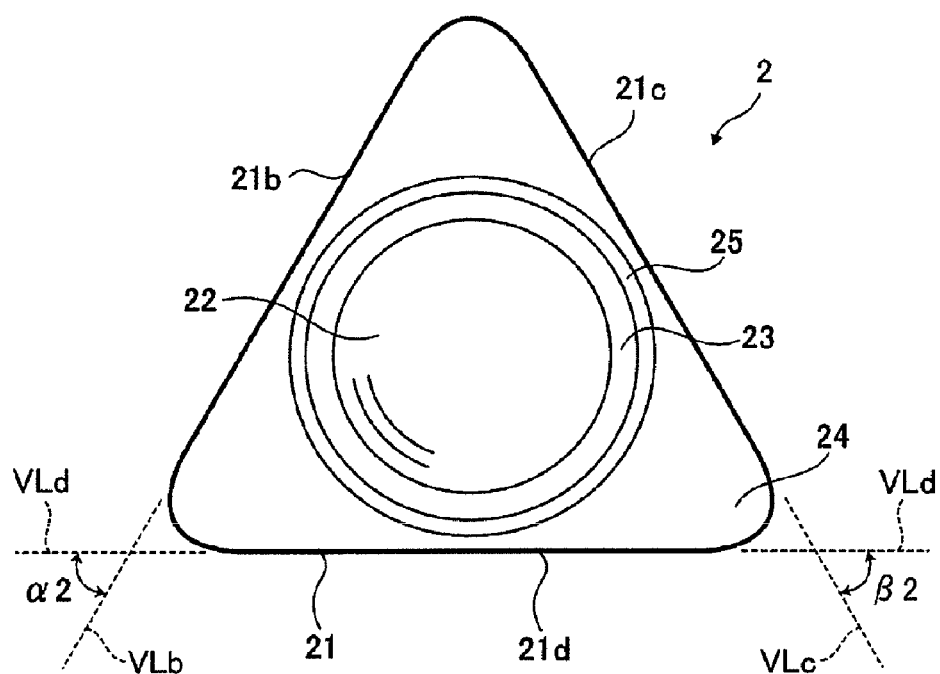
FIG. 26 is a front view illustrating an optical element in a variant form of the forth embodiment of the present invention.
Figure 27:
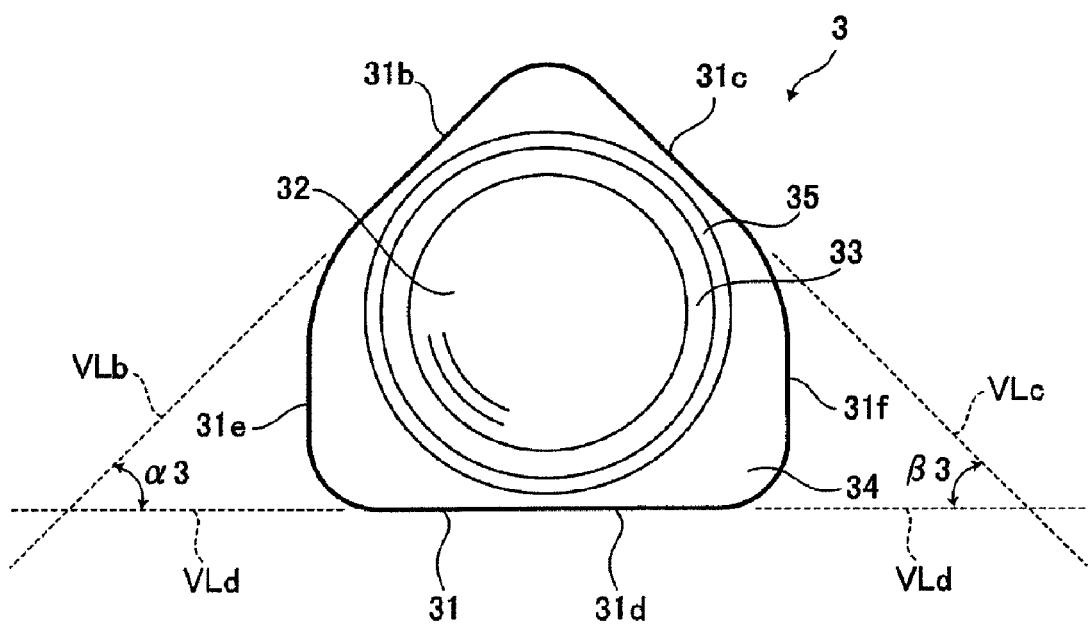
FIG. 27 is a front view illustrating the optical element in another variant form of the fourth embodiment of the present invention.

The method of producing an optical element according to the present invention can provide an optical element which is highly productive, which can be easily handled, and which can ensure a wider bonding surface.

The invention claimed is:

1. A method of producing an optical element, in which a first and a second die are cooperated with each other so as to press-mold a material in order to produce an optical element including a lens portion,
the first die has a circular cross-sectional shape, and the second die defines therein an interior space having a polygonal cross-sectional shape with respect to the direction of die-fastening,
the first die is adapted to enter into the interior space of the second die in the direction of die-fastening in the interior space so to press-mold the material in order to form the lens surface while the material is bulged out through gaps between the first die and the second die around the lens surface whereby forming protrusions.

2. A method of producing an optical element as set forth in claim 1, characterized in that wherein the first die is moved, relative to the second die so as to carry out the press-molding.

3. A method of producing an optical element as set forth in claim 1, characterized in that a leg part adapted to be used when using the optical element is formed during the press-molding.

4. The method according to claim 1, wherein the interior space has corners and peripheral sides, each of which peripheral sides extends between ones of the corners adjacent to each other circumferentially so that the corners and peripheral sides form the polygonal cross-sectional shape, and a radial distance between the circular cross-sectional shape and each of the ones of the corners adjacent to each other circumferentially is greater than a radial distance between the circular cross-sectional shape and the peripheral side extending between the ones of the corners.

5. A mold assembly for an optical element, comprising:
a cavity die which is formed so as to define therein a recess, and
a core die having a protruding part adapted to enter into the recess in the cavity die, for press-molding an optical element including a lens surface,
wherein the protruding part of the core die has an external shape which is different from a cross-sectional shape of a recess in the cavity die corresponding to the protruding part, and the outer peripheral surface of the protruding part and the inner peripheral surface of the recess define therebetween a space in which the material flows when the material is pressed during die-fastening,
the recess in the cavity die has a cross-sectional shape which is quadrangular, with respect to the die-fastening direction of the protruding part of the core die, and
the protruding part of the core die has an external shape which is circular.

6. A mold assembly for an optical element, as set forth in claim 5, characterized in that the core die includes an inclined surface in the pressing surface of the protruding part.

7. A mold assembly for an optical element as set forth in claim 5, characterized in that the core die is moved, relative to the cavity die so as to carry out the press-molding.

8. A mold assembly for an optical element as set forth in claim 5, characterized in that a groove for forming a mark on the optical element is formed in one surface defining the recess of the cavity die.

9. A mold assembly for an optical element as set forth in claim 8, characterized in that the groove is extended in the direction of die-fastening.

10. A mold assembly as set forth in claim 8, characterized in that the recess in the cavity die has a cross-sectional shape which is quadrangular, with respect to the die-fastening direction of the protruding part of the core die, and the protruding part of the core die has an external shape which is circular.

11. A mold assembly for an optical element as set forth in claim 5, characterized in that the recess in the cavity die has a cross-sectional shape which is polygonal with respect to the die-fastening direction, and the polygonal shape has a reference side, and a first side de and a second side having therebetween an inter distance which is shorter as the first side and the second side go away from a reference side.

12. The mold assembly according to claim 5, wherein the quadrangular cross-sectional shape of the recess has corners and peripheral sides, each of which peripheral sides extends between ones of the corners adjacent to each other circumferentially so that the corners and peripheral sides from the quadrangular cross-sectional shape, and a radial distance between the circular external shape of the protruding part and each of the ones of the corners adjacent to each other circumferentially is greater than a radial distance between the circular external shape and the peripheral side extending between the ones of the corners.

13. An optical element comprising:
a prismatic body portion comprising a plurality of side surface parts, and bottom surface parts,
a lens portion formed in either one of the bottom surface parts of the body portion, and
protrusions which are formed respectively at corners of the body portion around the lens portion,
wherein the optical element further comprises peripheral sides each of which extends between ones of the corners adjacent to each other circumferentially so that each of the peripheral sides forms a boundary between one of the side surface parts and one of the bottom surface parts, and each of the protrusions at the ones of the corners protrudes in a thickness direction of the lens portion with respect to an intermediate point of the peripheral side extending between the ones of the corners.

14. An optical element as set forth in claim 13, characterized in that the lens portion is a convex lens portion, and the protrusions are higher than the convex lens portion.

15. An optical element as set forth in claim 13, characterized in that the body portion is incorporated with a rise-up portion which is raised up around the lens portion, in the thicknesswise direction of the lens portion, and the projections are protruded from the rise-up portion.

16. An optical element as set forth in claim 13, characterized in that the protrusions are formed on the incident side and/or the emergent side of the lens portion.

17. An optical element as set forth in claim 13, characterized by further including a mark formed on one of side surface parts of the body portion, and can be recognized from the outside.

18. An optical element as set forth in claim 17, characterized in that the mark is extended line-likely in the direction of the optical axis of the lens portion.

19. An optical element as set forth claim 17 or 18, characterized in that the mark is formed in the body portion so as to be protruded therefrom.

20. An optical element as set forth in claim 17 or 18, characterized in that the mark is formed in the leg portion so as to be recessed therein.

21. An optical element as set forth in claim 13, characterized in that one of the plurality of side surface parts is a base surface which serves as a leg portion when the body portion is mounted,
the plurality of side surface parts include a first and second surface which are adjacent to the base surface, and the first and the second side surfaces has an inter distance therebetween which is longer as they approach the base surface.

22. An optical element as set forth in claim 21, characterized in that the body portion has a substantially trapezoidal shape as viewed in the direction of the optical axis of the lens portion, and the base surface, the first and the second side surface constitute a part of the sides of the substantially trapezoidal shape.

23. An optical element as set forth in claim 21, characterized in that the body portion has a substantially triangular shape as viewed in the direction of the optical axis of the lens portion, and the base surface, and the first and the second side surfaces constitute the sides of the substantially triangular shape.

24. An optical element as set forth in claim 21, characterized in that the body portion has a substantially pentagonal shape, as viewed in the direction of the optical axis of the lens portion, and the base surface, and the first and the second side surfaces constitutes a part of the sides of the substantially pentagonal shape.

25. An optical element as set forth in claim 13, characterized in that one of the side surface parts of the body portion is a base surface serving as a leg portion when the body portion is mounted, the side surface parts include a first and a second side surface which are adjacent to the base surface, and an angle included between the base surface and the first side surface is acute while an angle included between the base surface and the second side surface is acute.

26. An optical element as set forth in claim 25, characterized by further including protrusions formed in the body portion at corner parts thereof so as to be extended in the thicknesswise direction of the lens portion.

27. An optical element as set forth in claim 25, characterized in that the corner parts of the body portion are each rounded so as to have circular surfaces.

28. An optical element comprising:
   a prismatic body portion constituted by a plurality of side surface parts and two bottom surface parts,
   a lens portion formed in either one of the bottom surface parts,
   protrusions formed at corner parts of the body portion around the lens portion, and protruded in the thicknesswise direction of the lens portion, and
   a mark formed in a part of the body portion, other than the lens portion, for indicating a positional relationship of the lens portion with respect to the body portion,
   wherein the optical element further comprises peripheral sides each of which extends between ones of the corners adjacent to each other circumferentially so that each of the peripheral sides forms a boundary between one of the side surface parts and one of the bottom surface parts, and each of the protrusions at the ones of the corners protrudes in a thickness direction of the lens portion with respect to an intermediate point of the peripheral side extending between the ones of the corners.

29. An optical element as set forth in claim 28, characterized in that the mark is formed on the upper surface part of the body portion on the side remote from the leg portion.

30. An optical element as set forth in claim 28, characterized in that the body portion has a flat part, and the mark is formed in the flat part of the body portion.

31. An optical element as set forth in claim 28, characterized in that the body portion has a plurality of flat parts, and the mark is formed on one of the flat parts of the body portion.

\* \* \* \* \*